United States Patent [19]

Czerniejewski

[11] 4,363,101

[45] Dec. 7, 1982

[54] COMPUTERIZED POWER DEMAND CONTROL IN AN ELECTROCHEMICAL PLANT

[75] Inventor: Francis R. Czerniejewski, Longwood, Fla.

[73] Assignee: Westinghouse Electric Corp., Pittsburgh, Pa.

[21] Appl. No.: 144,149

[22] Filed: Apr. 28, 1980

[51] Int. Cl.³ .............................................. G05F 1/66
[52] U.S. Cl. .................................... 364/492; 364/483; 307/35; 307/39
[58] Field of Search ............... 364/492, 493, 483, 494; 307/39, 35

[56] References Cited

U.S. PATENT DOCUMENTS

| | | | |
|---|---|---|---|
| 3,387,121 | 6/1968 | Maczuzak et al. | 364/492 |
| 3,505,508 | 4/1970 | Leyde | 364/492 |
| 3,522,421 | 8/1970 | Miller | 364/492 |
| 4,106,097 | 8/1978 | Fox et al. | 364/492 |
| 4,110,825 | 8/1978 | Fox et al. | 364/492 |
| 4,117,537 | 9/1978 | Muench | 364/492 |
| 4,136,393 | 1/1979 | Fox | 364/492 |
| 4,161,028 | 7/1979 | Davis et al. | 364/492 |
| 4,204,127 | 5/1980 | Carter | 364/492 X |
| 4,245,319 | 1/1981 | Hedges | 364/492 X |

Primary Examiner—Edward J. Wise
Attorney, Agent, or Firm—C. M. Lorin

[57] ABSTRACT

All line control is performed with a power demand control system to bring about ideal rate before the end of a demand period. Demand error is modified so as to project the demand toward a definite point on the ideal rate curve, then to follow the ideal rate toward the target. Correction at a chosen point in time takes into account a possible duration from ideal rate consumption by either choosing the ideal rate short of the target or by pointing exactly to the target. All lines are individually controlled by tap changing with variable deadband and hysteresis, and tap moves are estimated on the basis of individual wattage and amperage changes in a previous control cycle. The minimum between necessary tap moves and the tap moves possible within an upper and a lower limit in the cell line amperage is used for control. The system allows safe settings by the operator and establishes passwords to communicate with the computer system when protected steps are to be dealt with, by the engineer, for instance.

14 Claims, 15 Drawing Figures

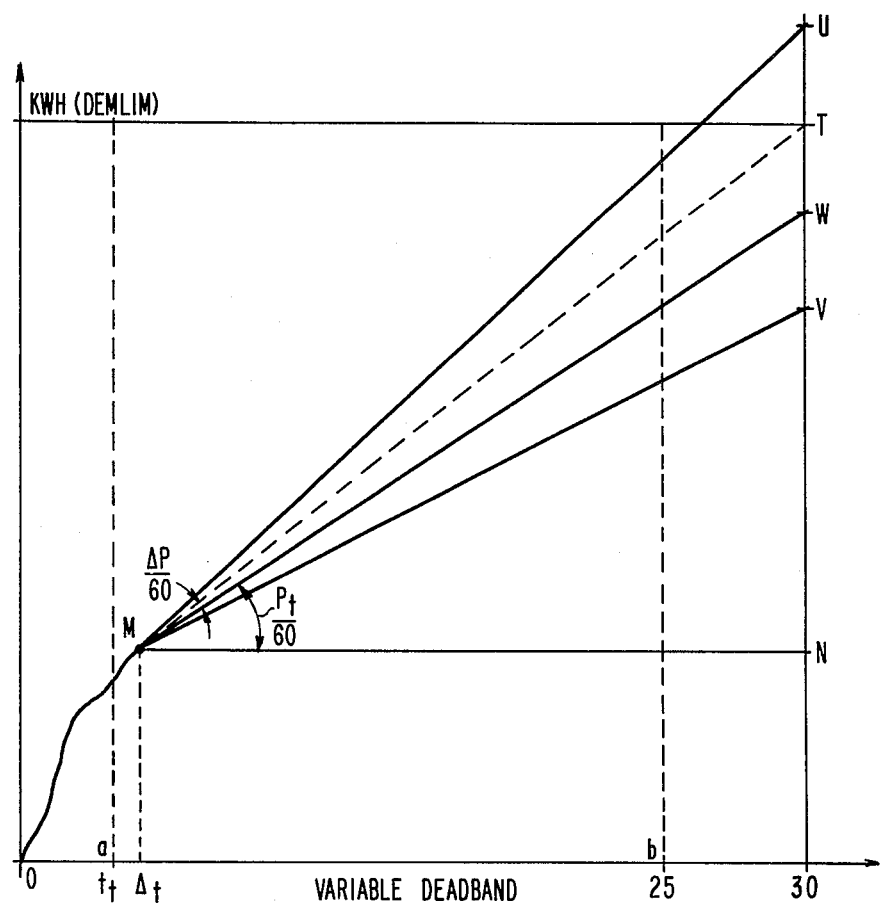
FIG. IA

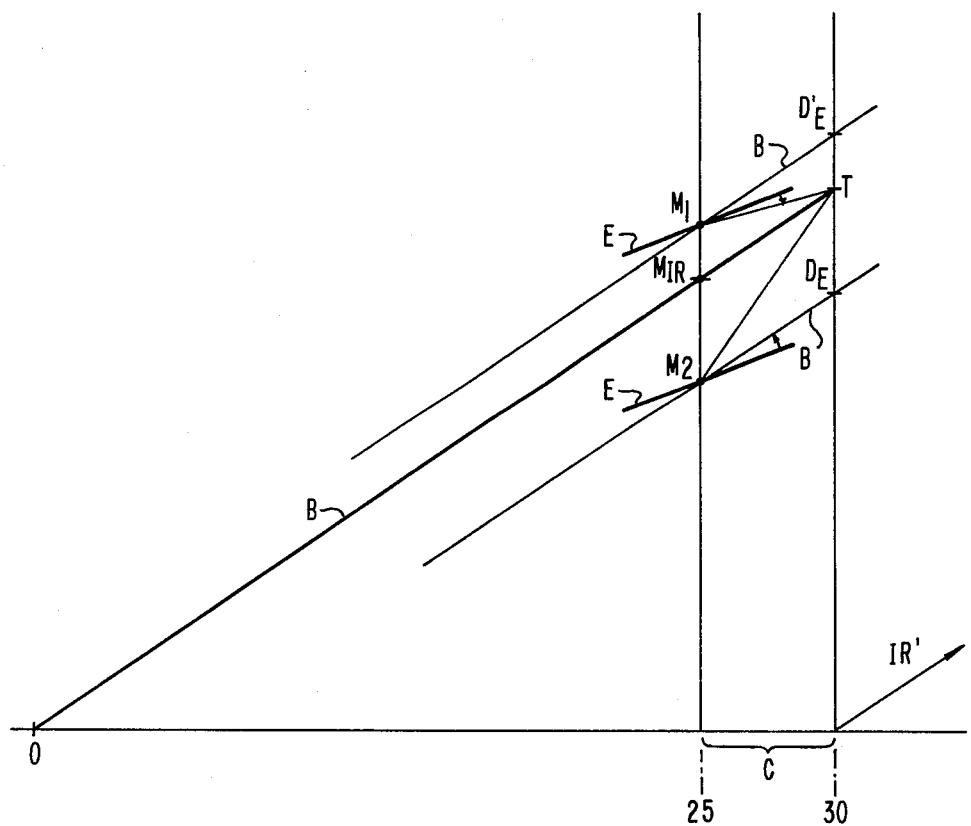
FIG. IC

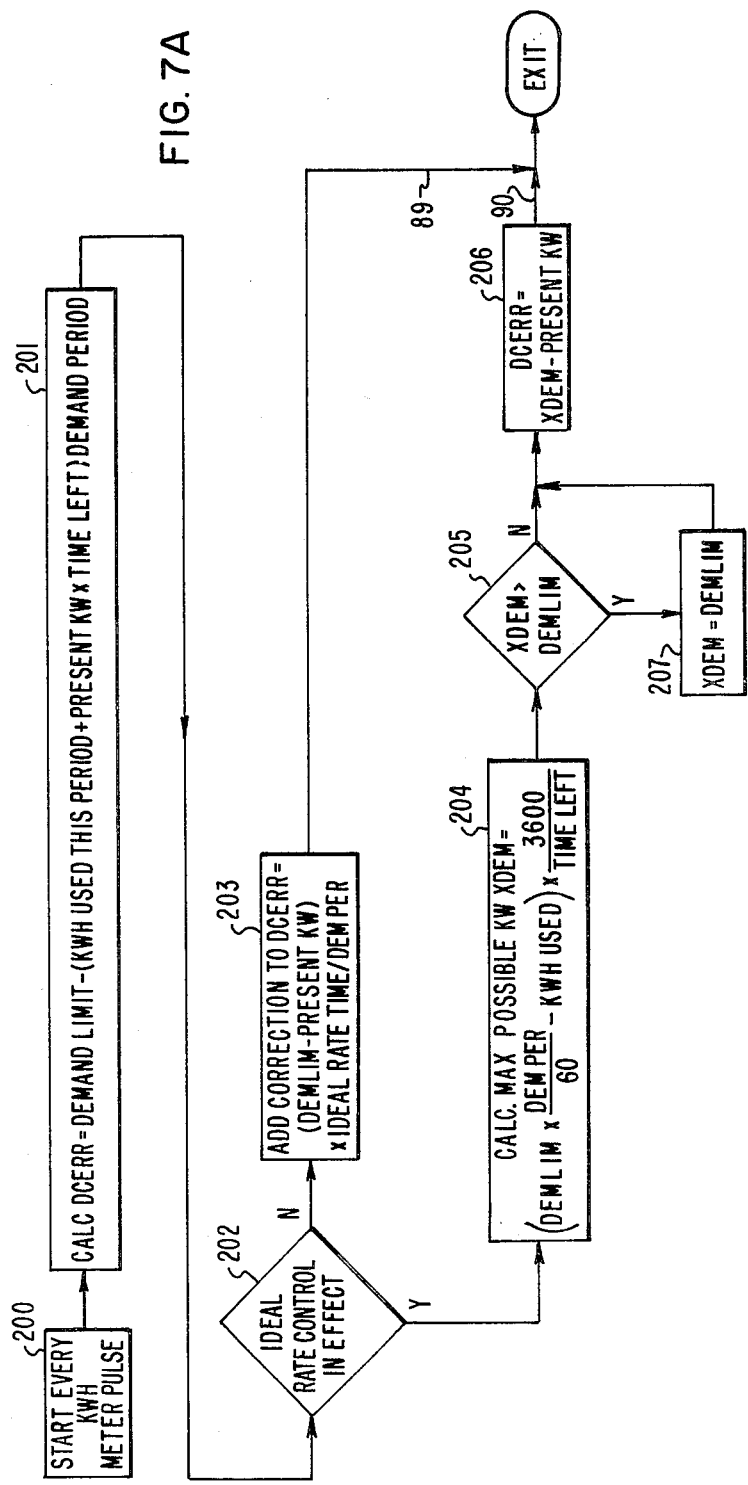

COMPUTERIZED POWER DEMAND CONTROL IN AN ELECTROCHEMICAL PLANT

BACKGROUND OF THE INVENTION

The invention relates in general to power demand control for switching electrical loads according to a priority schedule and more particularly to a power demand control system featuring cell line control, in an electrochemical plant facility supplied with energy from the utility company, so as to keep the demand at the end of a period of control within a preassigned demand limit while maximizing plant production.

Power demand control is known in which loads are controlled in accordance with a priority schedule which is changed, or fixed, in accordance with the dynamics of current consuming production units and of sheddable loads. Adaptive load priority determination with a power demand control system is generally known from U.S. Pat. No. 4,204,127, issued May 20, 1980. The system and method disclosed in the aforementioned patent application have been described in the context of an arc furnace installation, since in such installations the decision to switch, or not to switch, should not only take into account the requirements of power demand limit but also the economics and requirements of production. For the purpose of the present description, U.S. Pat. No. 4,204,127 is hereby incorporated by reference.

This invention is directly applicable to a computerized control system for the heavy chemical industries which are using an electrolysis process, such as the chlor-alkali industries. Thus, chlorine and caustic soda are produced almost entirely by electrolytic methods from fused chlorides, or aqueous solutions of alkali metal chlorides. In such a plant the energy consumed by the electrolyzer cells represents the large majority of the overall energy consumption from the utility company power line. The energy consumed in the electrolysis of the brine is the product of the current flowing and the potential of the cell. The load factor, e.g. the ratio average to maximum demand is high, namely of the order of 94% to 96%. Despite such a high load factor, any increase by a few percentages, say up to 98 or 99%, represents a sizable yearly profit increase to the manufacturer.

Accordingly, an object of the present invention is to provide a power demand control system which, besides some sheddable and reconnectable loads, operates mainly on electrolytic cells which can be controlled so as to maximize productivity without exceeding a power demand limit.

Another object of the present invention is to provide, in accordance with a priority schedule, for mininal switching and adjusting of loads mainly including electrolytic cells while closely meeting a power demand limit not to be exceeded at the end of any of successive demand periods.

A further object of the present invention is to control with a computer, during a given demand period, the power rate of a plurality of electrolytic cells in an electrolytic plant in order to attain an ideal rate of consumption before the subsequent demand period, thereby to minimize switching and adjusting of loads under the constraint of an assigned power demand limit.

Still another object of the present invention is to maximize the production from electrolytic cells in a chemical plant by cell selection and cell adjustment while minimizing the selection and adjustment control steps, and maintaining each cell between a maximum and a minimum amperage.

SUMMARY OF THE INVENTION

In a power utilization system including loads drawing energy from a utility company, electrolytic cells are adjusted in order to draw prescribed variable amounts of power as part of a power demand control system having an assigned demand limit. In order to provide regulation of the manufacturing process involved with the cells and at the same time meet the power demand constraints, energy is supplied to each electrolytic cell line through an individual tapping transformer controlled by a computer and each cell line has an individual power meter and an individual amperemeter feeding back information to the computer. Current is controlled by tap regulation under command of the computer in order to achieve toward the end of each demand period, an ideal rate of consumption, whereby the overall plant totalizes energy consumed in such amount to meet the assigned target. To the extent that the achieved ideal rate of consumption maintains itself in the user's facility, electrolytic cell line regulation is no longer required right after the end of the particular demand period. Therefore, excessive tap changing is avoided.

Corrective action in response to a demand error is effected by the control system according to the invention through changing the demand error by an amount sufficient to allow re-establishment of the ideal rate of consumption toward the end of each demand period.

The invention permits regulatory action on several electrolytic cell lines, the consumption at a given time being a function of an assigned power demand limit and a function of the availability of tap regulation during integrated portions of the demand period of control, thereby to maximize the utilization of the overall cell line capacity within the entire industrial plant.

Control is performed on units of production having a priority order for control, so as to bring the overall production to ideal rate before each new demand period. Power demand control may involve other types of loads, for instance loads that can only be switched ON or OFF, or loads having constraints making them available for control only when the attached constraints have been lifted as a result of fulfillment of assigned operative requirements, such as the expiration of prescribed times ON or OFF, or by any externally lifted prohibition, or which have in any form regained their degree of freedom.

The technique of computerized power demand limit is applied to an electrochemical facility supplied with electrical power from the utility company and this is achieved here without adversely affecting the output by the cell lines of the chemical plant.

As generally known in power demand control, the synchronizing ("DEMAND") pulse from the plant KWH meter resets the computer demand period timer and actual timing of the period is from the computer real-time clock. KWH pulses from the plant KWH meter are received by the controller as interrupts (or as frequently scanned contact closure inputs (CCI's)) which represent KWH consumed. These interrupts initiate the calculation of the total KWH in the period in relation to the elapsed time of the period. From these data an actual point on the demand curve is determined, and the actual slope of the curve is known preferably by using a weighted average of the last three pulse periods (last four pulses). This actual slope is used to predict final demand at the end of the period. In accordance with the present invention, depending on the demand prediction, on the time into period, and the availability of cell lines which can be tapped up or down, the computer may either lower or raise the taps of an electrolytic cell.

Each cell line is supplied with DC current derived by rectification from the AC power network and through an individual transformer. The transformer has taps for regulation purpose. Typically, a cell line is used in the production of chlorine by electrolytic dissociation of a brine solution in a vat. The main purpose is to increase the load factor without increasing electrical demand charges.

Another requirement is to hold each cell line within specified electrical current limits in order to keep peak efficiency for the process. The electrical current is sensed and derived as an analog input. The cell line individual power and the total plant power are measured by pulsing individual and total plant KWH meters.

The control system determines how much to regulate a selected cell line by reference to previous tap adjustments effected on the associated transformer upward, or downward. A minimum (Lo A) and a maximum (Hi A) current per cell line have been set by the operator. Therefore, the transformer taps are adjusted without exceeding such limits. In this regard, tap changes are performed by reference to the changes in the analog input observed from a preceding tap move. Upon each regulating step, the number of taps necessary to meet the demand limit and the number of taps possible within the permissible range are determined. When the required demand correction is not possible, or is limited, another cell line is selected and adjusted in the same fashion. The sensed value of the current increment $\Delta KA$ in the cell line and the resulting power increment $\Delta KW$ are taken from past history, namely at the last step of regulation.

Should the characteristics of the cell lines change, productivity maximization might require the intervention of an operator, for instance setting new limits (Hi A and Lo A). In order to protect the system against unwarranted intervention by the operator, provision is made in the system, according to the invention, for different degrees of freedom in several tiers. Thus, human interfacing is broken into four tiers: (1) display only (without panel key), (2) protected process and control operator functions, (3) password regulated engineer's functions and (4) password programmer's functions for detailed debugging, memory modification and simulating malfunctions. For instance, the engineer will have entered boundaries so that upon any setting of Hi A, or Lo A, by the operator outside those limits, the system will reject the entry. When equipment malfunctions, an alarm is triggered, the operator is informed of the cause, and advised of possible solutions and reset procedures.

As a result, according to the present invention, power demand limit control in a plant is integrated with control of production units in the nature of electrolytic cells, as part of an adaptive control process.

BRIEF DESCRIPTION OF THE DRAWINGS

The invention will now be described in the context of the supply of electrical energy by a utility company to an industrial plant including a plurality of electrolytic cell lines, and reference shall be made to the accompanying drawings in which:

FIG. 1A illustrates diagrammatically the principle of calculation of the demand error for power demand control;

FIGS. 1B and 1C illustrate diagrammatically cell line control for the two successive phases of control according to the present invention;

FIGS. 7A–7G are flow charts showing routines and subroutines accomplishing the various tasks for handling CCI inputs in digital form, and for calculating errors and parameters leading to tap changing for maximizing productivity within the limit of an assigned power demand.

GENERAL CONSIDERATIONS APPLICABLE TO THE PREFERRED EMBODIMENT

For the sake of clarity and for the purpose of illustration only, the present invention will be described in the context of the power demand control system of U.S. Pat. No. 3,872,286, issued to R. E. J. Putman, and U.S. Pat. No. 4,204,127, issued to W. C. Carter. The descriptions of the aforementioned patent and patent application are hereby incorporated by reference.

FIG. 1 illustrates the principle of calculation of the error for any point M along the trajectory during a demand period of 30 minutes, for instance. A clock installed by the power supply company determines the initial time of each demand period, (or the final time of a preceding demand period). The watthour meter provides a "KWH pulse" which represents the magnitude of the power which has been consumed during a certain time $\Delta t$ corrsponding to a full rotation of the disc of the meter, representing a constant increment or unit of energy (KWH). Thus, the $\Delta t$ interval appearing along the time axis is essentially variable. This time interval is detected as a representation of the slope at point M and it represents the power $P_t$ in KW hour/hour. If the load of the plant is maintained in the same condition until the end of the 30 minute period (for instance), the energy curve will follow the tangent MW. However, the Demand Limit is set at T, therefore there is an error TW by default, which in terms of power is:

$$\Delta P = \frac{(60) \times TN}{30 - t} = P_t$$

as is evident from the geometry of triangles MNT and MWT. Having determined Slope=$P_t/60$ by triangulation, and the sign of the error (depending upon whether the intersection point W is above (−) or below (+) the target T) power demand control is effected in accordance with general practice, by selectively adding, or shedding, suitable loads in the plant.

Figure 1B:
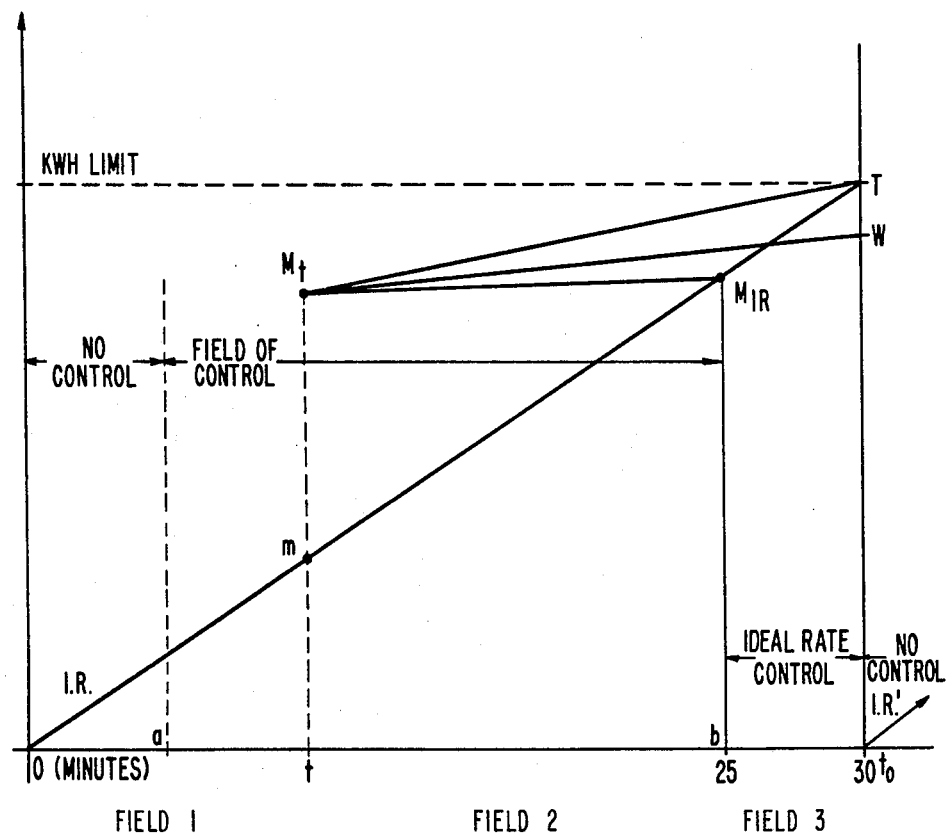

However, as explained hereinafter, besides power demand control during successive demand periods, the present invention proposes to effect cell line control within a user's facility in order to reach an ideal rate of consumption before the end of the demand period. The ideal rate curve is shown in FIG. 1B by line OT, a straight line from the origin at time t=0 to the target T at the end of the period. Besides the cell lines which are adjustable current consuming loads, the plant includes other loads, for instance the air conditioning units, the fans, the light, elevator banks, for instance. The major current consuming loads may represent 80% of the overall consumption in the plant. Under such conditions, the target, or assigned demand limit (DEM LIM) is such that when such major units of production are at their best load factor, e.g. 100%, the power rate is constant and the operative point $M_t$ follow ideal rate (IR) line OT. Nevertheless, during the demand period, the loads other than such major adjustable loads, and also some discrepancies in the unities of production themselves, will bring the operative point to deviate from line OT. For the purpose of illustration, it is assumed that at time t=10 minutes, for a demand period of 30 minutes, the operative point is at $M_t$, rather than at m on line OT. At the same time tangential vector MW defined by the actual power $P_t$ at this point M indicates an anticipated error TW relative to the target. Instead of correcting this error under conventional power demand control, the present invention proposes to change the anticipated error by an amount sufficient to return on the ideal rate (IR) curve OT. To this effect, a point $M_{IR}$ is arbitrarily chosen, five minutes before the end of the period in the instance of FIG. 1B, on the ideal rate curve OT. Control, during a field of control ab, of the power rate at point $M_t$ deflects MW toward $M_{IR}$. If no disturbance occurs and point $M_{IR}$ has been reached the power rate is changed again to $M_{IR}T$, so that the loads will now follow the ideal rate line OT to the end of the period. Therefore, the target T will be reached under the ideal power rate so that no further control will be necessary at the beginning of the subsequent period. However, as shown in FIG. 1C, $M_t$ could at time t=25 minutes, be either too high ($M_1$) or too low ($M_2$) relative to $M_{IR}$. If at $M_2$, the slope $M_2T$ to reach the target will be larger than the ideal rate slope (B) parallel to OT, whereas at $M_1$ slope $M_1T$ is smaller than B. In accordance with the present invention, once in the second phase of cell line control, namely, at the ideal rate start time (t=25 minutes in the illustration given for a 30 minute demand period), it is ascertained whether the slope ($M_1T$, or $M_2T$) to the target T is larger, or smaller, than the ideal rate slope B, e.g. whether M is below, or above, the operative point $M_{IR}$ intended in the first phase of cell line control. If $M_t$ is above $M_{IR}$ (at $M_1$), the power rate is changed from the current value E to $M_1T$, thereby reaching the target, although at a slope less than ideal rate since the latter would bring the demand at the end of the demand period at $D_E'$ in excess of the assigned demand limit. If $M_t$ is below $M_{IR}$ (at $M_2$), the power rate is changed from the current value E to the ideal rate B. The demand at the end of the demand period will be $D_E$, thereby missing somewhat the target from below, but the loads will be at the ideal rate, for the subsequent demand period. It appears that the present invention allows (1) to substantially reach the target T, while (2) substantially following the ideal rate before the end of the demand period, e.g. at the beginning of a new demand period, it being understood that, for the sake of clarity, FIG. 1C shows with exaggeration the discrepancies at $M_1$ and $M_2$ about the intended point $M_{IR}$.

Indeed, should during the first phase of control the correction made for operative point $M_t$, an error TW develop which no longer matches the effort to reach point $M_{IR}$, a new correction of the error TW will again take place by cell line control, during the same first phase of control, so as to point again toward $M_{IR}$. At the end of the period of control ab, $M_{IR}$ may be reached while progressing further toward the end of the field of control ab. As the system becomes closer to the target there is a tighter orientation toward $M_{IR}$. Once the ideal rate has been established toward the end of the demand period there will no longer be any control in the next demand period because of IR′.

It appears from the above that the invention provides for a no control field (Field #1) initially in the period (for instance, up to 5 minutes at a, according to FIG. 1B) followed by a first phase of control from a to b (field #2) and finally a second phase, e.g. an ideal rate control field of 5 minutes (field #3). If the system does not detect any disturbance following regulation to ideal rate consumption from $M_{IR}$ in the preceding period, an equilibrium is present in which no control at all is required for the next period (field #1). Therefore tap changes, at points such as $M_t$ or $M_{IR}$, will be minimized in the overall succession of demand periods.

In order to closely follow the target, while not overreacting to rapid transient conditions, a deadband is provided on either side of the trajectory (see FIG. 1A) by defining two angles which should not be exceeded. The deadband will permit effective demand control while avoiding excessive control activity as long as the projected tangent remains within the two limits MU and MV defined by such angles. The upper limit MU will represent the "decrease vector" and the lower limit MV of the deadband will represent the "increase vector" for control. Such deadband, preferably, is made variable throughout the period of control becoming smaller and smaller as the error calculation becomes more accurate while advancing into the demand period.

Figure 2:
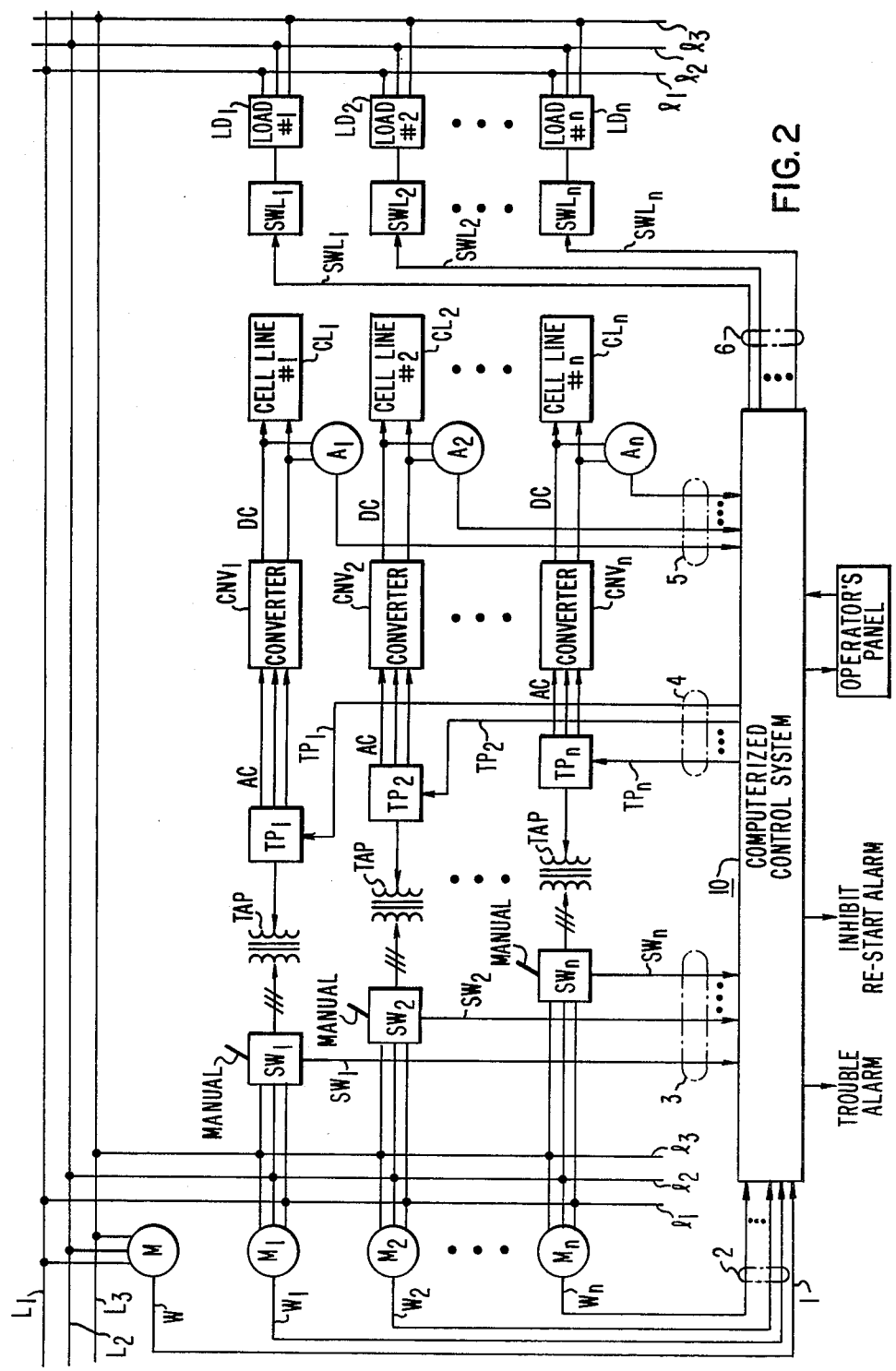
FIG. 2 is an overview of a plant including the computerized control system according to the invention.

Referring to FIG. 2 a plant facility is shown to include n cell lines $CL_1 \ldots CL_n$ of an electrolysis production system. The utility company lines $L_1, L_2, L_3$ supply energy via bus lines $l_1, l_2, l_3$ in the plant to individual transformers $T_1 \ldots T_n$ which have taps at their secondary. The tapped secondary output is fed in a corresponding converter ($CNV_1 \ldots CNV_n$) generating direct current on bus lines to the electrodes of the electrolytic cell line ($CL_1 \ldots CL_n$). The plant also includes loads such as $LD_1 \ldots LD_n$ which are energized from the main power lines $L_1, L_2, L_3$.

The main KWH meter M of the utility company is used to generate KWH pulses on line 1 as earlier stated. Individual wattmeters $M_1 \ldots M_n$ and amperemeters $A_1 \ldots A_n$ provide indication of the individual power consumptions and of the individual ampere consumptions, respectively.

The computerized control system 10, according to the present invention receives input signals: on line 1 from watthour meter M; on line 2 from $M_1 \ldots M_2$ indicating watts $W_1 \ldots W_n$; on line 5 from $A_1 \ldots A_n$ indicating the amperage $A_1, \ldots A_n$. It generates error signals in accordance with FIGS. 1A, 1B and 1C, and causes changes in the power rate of one or more of the cell lines $CL_1 \ldots CL_n$ in accordance with FIGS. 1B and 1C, by lines 4 carrying command signals to selected tap changers $TP_1 \ldots TP_n$. Also in accordance with general power demand control technique, the computerized control system 10 may cause certain loads such as $LD_1 \ldots LD_n$ to be switched ON or OFF by lines 6 which carry commands to switches $SWL_1 \ldots SWL_n$ of these loads.

Provision is also made in the system for protective Auto-Manual switching, ON or OFF, of any of the cell lines. Individual switches $SW_1 \ldots SW_n$ are thus inserted at the energy input to individual cell lines $CL_1 \ldots CL_n$. The system also receives from the operator the assigned demand limit DEM LIM which fixes the target C to be reached in each demand period as well as the Hi A and Lo A settings of the ampere limits mentioned earlier.

Figure 3:
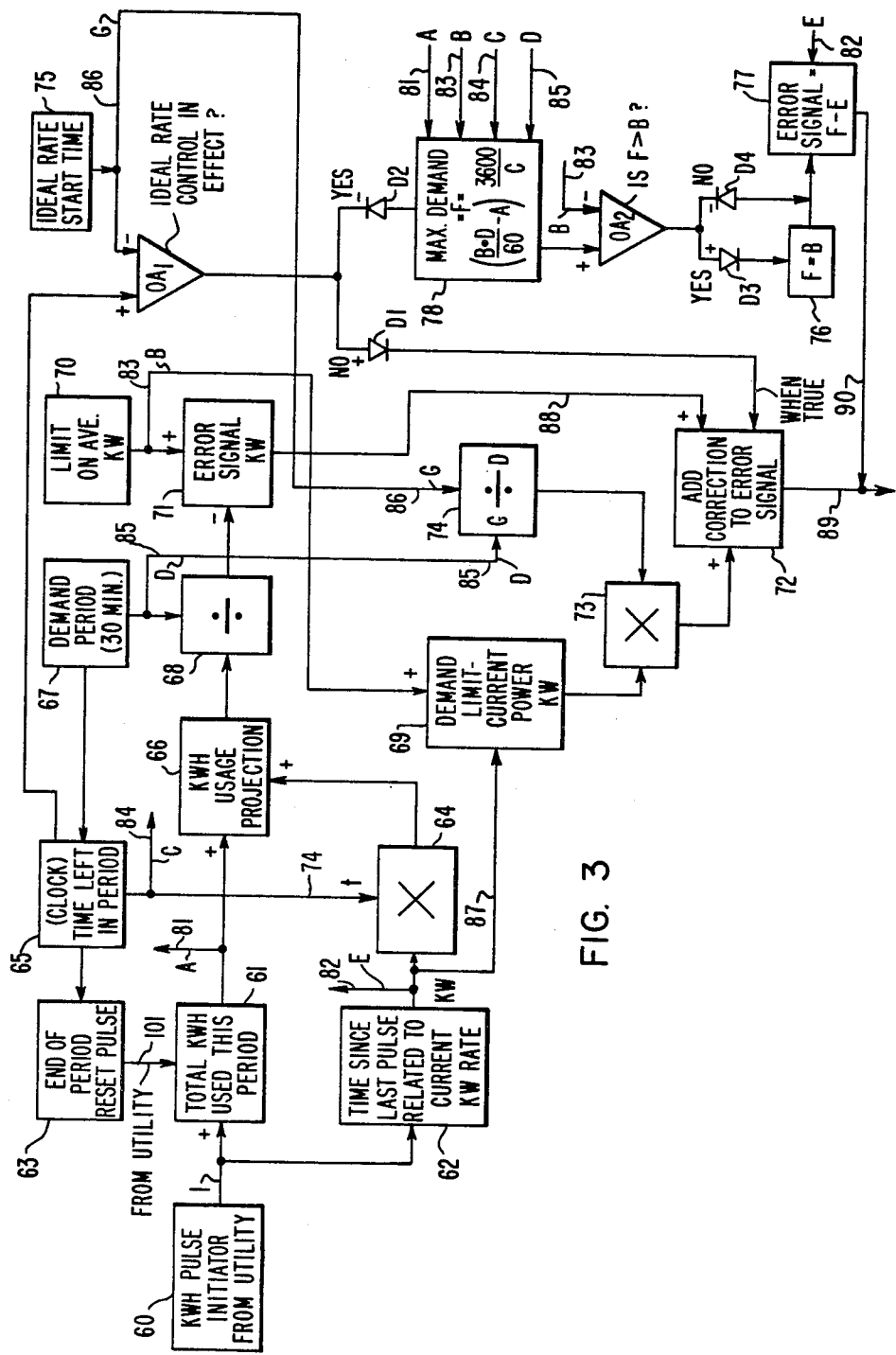
FIG. 3 is a circuit diagram illustrating the steps used in the generation of an error signal conditioning regulatory action with the computerized control system according to the invention.

The technique of power demand control of loads such as $CL_1 \ldots CL_2$ and $LD_1 \ldots LD_n$ is well known and explained at length in the aforementioned patent and patent application incorporated by reference. It will suffice to recall that in order to control the power demand by shedding or adding loads, the control system is responsive to the power consumption continuously recorded by the kilowatthour meter of the power supply company. Referring to FIG. 3, the computerized control system 10 receives over line 1 a KWH pulse which as a $\Delta t$ characterizes the consumption at any particular instant within the demand period. The power supply company also provides timers which by blocks 63, 65 and 67 determine the beginning and the end of each demand period, and the time left in the demand period. In the instant case it is assumed that each such demand period lasts 30 minutes. For each turn of the disc of the meter there is a pulse generated which will be hereinafter called "KWH pulse". The succession of these pulses represents on a time scale the energy consumed for one turn of the disc. The computer system, through its interrupt (contact closure input) unit, assesses the status of the status contact interrupts, and more generally, monitors all the input data fed into the computer system regarding the individual loads in the plant with their constraints, effectuates calculations, makes decisions which are converted, after each of the above-mentioned KWH pulses, into whatever load control action is necessary through the controlled operation of relays.

Included as part of the control system, is a computer system typically known as a W-2515 under its trade name. It can be a digital computer system, such as a Prodac 2000 (P2000) sold by Westinghouse Electric Corporation. A descriptive book entitled "Prodac 2000 Computers Systems Reference Manual" has been published in 1970 by Westinghouse Electric Corporation and made available for the purpose of describing in greater detail this computer system and its operation. The input systems, associated with the computer processor are well known and include a conventional contact closure input system to effectuate scanning of the contacts or other signals representing the status of the equipment. Also, operator controlled and other information input devices and systems are provided such as a teletypewriter. The contact closure output system is also conventional and part of the Prodac 2000 general purpose digital computer system sold.

The controller is a Westinghouse W2500 based minicomputer with between 32 and 64K 16 bit words. The inputs to the controller are:

| | |
|---|---|
| 1 | demand period reset pulse (on line 101 from circuit 63 of FIG. 3); |
| 1 | or more plant KWH pulsing meter (M); |
| 1 | individual KWH pulsing meter per cell line ($M_1 \ldots M_n$); |
| 1 | analog voltage signal ($A_1 \ldots A_n$) per cell line, the voltage representing the electrical current in the particular cell line ($CL_1 \ldots CL_n$); |
| 1 | or more Manual/Auto control switches. |

The outputs are:

| | |
|---|---|
| 1 | tap up contact per cell line |
| 1 | tap down contact per cell line |
| 1 | "controller in manual" contact |
| 1 | "trouble" alarm contact |
| 1 | "inhibit start" alarm contact |

The computer system used in the control system according to the invention includes both Hardware and Software. For instance, the interrupt unit is associated with an interrupt handler. Software is being used as a convenient means of quickly and efficiently performing operations as required in monitoring data, doing calculations, making decisions and translating treatment of information into control action within the short time intervals determined by the recurrent transmission of KWH pulses from the power supply company meter.

It is observed that the inputs consist of interrupts (internally generated via frequently scanned CCI's or external EI's) which are successively handled by the process interrupt handler. One interrupt will receive the 48 V DC pulse generated by the external clock and is used to reset the associated registers in the computer when it is received. Another interrupt will receive a train of 48 V DC pulses transmitted by the meter, each pulse representing KWH consumed. Another interrupt could be reserved for a second KWH meter if needed. Three other interrupts could be used to receive a status which corresponds to the status of one load contact in the plant and belongs to one group of three associated with one scan contact output.

The normal operator interface with the system will be via a CRT. A log of system performance could also be provided together with any other messages that may be required. Via the CRT keyboard the operator will also be able to change the values of various constants relating to the system as a whole or to individual items of equipment. The time and date and on-peak and off-peak demand levels can also be changed using the same keyboard.

In response to a clock pulse the program puts out data to be printed out for the preceding demand period. All registers are initially cleared in which accumulated values are stored including time into period and KWH during the period. Prorated values of time and KWH are stored in those registers when the KWH pulse does not coincide with the clock pulse.

The plant and each cell line is checked for faulty KWH or KA metering, trip or other unusual condition. Parts or all of the control may be suspended and the trouble alarm activated under these circumstances. If any cell line is found to be out of prescribed limits, the system adjusts the cell by tapping in order to bring the load within limits.

A KW error signal ERR is calculated (circuit 71 of FIG. 3) from the time between KWH meter pulses by predicting the energy usage at the end of the demand period assuming the rate remains constant from that time on.

The demand period is divided into four sections (not necessarily equally). A deadband, CD, and a hysteresis, H, are provided which are used during four successive control fields as follows:

| FIELD | CONTROL |
|-------|---------|
| 1 | None |
| 2 | Start when error > deadband C D, Stop when error < (CD-H). The deadband CD is made variable during the field of control. |
| 3 | Same as (2) but CD is no longer variable. Adjustment is made by tapping one step down whenever the error is above the demand limit. |
| 4 | Ideal rate control. The error signal is made equal to the demand limit minus the present KW drawn. |

As earlier mentioned, ideal rate control serves to minimize tap changes over the long run.

The cell lines are classified in accordance with a priority schedule set by the operator into the cell line control system 10. Limits are set on the amperage (KA) which is drawn by the particular cell line. Cell line control is responsive to an individual KWH meter and an analog input derived from an individual ampere meter. Each tap move is estimated from the previous tap change and its effects as increments $\Delta KW$ and $\Delta KA$ on KW and KA. These estimations are done after the tap has had time to settle into position.

The controller periodically checks whether taps need to be moved to control demand. If movement is required, the lowest priority cell line will be moved first as far as possible toward its limit. If not enough compensation can be made by this line, the next priority line will begin moving simultaneously. Each control period moves only one tap per cell line. The next control period re-calculates errors from the start, including new estimates of KW/TAP and KA/TAP. The object is to choose the minimum change between the necessary tap changes to control the KW and those possible within the KA limit. When not enough of the expected control is available with one cell line, the next cell line in the order of priority is used.

Figure 4:
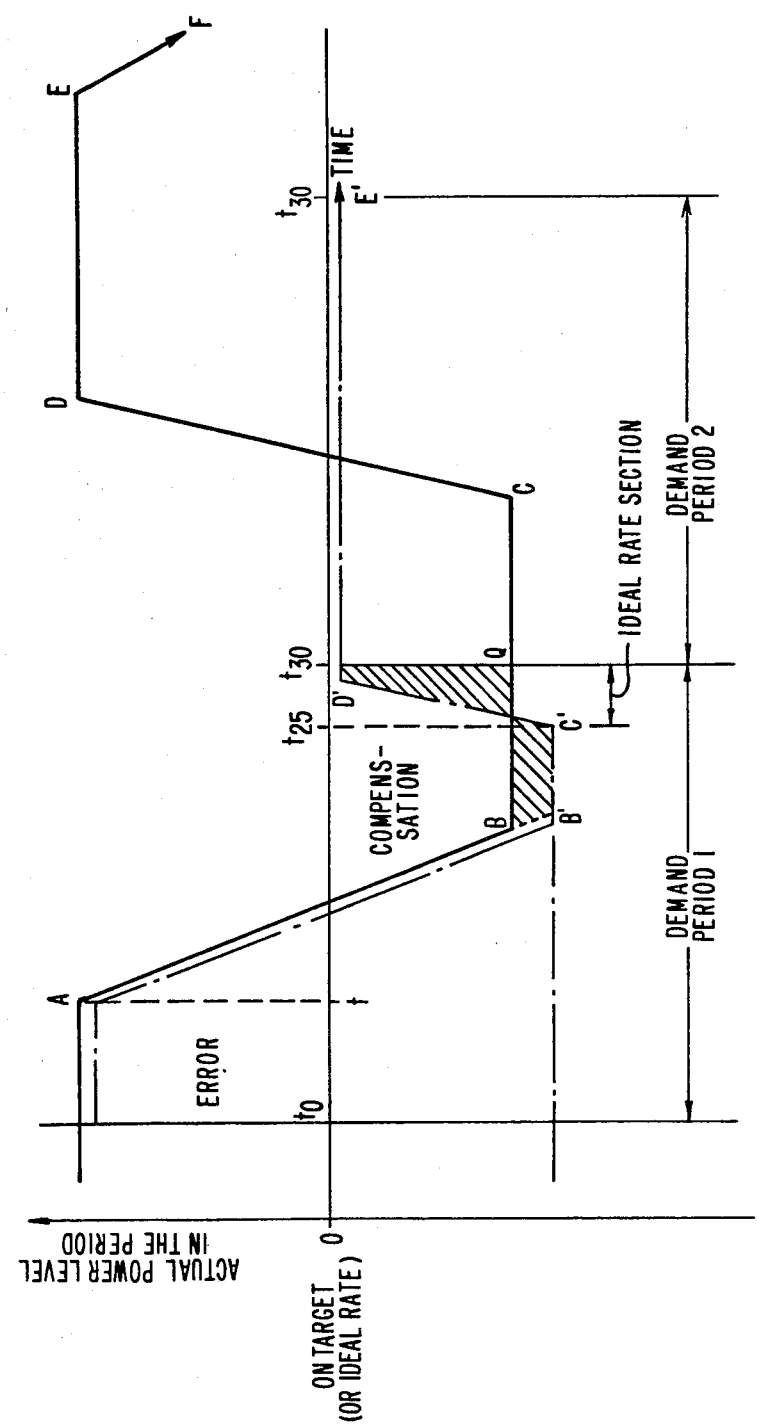
FIG. 4 shows how, by tap changing, the system is brought to operate under the ideal rate of consumption toward the end of the demand period, in accordance with the present invention.

The invention will now be described in detail by reference to FIGS. 3, 5 and 6 which indicate in block diagram form how the energy management control system performs the required control steps, by reference to FIG. 4 illustrating the effect of tap changing in bringing the system to operate in the ideal rate, and by reference to FIGS. 7A–7G, which are flow charts characterizing the computer process in all modes of operation which are material to the present invention.

ERROR SIGNAL GENERATION

The generation of the error signal in the field of control of the demand period will first be explained by reference to FIGS. 1B, 1C, 3 and 4. FIG. 1B shows the ideal rate line OT which the system attempts to reach from demand period to demand period and where it would stay when the electrolytic cell lines $CL_1 \ldots CL_n$ consume the right current and in the absence of any major disturbance from the overall demand in the plant. Thus, no control would be necessary since the ideal rate will automatically lead, within the deadband allowance, to the assigned demand limit or target T at the end of each demand period. However, due to discrepancies in the cell lines, or to other loads in the plant, like $LD_1 \ldots LD_n$ in FIG. 2, the operative point at time t is at $M_t$ rather than at m on the IR characteristic. FIG. 3 shows circuitry which leads to bringing M back on the ideal rate line OT before reaching the target T. A first correction in the power rate is effected at time t in order to bring, as illustrated in FIG. 1B, the operative point to $M_{IR}$ which is typically the ideal rate point at time 25 minutes, e.g. 5 minutes before the end of the demand period, thereby changing the power rate of point $M_t$ from MW to $MM_{IR}$. A second correction is effected when point $M_{IR}$ has been reached. At this point, as illustrated in FIG. 1C, the power rate is changed to become the ideal rate slope OT, so that, from $M_{IR}$ on, the system follows $M_{IR}T$ to the target. Thus, the system according to the invention provides a first adjustment at $M_t$ followed by a second adjustment at $M_{IR}$.

It is noted, however, that the system provides for power demand control concurrently with cell line control. An error between MW and MT is detected which will amount to TW in KWH, short of the target at the end of the period. Demand control by the technique known and described in the U.S. Pat. No. 3,872,286 of R. Putman, or in the U.S. Pat. No. 4,204,127 of W. C. Carter, when applied alone would bring the operative point at the target T via line MT. It is to a such control action that the present invention applies the two above-mentioned successive control actions, first at $M_t$, to follow M $M_{IR}$, secondly at $M_{IR}$, to follow $M_{IR}T$.

Considering now FIG. 4, the power level in the period when the operative point is at $M_t$, namely time t in the period, is shown by a horizontal line passing by point A, which represents a constant level relative to the target. If $M_t$ is on target the level is zero. The error is thus the area under the level A. In order to nullify this error, control of the power rate of the cell lines—in the absence of any external disturbance—would conventionally consist in bringing progressively the consumption below the horizontal axis and as far as the level B so that within the period the two areas above and below the axis be equal. The same process during the subsequent period CD will keep the overall consumption from demand period to demand period on the required target. In accordance with the present invention, however, control is extended beyond AB down to B' by artificially changing the error to obtain the compensation level B'. After following the power rate B' until the instant marking 5 minutes before the end of the demand period, namely at C', a second control action brings the actual consumption to a demand limit level D' which is close to the target level at the end of the demand period. Therefore, with the subsequent demand period the ideal rate being reached (which is shown in FIG. 1B by a new line IR' effectively followed by $M_t$) no control is necessary (D', E' on FIG. 4).

The generation of an error signal under demand control, and the corrections to effectuate control in two steps at such operative points like $M_t$ and $M_{IR}$, will now be explained by reference to FIGS. 1B, 1C and 3 while keeping in mind FIG. 4.

Referring to FIG. 3, the kilowatthour meter of the utility company provides at 60 a KWH pulse which is received at 61 and at 62. At 61 the kilowatthours consumed A since the beginning of the demand period are totalized continuously and outputted on line 81. The total is reset to zero by 63 at the end of the demand period in response to the total count of counter 67 counting D=30 minutes (illustratively) and to a clock signal from 65 counting C (in seconds)=the time left in the period. Circuit 62 derives from the KWH meter the time Δt which between two pulses indicates how many kilowatts are being used by the plant. Thus, the present power $P_t$, or slope E at the operative point $M_t$ of FIGS. 1A, 1B, 1C, is outputted by circuit 62. This output, or power consumed $P_t$ at time t, is at 64 multiplied by C the time left in the period, known from circuit 65, in order to indicate the amount of KWH predicted to be used in the time left. This amount from 64 is added to the KWH already consumed of circuit 61, thereby deriving at 66 the predicted KWH amount due to MW (FIGS. 1A, 1B) the projection of the tangent at $M_t$ to the end of the period. The average is derived by dividing at 68 by the demand period D. TW, the error ERR from the target is the difference between the KWH demand limit (B of circuit 70) and the output of circuit 68. In order to make power demand control in response to such error compatible with the intended cell line control according to the present invention, both the KWH demand limit (ordinate of T on FIGS. 1A, 1B) and the expected demand (ordinate of W on FIGS. 1A, 1B if MW of FIG. 1B were made to follow MT) are converted into units of average power in the demand period. Accordingly, the expected energy consumption given at the output of circuit 66 is in circuit 68 divided by the demand period D (Dem Per) and subtracted in circuit 71 from the KWH limit at the target directly given by circuit 70 as a limit on average power. The output of circuit 71 is the power demand control error, ERR e.g. the expected demand error caused by the angle between MT and MW on FIG. 1B. Since, according to the present invention, cell line control should bring the slope of the power rate at $M_t$ from MW to $M_{IR}$, rather than MT, cell line adjustment due to the error of circuit 71 will be replaced by cell line adjustment in response to a new error obtained by a modification of the demand control error of circuit 71. Such modification is determined by the aforementioned condition that when time will be 25 minutes, the power point should be at $M_{IR}$.

The error predicted (ERR at 71) under power demand control (e.g. along MT) is the Demand Limit (DEM LIM at 70) less the sum of the current energy usage (A at 81) and the consumption in the time left (C at 84) at the present power rate (E at 82 or 87).

In order to change MT to $MM_{IR}$, the system takes into account the fact that during the last 5 minutes, the ideal rate will be consumed rather than 5 minutes at the present rate. The error should then be reduced by the latter amount and increased by the former amount. Since the ideal rate is Demand Limit/Demand Period followed during 5 minutes (or D from 77 and G from 75), the correction is as calculated by 73; (Demand Limit-PW)×G/D. The output of multiplier 73 is the correction applied by circuit 72 to the error ERR of circuit 71 in order to effect via line 89 the required target change during the first phase of control.

In order to determine when time instant t=25 minutes has been reached within the period, operational amplifier $OA_1$, used as a comparator, detects when the time left C from circuit 65 has become equal to 5 minutes, or rather 5×60 seconds. At such time by diode $D_2$ the circuit 78 is enabled while, due to diode $D_1$, circuit 72 is disabled. Circuit 78 is responsive to value A from circuit 61 (on line 81), to value B from circuit 70 (on line 83), to value C from circuit 65 (on line 84), and to value D from circuit 67 (on line 85). Circuit 78 computes the slope of $M_1T$, or $M_2T$, of FIG. 1C by the formula:

$$F = \left( \frac{B \times D}{60} - A \right) \frac{3600}{C}$$

Referring to FIG. 1C, this formula first expresses that the amount of energy left to consume to go to the target T is the target amount (namely the slope B of OT at ideal rate multiplied by D the demand period) less the amount of energy consumed at $M_1$ (or $M_2$), e.g. A as derived from circuit 61 on line 81, once operational amplifier $OA_1$ has flipped over (t=25 minutes). Moreover, the slope $M_1T$ (or $M_2T$) is determined by dividing the KWH amount by the time, namely C (5 minutes, or rather 5×60 seconds in the instance of FIG. 1C) as derived from line 84. It is realized that while the ideal rate slope B is desired from $M_1$, $M_2$ or $M_{IR}$ to T, so that the system emerges at the beginning of the next period with the ideal rate IR′, if $M_t$ is at $M_1$, e.g. above $M_{IR}$, the slope B would overshoot the target. To prevent this eventuality, the system tests whether $M_t$ is above or below $M_{IR}$ by comparing F to the ideal rate slope B. This is done by operational amplifier $OA_2$. If F<B, by diode $D_4$, the system gives up the ideal rate slope expectation, and follows $M_1T$. If F>B, e.g. below at $M_2$, the choice by diode $D_3$ is to follow the ideal rate B, thereby ending at $D_E$ below the target. Correction of the power rate is by line 90 to compensate for the angle between the present slope E (derived from circuit 62 and line 82) and $M_1T$ (if diode $D_4$ controls), or $M_2D_E$ (if diode $D_3$ controls).

In conclusion, during the first phase of control, by line 89 for any point $M_t$ before reaching $M_{IR}$ vector MW is forced to orientate itself toward $M_{IR}$. Thus, at any instant of decision during the field of control ab within the demand period, e.g. every minute, due to control by line 89 vector MW is constantly oriented toward a point $M_{IR}$ situated on the ideal rate line (t=25 minutes). A second phase of control takes place at time t=b (when t=25 minutes is reached). Cell line control is via line 90, in this second phase. The power rate is altered by control of the cell lines so as to follow substantially the ideal rate along line $M_{IR}T$ to the target.

How the error signal of line 89, or line 90, is used to alter the consumption of the cell lines $CL_1 \ldots CL_n$ will now be explained by reference to FIGS. 5 and 6.

CELL SELECTION AND TAP CONTROL FOR ENERGY MANAGEMENT

Figure 5:
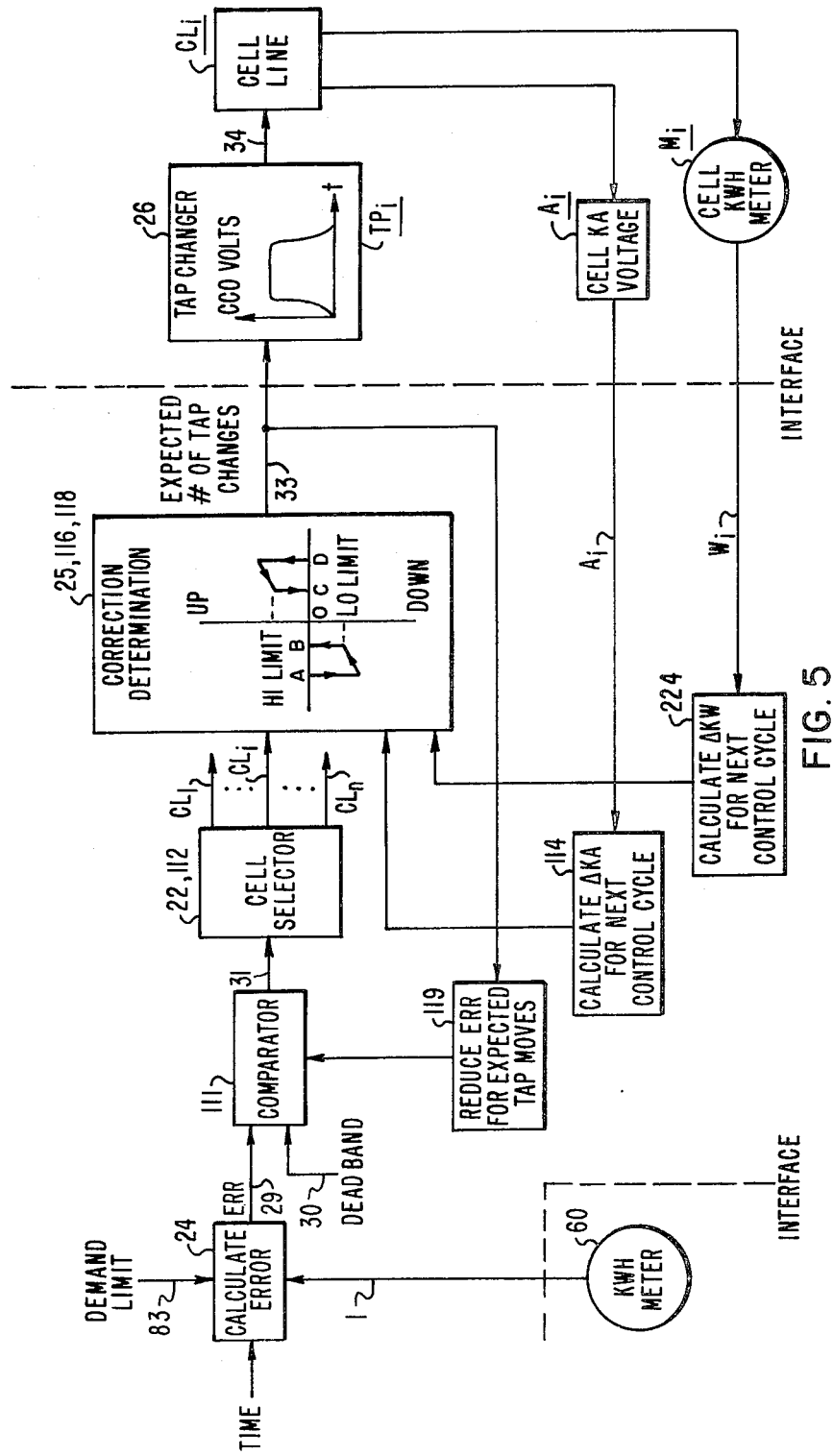
FIG. 5 illustrates in diagram form the method of controlling the tap of the individual transformer of a particular cell line.

Referring to FIG. 5, the KWH meter is used by circuit 24 to calculate the projected demand and derive the error signal which may be as derived on line 89 or 90 of FIG. 3. The error signal ERR on line 29 is compared by comparator circuit 111 to the deadband. The decision is whether |ERR|≧DEADBAND? If yes, cell selector (22, 112) selects cell $CL_i$ in accordance with the order established by the operator. Each cell line $CL_1 \ldots CL_n$ has a watt meter $W_1 \ldots W_n$ and an amperemeter $A_1 \ldots A_n$ providing values such as $W_i$, $A_i$ for cell line $CL_i$, as shown. A correction determination circuit (25, 116, 118) which is also part of the cell line control circuit 10 has a transfer function as shown in block (25, 116, 118). Adaptive priority in response to the correction determination circuit 24 for the selected cell line CL$_i$ (in accordance with line 31) is effected via tap changer TP$_i$ on the taps of the associated transformer T$_i$ in accordance with the expected number of tap moves given by the correction determination circuit. The transfer function is characterized by deadbands A and D and hysteresis B and C in the up tapping as well as in the down tapping direction about the target symbolized by the horizontal axis. Once the tap begins moving, the deadband A or D is reduced temporarily to B or C until the error lies again within the new band, and movement ceases. This new deadband is called hysteresis. Thus, for upward tapping there is no control until the error of line 29 reaches the magnitude OD and the deadband is immediately reduced to OC. This avoids controls back and forth about the same operative point. The deadband is made variable by reducing OD, or OA at each control stage during the demand period. As the period proceeds, more past history is used relative to current rate projections in estimating whether the projection overshoots or undershoots the target at the end of the period. This makes the error calculation by circuit 24 more stable towards the end of the period, giving a slower response to short perturbations in the demand. By reducing the deadband, more accurate control to target is possible without increasing the number of tap changes unnecessarily.

FIG. 5 shows across the interface, between the computer system 10 and the hardware, the tap changer TP$_i$ (26) with its control characteristic.

A problem has to be solved, however, when tapping a cell line. The number of taps available to get so many kilowatts required by the correction determination circuit should be effective without exceeding a maximum and a minimum ampere magnitude permissible with the cell line. In order to keep all cell lines within their designated kiloampere operating limits (Hi A and Lo A), upon each control cycle the computer will immediately begin moving any lines found to be out of limits and compensate the error signal. It will then compare the number of tap changes required e.g. necessary for demand control with the number of taps available up to the limit for each cell line by priority e.g. possible taps. The minimum between these two numbers is taken as the probable control available from that line. If more is necessary, the next priority line is similarily tested. This procedure is repeated until the error signal is expected to be reduced below the hysteresis deadband point. By allowing more than one cell line to change at any control period (1 minute apart), the controller is responsive to large error signals. Thus, it responds slowly to noise within the deadband, but quickly to larger perturbations outside the deadband.

Since there is a 30% difference in the change of KW and KA for tap moves high or low in the operating band, it is necessary to approximate the expected changes by the observed value of the previous change. Before any tap move is made, the current value of the cell line's power W$_i$ and amperage A$_i$ are saved. After the move, the new values are subtracted for an estimate of the changes when taps are moved again in either direction. Therefore, in response to a previous A$_i$, circuit 114 calculates the increment $\Delta$KA for the reset control cycle, and in response to the previous W$_i$, circuit 224 calculates the increment $\Delta$KW for the next control cycle. These $\Delta$KA and $\Delta$KW are used by the correction determination circuit (26,116,148) in ascertaining the necessary and possible number of taps which lead to a definite number on line 33. After each tap move, circuit 119 reduces the error according to the expected tap moves so that comparator 31 can proceed with the left over, either on the same cell, or an another cell, through cell selector (22,112).

Figure 6:
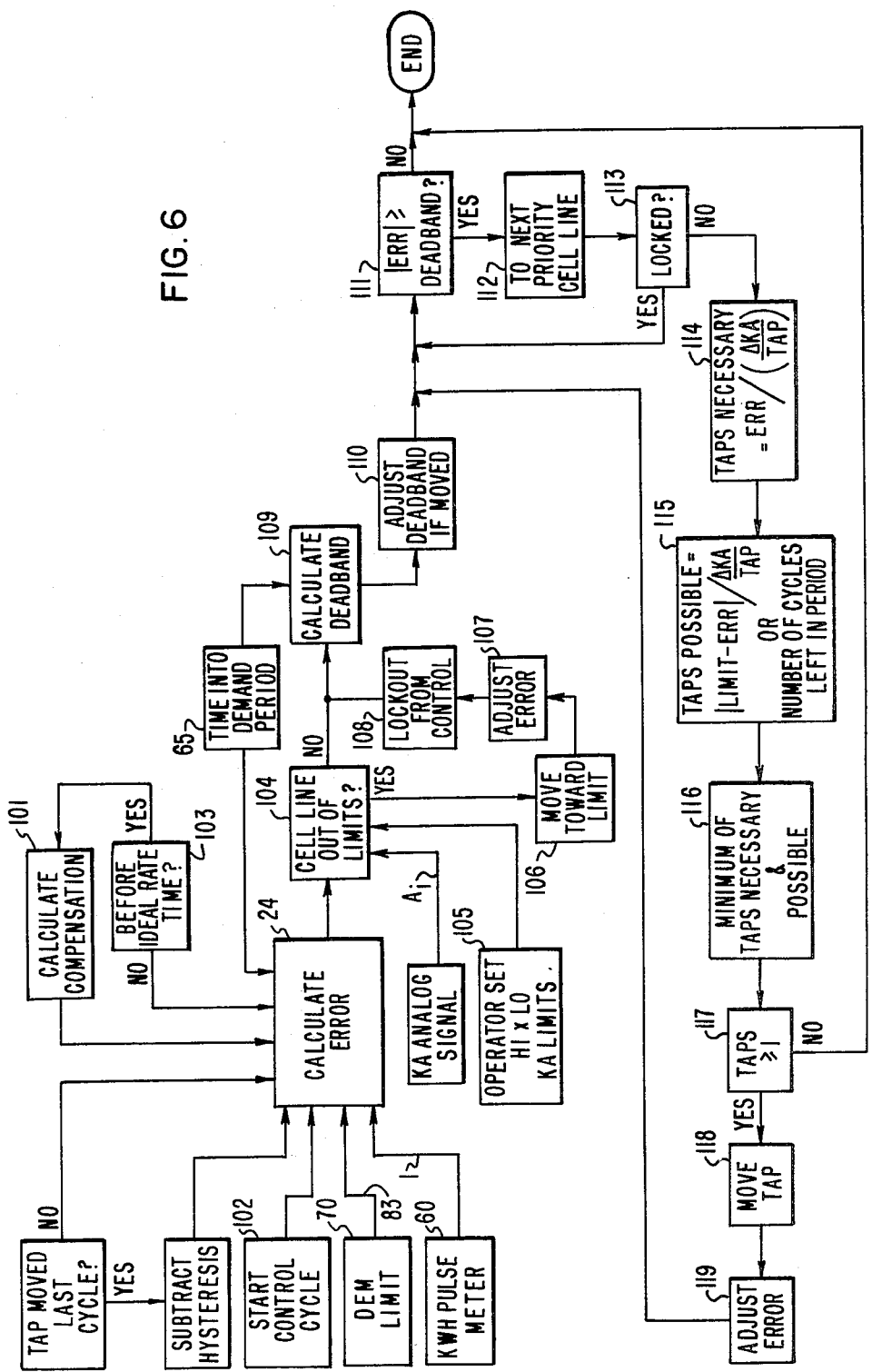
FIG. 6 is a diagram illustrating tap and deadband control for a selected individual cell line with the computerized control system according to the present invention.

Referring to FIG. 6 the overall control operation is schematically shown in block diagram.

The error determination circuit 24 is shown to respond to DEM LIM of circuit 70, to the KWH pulse meter 60 upon the start of a control cycle (circuit 102) in accordance with the time into the demand period (65) like in FIG. 3. Also, like in FIG. 3, the compensation of the error by circuits 69, 73, 74 and 72 for the first phase of control leading to line 89, and the adjustment by circuits 78, 76 and 77 for the second phase of control leading to line 90, are included in circuit 24. Circuit 101 provides for the adjustment when circuit 103 indicates t=25, e.g. a 5 minute time interval before the end of the demand period has been reached. From circuit 24, the control signal (of lines 89 or 90 in the circuit of FIG. 3) goes to the determination at 104 whether the cell line in question is within or outside the ampere limits HiKA and LoKA set by the operator at 105. If the cell line is out of limits, the system by 106 moves the tap to reach the limit, and at 107 the error is adjusted accordingly. By 108 the tap changer is locked out from control. If the cell line is within the limits, from 104 the system goes to 109 where in accordance with the time left in the demand period (65) the deadband is established, while it is assumed that it is progressively reduced in the demand period. Then, at 110 the deadband is adjusted to provide the hysteresis (OC or OB in FIG. 5) if taps have been moved in the previous control cycle.

At this point, a determination is made, at 111, whether the |ERR| exceeds the deadband. If the error is smaller than the deadband no control is made. Otherwise, the system goes to 112, e.g. for the determination of the cell line which is next as priority cell line. If it is locked at 113 the operation is not successful with this cell line and the loop looks for another cell line. If the cell line is not locked, the system establishes how many taps are necessary within the error ERR. To this effect, the individual meter provides for every change. If a tap is changed, this is translated into ($\Delta$KA) the amount of KW ($\Delta$KW) generated or taken away in the system, and such present change is taken as an indication for the next move. Accordingly, the system knows how many taps are left for correction and how many taps are necessary to effectuate the correction of the error |ERR|.

On the other hand, the limits HiKA and LoKA are limitations to such corrective moves. Therefore, at 115 is established what is the number of taps possible by the formula |LIMIT-ERR| /$\Delta$KA/TAP. The number of taps possible may be also limited by the number of control cycles left in the period. This determination is also made at 115.

Then at 116 the minimum between the taps necessary of 114 and the taps possible of 115 is recognized to ascertain the number of taps expected to be moved. Although at 117 the possibility that a tap move be not an integer is taken into account by the evaluation "TAPS$\geq$1?" If yes, the tap decision to move the tap by so many steps is taken at 118. For each move the error is adjusted to take into account the operation, and the system goes back to 111 for assuming the possibility of further control by 111, and so on.

The overall operation of the computerized control system according to the invention will now be reviewed from a consideration of the flow charts of FIGS. 7A-7G.

FLOW CHARTS

Figure 7B:
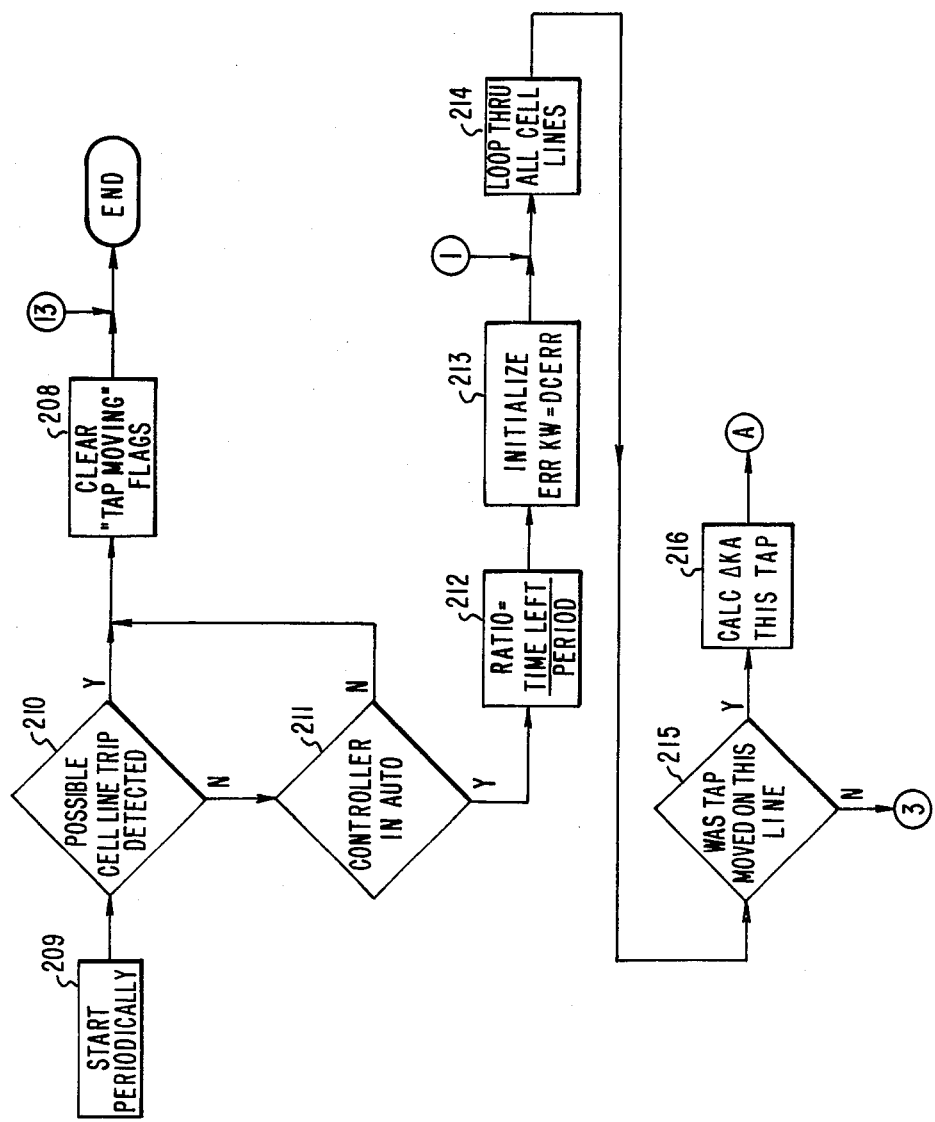

FIGS. 7A-7G illustrate the operative steps under power demand control and cell line control according to the present invention. FIG. 7A is a condensed representation of the operations of the circuit of FIG. 3. Starting at 200 the system calculates at 201 the demand error DCERR by establishing:

DCERR=Demand Limit−(KWH used this period+present kwt33 time left)/demand period, which is the demand control process leading to circuit 71 of FIG. 3. Then, at 202, the question is like with comparator $OA_1$ of FIG. 3 "whether ideal rate control (at $M_{IR}$ and at time set=5 minutes from the end, in the example) is in effect?" If the answer is NO, the system proceeds at 203 by calculating a correction by adding to DCERR the expression: (DEM LIM−Present KW)×ideal rate time/DEM PER. This compensation yields the corrected error at line 89 of FIG. 3.

If the answer is YES, the system goes to 204 where the maximum possible kilowatt demand possible is calculated with the expression:

$$\left( DEM\ LIM \times \frac{DEM\ PER}{60} - KWH\ used \right) \times \frac{3600}{TIME\ LEFT}$$

This is like circuit 78 of FIG. 3. Then, like at $OA_2$ in FIG. 3, the system compares the slopes characterized by the actual demand of KW and DEM LIM. If it does not exceed DEM LIM (by $D_4$ in FIG. 3) the error to be compensated is (DCERR=XDEM−Present KW) at 206, with the result outputted via 90 (like from circuit 77 of FIG. 3). If, however, DEM LIM is exceeded at 205, the system sets XDEM at DEM LIM and uses B-E instead of F-E to be outputted by circuit 77 of FIG. 3, or at 90 from 206 in FIG. 7A.

FIG. 7B relates to cell line selection. While this subroutine is periodically started at 209, the question at 210 is whether trip of a possible cell line is detected. If yes, then at 204 the decision is to clear the "tap moving" flags. This ends the chain. If at 210 the answer is NO, at 211 is ascertained whether the controller is on "Auto". If NO is the answer, the system returns to 214. If YES, the ratio of the time left to the period is determined at 212, then ERRKW=DCERR is initialized at 213 which leads to a loop through all cell lines at 214. For the selected cell line at 215 the question becomes "whether the tap was moved in the previous control cycle on this cell line 8". If yes, the $\Delta KA$ is calculated for this tap move, and the system goes to the chain of FIG. 7C.

Figure 7C:
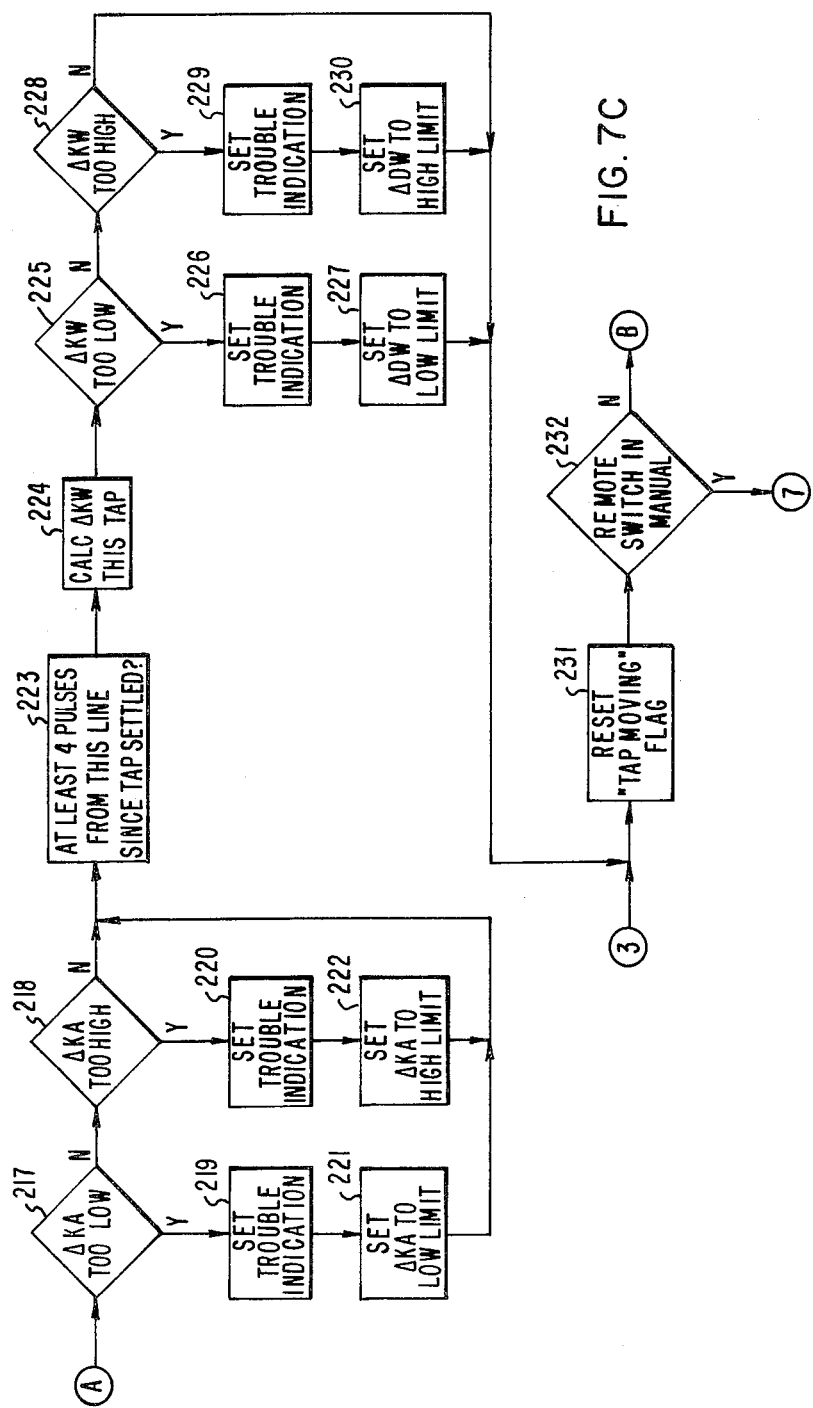
Figure 7D:
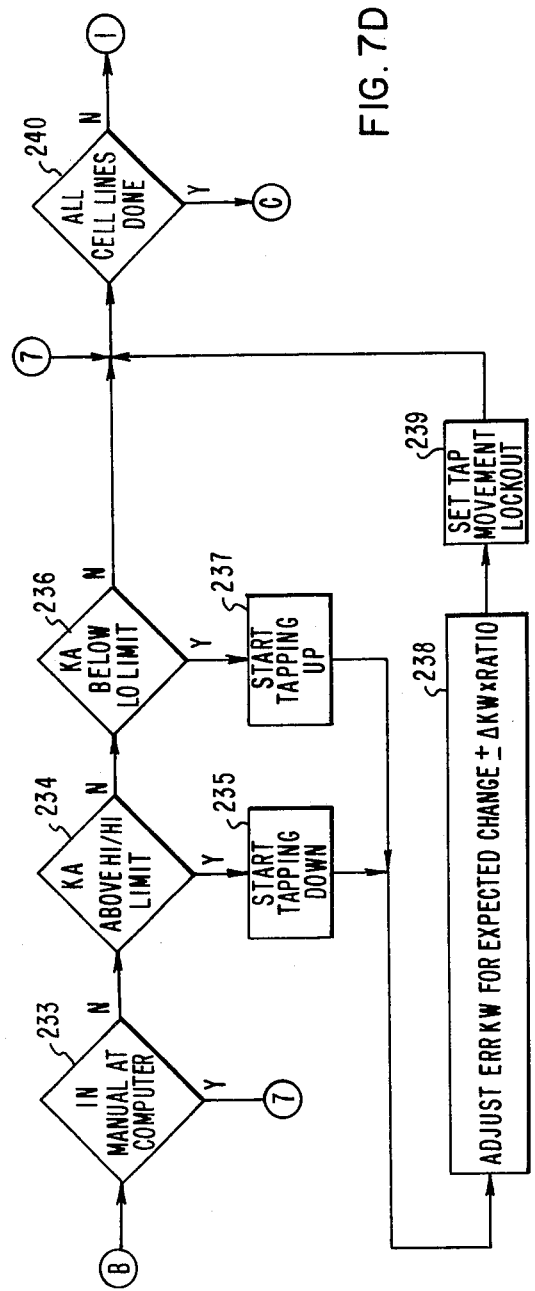

FIG. 7C starts with two questions: whether the change $\Delta A$ of current due to the move is too low (at 217) or too high (at 218). If yes at either one, by 219, or 220, an indication of the trouble is set and by 221, or 222 the change of current $\Delta KA$ is set to the low limit (Lo$\Delta KA$) at 221, or to the high limit (Hi$\Delta KA$) at 222, in the second instance. Thereafter, the system goes to 223 where at least four pulses are counted from the particular cell line after the taps settle in order that the KWH pulses come to a steady state. At 224 the $\Delta KW$ resulting from the tap move is calculated. If it is found too low at 225, trouble indication is set at 226, while at 227 $\Delta KW$ is set to the low limit. If it is found too high (at 228) steps are taken at 229 and 230 which are similar to steps 226, 227. Then, the system goes to 231 where the "tap moving" flag is reset, and the remote switch is checked at 232 to see whether it is "Manual", upon which the system asks (at 240 in FIG. 7D) whether all cell lines are done. If it is "Auto", the system goes to 233 in FIG. 7D, where the question is whether the AUTO/MANUAL is in "Manual" at the computer end. If so, all blocks are bypassed up to 240. If NO, the system checks at 234 whether KA is above the Hi/Hi limit, or at 236 whether KA is below the low limit. In the first instance, the system starts tapping down at 235. In the second instance, the system starts tapping up. Consequently at 238 adjustment is made correlatively to such tap moves in terms of the ERRKW error signal for the change in $\Delta KW$ (positive or negative) and at 239 the tap movement lockout is set. Then, when all cell lines are done, the system enters the chain of FIG. 7E.

Figure 7E:
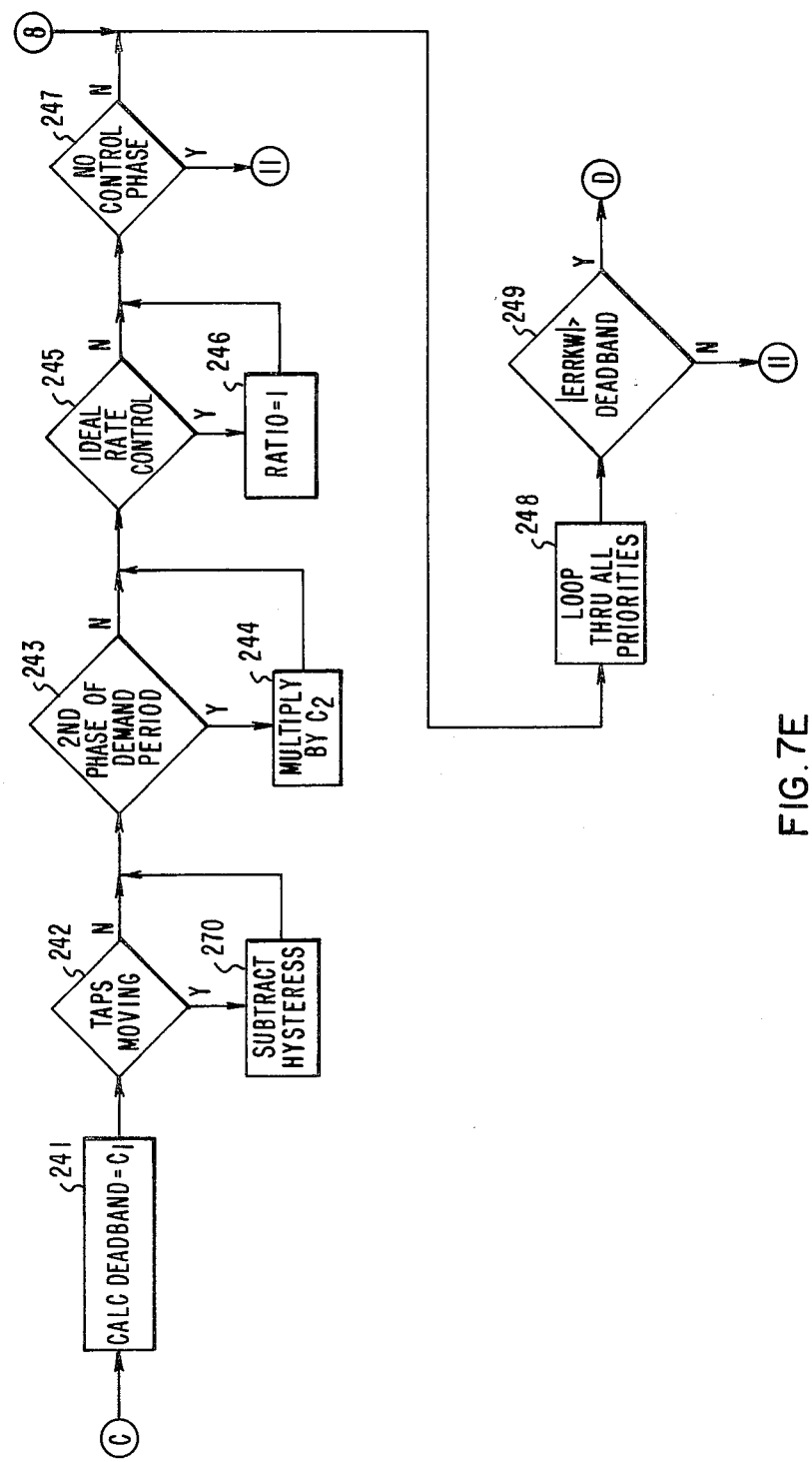

FIG. 7E shows the deadband effect on cell line control. In a first position of the field of control, a deadband constant $C_1$ is calculated at 241. If (at 242) the taps are moving, the hysteresis is subtracted at 270. If Not, the system goes directly from 242, as well as from 270 in the alternative, to 243 where the determination is made whether operation is for the second position of the field of control. If YES, a deadband constant $C_2$ is used and applied at 244. If No from 243 or if Yes through 244, the system goes to 245 for a check "whether in the ideal rate control phase of the demand period?" If YES, at 246, the ratio is made equal to 1. If No, the system goes directly to 247 where is ascertained "whether in the no control phase or not?" If YES at 247, the system goes to 269 for "save permissive status" and "output tap changes" at 268 in FIG. 7G. If NO, at 248 all priorities are scanned through and at 249 the comparison |ERRKW|>Deadband is made. If the answer is YES the system goes to the entry of the chain of FIG. 7F; if NO, the way is again at the entry of 269 in FIG. 7G.

Figure 7F:
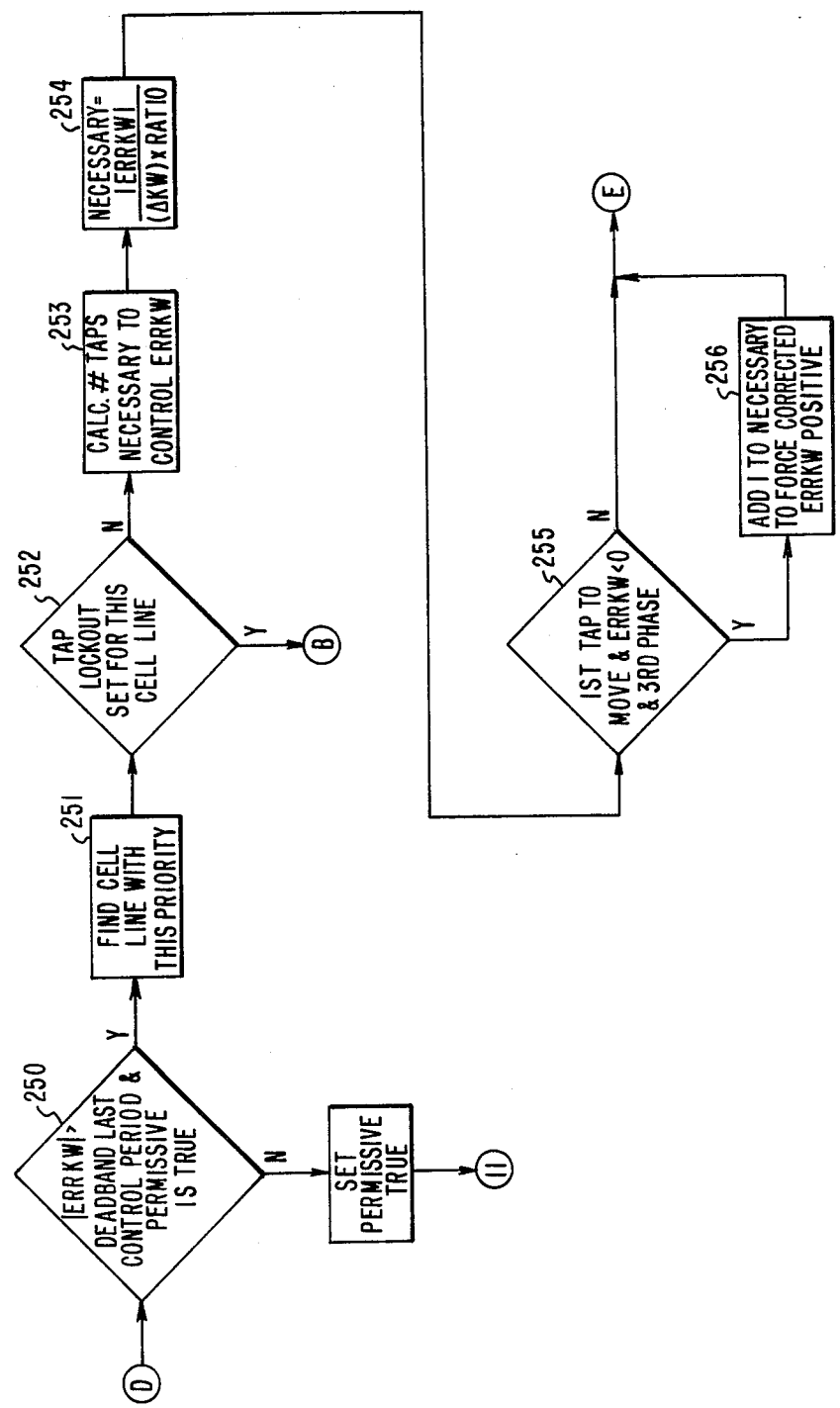
Figure 7G:
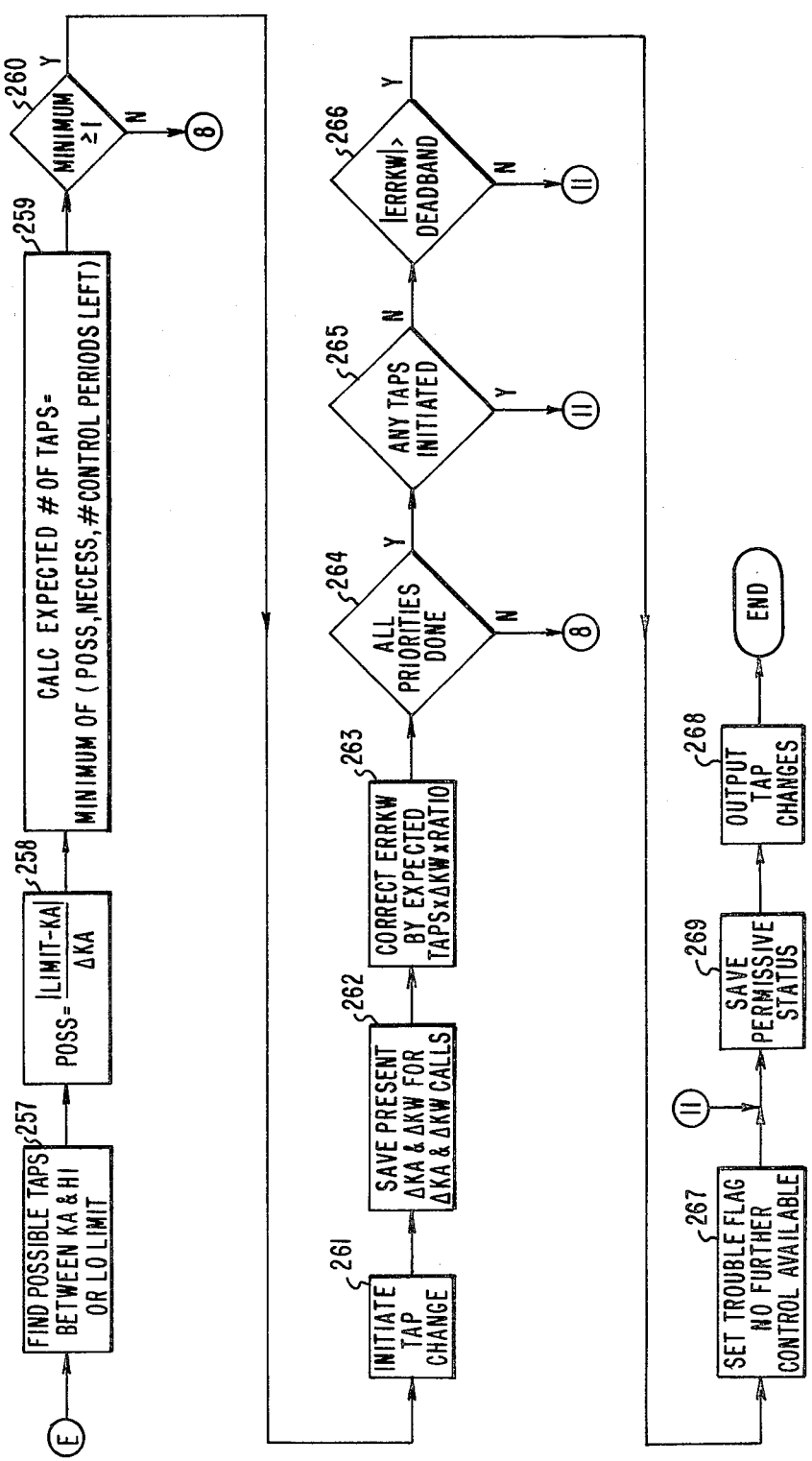

Referring to FIG. 7F, at 250 the question is whether |ERRKW|>Deadband was achieved at the last control period and control was permissive. If No at 250, "permissive time" is set and the system goes to 269 (FIG. 7G). If YES, the search is at 251 for a cell line with this priority, and at 252 is checked whether the tap lockout has been set for such cell line. If YES at 252, there is a return to the entry of FIG. 7D. If NO, the system calculates at 253 the number of taps necessary to compensate for the error ERRKW. Then at 254, the necessary number of taps is found by relating |ERRKW| to the ($\Delta KW$)×Ratio, following which, at 255, is ascertained "whether it is the first tap to move" and "whether ERRKW is negative" and "whether control is in the third phase." If the answer is YES, one tap is added to the number of necessary taps so as to force the compensated ERRKW positive. If the answer is NO to 255, as well as after 256, the system goes to the entry of the chain of FIG. 7G where at 257, the number of possible taps is sought for KA between Hi and Lo limit. Then at 258 the number of taps possible is calculated by |Limit-KA|/KA and at 259 the number of taps which is the lowest between the necessary and possible taps is found, when there is a number of control periods left. This is followed at 260 by the determination whether such minimum number of taps is $\geq 1$. If NO, there is a return to 248 on FIG. 7E. If YES, at 261 tap change is initiated, while at 262 the present $\Delta KA$ and $\Delta KW$ are saved for the following ΔKA and ΔKW calculations. At 263 ERRKW is corrected by the expected ΔKW×Ratio adjustment with the taps. Then, at 264 is checked whether all priorities are done. If No, there is a return to 248 of FIG. 7E. If YES, at 264, the question becomes, at 265, "whether any taps are initiated." A YES goes to 269. A NO passes first through the test whether |ERRKW| > Deadband since control is necessary. Then (by 267) the trouble flag is set indicating no further control is available. If NO, 267 is by-passed. The flow chart ends by 268 for "output tap changes", after saving "permissive status" at 269.

PROTECTION AND DIAGNOSTIC

The philosophy adapted is: "No control is better than erroneous control." Therefore, protection is provided for three types of occurrences which would lead to erroneous control: metering malfunctions, cell line trip, and human error.

The computer controller is constantly checking for faults in the pulsing KWH meters and the analog kiloampere signals. Every pulse is limit checked for being too fast or too slow. The pulse times are software filtered and converted to a KW rate. These rates are again checked for being too high or too low. Likewise filtered KA values are checked. Any deviation results in the offending cell line being put in a manual (non-automatic tap changing) mode and/or the controller itself being switched to manual. An annunciator sounds and the operator is informed of the source of the trouble, possible corrective action and instructions for resetting the control into automatic.

Failure of the controller results in a special alarm. While the computer automatically restarts after a power failure, restart of the control itself is always in the manual mode. Control cannot start until the operator decides that everything is ready.

After a tap change, the resulting differentials of power and current are limit checked. This traps taps which are stuck, at the physical limit of their range, or move more than one step, all dangerous conditions. Again these cells are put in manual with a trouble alarm to the operator.

A power trip of a cell is more difficult to detect because of the use of pulsing KWH meters. A trip is construed to be the drop of the analog signal to near zero and the rapid drop of the pulse rate. Either condition alone indicates a meter malfunction instead. The controller is put in manual because it is not desirable for the remaining lines to compensate the loss by driving up to their maximums.

The above malfunction conditions are all tested by simulation of the fault via software since in the present instance the use of actual hardware is not feasible. Such simulation is added to a normal simulation of signals used to test the above stated control philosophy before installation.

Protecting the controller from most human errors has been accomplished by two means:

First, any critical numbers being entered by an operator are put into temporary storage, for visual checking and computer limit checking, before being used for actual control. For example, if the operator wishes to change KA operating limits for a particular line, he enters these numbers (a Hi Hi limit, beyond which the controller taps down immediately, a Hi limit used as the calculational limit, and the Lo limit) to temporary storage. This has no effect on actual control. After he visually checks the new entries, he requests that they be moved to permanent storage and used for control. At this time, the computer limit checks each entry for (a) correct range, and (b) difference from neighboring entry. Only after these criteria are met will the numbers be used for actual control.

Secondly, a four-tiered interfacing scheme is used. The first two tiers are separated by a key lock on the computer panel. If the console is locked out, only the display buttons are active, so no unauthorized person can manipulate anything in the controller. With the key in and unlocked, an operator can perform the following functions from the CRT and keyboard:
change the controller's time and date
put a cell line into auto or manual
change the demand limit
display and change KA limits on cell lines
change control section time boundries
put the controller in auto or manual
change cell line priorities
request an explanation of the trouble alarm
list the available functions.

The next higher level is accessed through a password available to the plant engineer only. The engineer has access to all the above functions, and in addition he can do the following:
change the control deadband
change the voltage input conversion to KA
display and change bounds on the cell line KA limits to be entered by the operator
change max and min differences between KA limits
change the tap relay closing time
change the tap settling time
change meter KWH/pulse factors
list the engineer's functions A fourth level is available through another password to the system designer (programmer). At this level the functions are:
start/stop an offline plant simulation for testing
simulate a malfunction for training or testing
request debug displays each control and demand period
read/write directly into memory.

The following CRT displays are made available to the operator by the system:

---

I. DEMAND PERIOD SUMMARY
DEMPUL 4/11 9:27:35 2515 = AU
KW LIM 100000 ACTUAL 85306
LOAD FACTOR = 85.3%
ENERGY USED = 42653 KWH

TAP MOVES

|      | A | B | C | D | E |
|------|---|---|---|---|---|
| UP   | 1 | 0 | 0 | 0 | 0 |
| DOWN | 0 | 0 | 0 | 0 | 0 |

II. METER STATUS

| MET | PULFAC | CURRKW | CURRKA |
|-----|--------|--------|--------|
| P   | 300.00 | 99589. |        |
| A   | 25.00  | 17960. | 30.00  |
| B   | 25.00  | 14972. | 25.94  |
| C   | 25.00  | 17495. | 25.94  |
| D   | 25.00  | 7007.  | 31.56  |
| E   | 25.00  | 22071. | 50.04  |

III. PROGRAMMER FUNCTION CODE

| CODE | MEANING |
|------|---------|
| S    | SIMULATE MALFUNCTION |
| R    | RESET MALFUNCTION |
| D    | DEBUG CONTROLLER |
| Z    | PROGRAMMERS CONSOLE |
| F    | FUNCTION LIST |
| E    | EXIT |

-continued
ENTER PROG CODE LETTER =

IV. ENGINEER FUNCTION CODE

| CODE | MEANING |
|---|---|
| A | ANALOG INPUTS |
| C | CHANGE DATA TABLES |
| T | CCO TAP TIME |
| S | TAP SETTLING TIME |
| D | DEADBAND KW CONTROL |
| H | HYSTERESIS KW CONTROL |
| X | CHANGE PULSE FACTOR |
| B | DISPLAY LIMIT BANDS |
| R | COPY LIM BAND TO TMP |
| L | SET LIMIT BANDS |
| N | ENTER LIMIT BANDS |
| M | MAX/MIN DIFFERENCES |
| F | FUNCTIONS |
| E | EXIT |

ENTER ENGR CODE LETTER =

V. OPERATOR FUNCTION CODE

ENTER CODE LETTER F

| CODE | MEANING |
|---|---|
| F | LIST FUNCTIONS |
| A | ENGINEERS FUNCTIONS |
| Z | PROGRAMMERS FUNCTIONS |
| D | DISPLAY LIMITS |
| C | COPY LIMITS TO TEMP |
| L | CHANGE LIMITS IN TEMP |
| N | ENTER LIMITS PERMANENT |
| M | CONTROL AUTO/MANUAL |
| P | CHANGE PRIORITIES |
| S | CONTROL BREAKPOINTS |
| T | EXPLAIN TROUBLE |
| E | EXIT |

ENTER CODE LETTER

VI. CELL LINE CONTROLLER STATUS

W-2515 STATUS
FR 4/11/1980   9:20:00
11.9 M LEFT    27.KW PROJERR
LIMIT = 100000.KW PROJ = 99973.KW
ON AU(AU = AUTO MA = MANUAL)
PLANT = 99691.KW
DEADBAND = 200.KW

VII. CELL LINE B STATUS

ENTER CELL LINE B
CELL LINE B AT 09:21:21
PRIORITY = 2, LOCAL = AU, REMOTE = AU
POWER = 14972.KW, 175.KW/TAP
USED THIS PERIOD = 4850. KWH
LIMITS: HI/HI = 29.000 KA
        HI = 28.500 KA
        LO = 20.000 KA
CURRENT VALUE = 25.937 KA
TAP IS NOT MOVING

GENERAL DESCRIPTION OF INSTRUCTION PROGRAM LISTING

In Appendix A is included an instruction program listing prepared to control a process operation of the cell line control system in accordance with the present invention. The instruction program listing is written in the assembly language of the Intel 8080 microprocessor computer system. Many of these computer systems have already been supplied to customers, including customer instruction books and descriptive documentation to explain to persons skilled in this art the operation of the hardware logic and the executive software of this particular digital computer system. The instruction program listing is included to provide an illustration of the controlling steps involved and also of the protective measures such as alarm and password. This instruction program listing can be fully understood by persons skilled in this art.

```
0001:        SUBROUTINE CLRPUL(N,NPULSE,SIMFLG,ENGVAL,CONFAC,IVALUE,KD,RKD,
0002:       1 INP)
0003:        DIMENSION NPULSE(N)
0004:        DIMENSION ENGVAL(N),CONFAC(N),IVALUE(N),KD(N,NP),RKD(N,INP)
0005:        LOGICAL SIMFLG
0006: C      CLEAR PULSE COUNT AFTER SETTLING TIME EXPIRED.
0007:        DO 1 I=1,N
0008:        NPULSE(I)=0
0009: 1      CONTINUE
0010:        IF (.NOT.SIMFLG) GO TO 100
0011: C      SIMULATE KW AND ANALOG FEEDBACKS FOR TAPS THAT MOVED.
0012:        DO 2 I=1,N
0013:        SIGN=KD(I,19)
0014:        IF (SIGN.EQ.0.) GO TO 2
0015:        AKW=KD(I,1)
0016:        VAL=IVALUE(I)
0017:        DV =256.*RKD(I,14)*SIGN/CONFAC(I)+.5
0018:        IVALUE(I)=VAL + DV
0019:        DW =RKD(I,13)*SIGN+.5
0020:        KD(I,1)= AKW+DW
0021: 2      CONTINUE
0022: 100    CONTINUE
0023:        RETURN
0024:        END

0001: C    WAS LIST,0 TO SUPPRESS ASSY OUTPUT
0002:      SUBROUTINE ERR(IPERR,KWTOT,M,AKWHIN,PULFAC,IPGRP,SUMPR,NC,PFAC)
0003: C    WHERE.......
0004: C    IPERR.......DIFFERENCE BETWEEN LIMIT AND PROJECTION
0005: C    KWTOT.......METER PULSE COUNTERS
0006: C    M...........NUMBER OF METERS
0007: C    AKWHIN......KWH VALUE OF FIRST FRACTIONAL PULSE
0008: C    PULFAC......CONSTANT METER KWH PULSE VALUE
0009: C    IPGRP.......NUMBER OF METER GROUPS
0010: C    SUMPR.......METER KWH/H TABLE
0011: C    NC..........NUMBER OF CONTROLLING METERS
0012: C    PFAC........METER PULSE FACTOR USED IN THIS CALCULATION
0013:      GLOBAL ERROUT,DEMLIM,TIMPER
0014:      GLOBAL DEMPER,AKW,T=0SIM
0015:      GLOBAL IORIDE,ORIDE1,ORIDE2
0016:      GLOBAL ORIDEM,ORATIO
0017:      GLOBAL QTOT
0018:      GLOBAL T=MESS,IMESS,IMESST
0019:      GLOBAL IDEBUG,IPR
```

```
0020:          GLOBAL MANUAL                                                      00002000
0021:          GLOBAL VOCSEC                                                      00002100
0022:          INTEGER T:MESS                                                     00002200
0023:          INTEGER T:OSIM,IORIDE                                              00002300
0024:          INTEGER TINPER,KWTOT(M),IPGRP,NC                                   00002400
0025:          REAL    PULFAC(M),PFAC(NC),SUMPR(IPGRP)                            00002500
0026:          REAL    AKWHIV(M),NTAPUD,RNH,RTI                                   00002600
0027:          COMMON/TAPS/NTAPUD(6,2),DBT,MATROB(6,5),MALREQ(6,5),NTPOSS,CELTRIP 00002650
0028:         1,NPZ,PROJ,ICFLAG,LDEBUG(2)
0029:          LOGICAL CELTRIP,ICFLAG
0030:          GLOBAL IPR2
0031:    C     SET CUTIM A LITTLE BEFORE CONTROL RUNS TO INSURE A PULSE
0032:          DATA CUTIM/310./                                                   00002700
0033:          DATA BIAS/100./                                                    00002800
0034:          TOT = 0.                                                           00002900
0035:          DO 100 I=1,NC                                                      00003000
0036:          PFAC(I)=PULFAC(I)                                                  00003100
0037:          RNH=KWTOT(I)                                                       00003200
0038:          TOT =TOT+AKWHIV(I)+(RNH*PULFAC(I))                                 00003300
0039:    100   CONTINUE                                                           00003400
0040:          AKW = TOT                                                          00003500
0041:    C     AKW IS THE KWH TO THIS POINT IN THE PERIOD
0042:          RTI=TINPER
0043:          TLEFT=60.*DEMPER-RTI                                               00003600
0044:          TOT=SUMPR(1)*TLEFT/3600.+AKW
0045:    C     ADJUST ERROUT FOR EXPECTED IDEAL RATE AT END OF PERIOD
0046:          IF (TLEFT.GT.CUTIM) TOT=TOT+(DEMLIM-SUMPR(1)+CUTIM/3600.+BIAS
0047:          IF (TLEFT.GT.CUTIM.OR.TLEFT.EQ.0.) GO TO 10
0048:    C     IN IDEAL RATE SECTION, CALC MAX KW ALLOWABLE
0049:          XDEM=(DEMLIM*DEMPER/60.-AKW)*3600./TLEFT                           00003700
0050:          IF (XDEM.GT.DEMLIM) XDEM=DEMLIM                                    00003750
0051:          TOT=AKW+XDEM*TLEFT/3600.                                           00003800
0052:    10    CONTINUE                                                           00003900
0054:          ATOT=TOT*60./DEMPER                                                00004000
0055:          PROJ=ATOT                                                          00004050
0056:          TOT = KWH                                                          00004100
0057:          ATOT = KWH/T                                                       00004200
0058:    C     ATOT AT THIS POINT IS THE PROJECTED DEMAND LIMIT AT THE END OF PERIOD
0059:          ICFLAG=.FALSE.
0060:          ERROUT=DEMLIM-ATOT
0061:          IF (TLEFT.GT.CUTIM) GO TO 1
0062:          ICFLAG=.TRUE.
0063:          ERROUT=XDEM-SUMPR(1)
         1     CONTINUE
```

```
0064:      IF (LDEBUG(2).EQ.0) GO TO 125
0065:      WRITE (IPR2,150) TINPER,ATDT,FRQOUT,ICFLAG
0066: 150  FORMAT (' ERR KW=TINPER,PROJ,ERR,FLG'/I5,2F8.0,L3)
0067: 125  CONTINUE
0068:      RETURN
0069:      END

0001:      SUBROUTINE AIMJPL ( CONFAC,DBND,ICOTIM,N,NSETIM,PULFAC,RKD,
0002:    1 OFFSET,INP,HYSTKW)
0003:      DIMENSION PULFAC(6),IMNAME(6)
0004:      GLOBAL CTPWR,P4IPWR,PLOPWR
0005:      GLOBAL KEY,IPR2
0006:      DIMENSION CONFAC(N),OFFSET(N),RKD(N,INP)
0007:      DIMENSION ALINE(10),IALPH(15),NCELL(5),TLIM(5,5),NEX(15)
0008:      DIMENSION MEL(3,6),JI(5),RJI(5),INUM(11),IGCELL(15)
0009:      DIMENSION XLIM(3),YLIM(2),PLIM(6)
0010:      DIMENSION DLP(2)
0011:      DIMENSION ACHR0(6,12)
0012:      DIMENSION PETE(2)
0013:      EQUIVALENCE (IMNAME(2),NCELL(1))
0014: C    CONFAC   = CONVERSION FACTOR FROM VOLTAGE TO ENGINEERING UNITS
0015: C    OFFSET   = Y-INTERCEPT FOR ENGINEERING UNITS
0016: C    DBND     = KW CONTROL DEADBAND
0017: C    HYSTKW   = KW CONTROL HYSTERESIS
0018: C    MP60     = DC RUN PERIOD
0019: C    ICOTIM   = CC3 PULSE TIME TO OPERATE TAP
0020: C    NSETIM   = TAP SETTLING TIME
0021:      DATA AMGIC/4HMAGI/
0022:      DATA DLP/3H4IN,3HMAX/
0023:      DATA ACHRKD/
0024:    1 4HMAX , 4HCELL, 4H LIN, 4HE KA, 4HE KA, 4H/TAP, 4H     ,
0025:    2 4HMAX , 4HCELL, 4H LIN, 4HE KA, 4HE KW, 4H/TAP, 4H     ,
0026:    3 4HMIN , 4HCELL, 4H LIN, 4HE KW, 4HE KW, 4H/TAP, 4H     ,
0027:    4 4HMAX , 4HCELL, 4H LIN, 4HE ST, 4HARTU, 4HP KW, 4H     ,
0028:    5 4HCELL, 4H LIN, 4HE MA, 4HX PU, 4HLSER, 4HP KW, 4H     ,
0029:    6 4HCELL, 4H LIN, 4HE MA, 4HX PU, 4HLSER, 4H  KW, 4H KW ,
0030:    7 4HCELL, 4H LIN, 4HE MI, 4HN PU, 4HLSER, 4H  KW, 4H KA ,
0031:    8 4HCELL, 4H LIN, 4HE MI, 4HN PU, 4HLSER, 4H  KW, 4H KA ,
0032:    9 4HCELL, 4H LIN, 4HE MA, 4HX AN, 4HALOG, 4H  KW, 4H KA ,
0033:    A 4HPLAN, 4HT PU, 4HLSER, 4H  KW, 4H MAX, 4HFOR , 4HTRIP,
0034:    B 4HPLAN, 4HT PU, 4HLSER, 4H  KW, 4H MIN, 4H    , 4H    ,
0035:    C 4HPLAN, 4HT PU, 4HLSER, 4H  KW, 4H KW , 4H    , 4H    /
0036:      DATA IALPH/1HD,1HA,1HC,1HT,1HS,1HD,1H4,1HX,1HD,1H4,1HR,1HL,1HN,1HM,1HF
```

```
0037:            1,1HE/
0038:          DATA NU4B/15/
0039:          DATA NU4A/12/
0040:          DATA INJM/1H1,1H2,1H3,1H4,1H5,1H6,1H7,1H8,1H9,1H0,1H./
0041:          DATA IMNAME/1HP,1HA,1HR,1HC,1HD,1HE/
0042:          DATA IGCELL/0,1,0,0,0,0,0,1,1,1,1,0,0/
0043:          DATA NEX/0,7,2,1,1,1,2,0,0,3,0,2,0,0/
0044:          DATA PETE/4HPERM,4HTEMP/
0045:          DATA XLIM/4THHI,4H HI ,4H LO /
0046:          DATA YLIM/3HMAX,3HMIN/
0047:          WRITE (IPR2,1)
0048:     1    FORMAT (" ENTER PASSWORD ")
0049:          READ (KEY,2) ALINE
0050:     2    FORMAT (10A4)
0051:          IF (ALIVE(1).EQ.AMGIC) GO TO 15
0052:          WRITE (IPR2,8)
0053:     8    FORMAT (" PASSWORD INCORRECT. GOODBYE.")
0054:          GO TO 1000
0055:    15    WRITE (IPR2,3)
0056:     3    FORMAT (" CODE         MEANING"/
0057:         2     "  .   A       ANALOG INPUTS"/
0058:         3     "  .   C       CHANGE DATA TABLES"/
0059:         4     "  .   T       CCG TAP TIME      "/
0060:         5     "  .   S       TAP SETTLING TIME "/
0061:         6     "  .   D       DEADBAND KW CONTROL"/
0062:         7     "  .   H       HYSTERESIS KW CONTRL"/
0063:         8     "  .   X       CHANGE PULSE FACTOR"/
0064:         9     "  .   B       DISPLAY LIMIT BANDS"/
0065:         A     "  .   R       COPY LIM BAND TO T4P"/
0066:         B     "  .   L       SET LIMIT BANDS    "/
0067:         C     "  .   N       ENTER LIMIT BANDS  "/
0068:         D     "  .   M       MAX/MIN DIFFERENCES"/
0069:         E     "  .   F       FUNCTIONS          "/
0070:         F     "  .   E       EXIT               ")
0071:   100    CONTINUE
0072:          WRITE (IPR2,25)
0073:    25    FORMAT (" ENTER ENGR CODE LETTER = ")
0074:          CALL ENPACK (MEL,NEL,IALPH,INUM,NUMB)
0075:          ITEM= MEL(1,6)
0076:          DO 18 I=1,NUMB
0077:          IF (ITEM.EQ.IALPH(I)) GO TO 20
0078:    18    CONTINUE
0079: C        ERROR
0080:          GO TO 900
0081:    20    CONTINUE
```

```
0082:            IF (IGCELL(I).EQ.0) GO TO 27
0083:            CALL GETCEL(K,NCELL,N,IER)
0084:            IF (IER.EQ.1) GO TO 900
0085:      27    CONTINUE
0086:            GO TO (900,102,103,104,105,106,107,108,109,110,111,112,113,114,115
0087:           1),I
0088:      102   CONTINUE
0089:      C            CODE A.
0090:            WRITE (IPR2,220)
0091:      220   FORMAT (' ENTER CONVERSION,OFFSET +1000'/' = ')
0092:            GO TO 130
0093:      103   CONTINUE
0094:      C            CODE C.
0095:            WRITE (IPR2,230) (J,(ACHKKD(K,J),K=1,5),J=1,12)
0096:      230   FORMAT (' NUM         MEANING'/ 12(I4,2X,6A4/) )
0097:            WRITE (IPR2,232)
0098:      232   FORMAT (' ENTER NUMBER, KW OR AMPS'/' = ')
0099:            GO TO 130
0100:      104   CONTINUE
0101:      C            CODE T.
0102:            WRITE (IPR2,240) ICUTIM
0103:      240   FORMAT (' TAP CO TIME = ',I2,' SECONDS'/' ENTER NEW TAP TIME = ')
0104:            GO TO 130
0105:      105   CONTINUE
0106:      C            CODE S.
0107:            WRITE (IPR2,250) NSETIM
0108:      250   FORMAT (' TAP SETTLING = ',I2,' SECONDS'/' ENTER NEW SETTLING = ')
0109:            GO TO 130
0110:      106   CONTINUE
0111:      C            CODE D.
0112:            WRITE (IPR2,260) OBND
0113:      260   FORMAT (' CONTROL DEADBAND = ',F6.1,' KW'/' ENTER NEW DEADBAND = '
0114:           1)
0115:            GO TO 130
0116:      107   CONTINUE
0117:      C            CODE H.
0118:            WRITE (IPR2,270) HYSTKW
0119:      270   FORMAT (' CONTROL HYSTERESIS = ',F6.1,' KW'/' ENTER NEW HYSTERESIS
0120:           1 = ')
0121:            GO TO 130
0122:      108   CONTINUE
0123:      C            CODE X.
0124:            WRITE (IPR2,280)
0125:      280   FORMAT (' METER(P,A,B,C,D,E),WATTHR/PULSE'/' = ')
```

```
0126:            GO TO 130
0127:    109  CONTINUE
0128:  C            CODE B.
0129:         WRITE (IPR2,650)
0130:    650  FORMAT (' ENTER 1 FOR PERMANENT LIMITS'/
0131:       1         ' ENTER 2 FOR TEMPORARY LIMITS ')
0132:         READ (KEY,651) LIMNO
0133:    651  FORMAT (I1)
0134:         IF (LIMNO.NE.1.AND.LIMNO.NE.2) GO TO 900
0135:         GO TO (681,682),LIMNO
0136:    681  CONTINUE
0137:         DO 685 MZ=1,6
0138:         PLIM(MZ)= RKD(K,MZ+3)
0139:    685  CONTINUE
0140:         GO TO 690
0141:    682  CONTINUE
0142:         DO 686 MZ=1,6
0143:         PLIM(MZ)= TLIM(K,MZ)
0144:    686  CONTINUE
0145:    690  CONTINUE
0146:         WRITE (IPR2,290) PETE(LIMNO),NCELL(K),(PLIM(MZ),MZ=1,6)
0147:    290  FORMAT (' ',A4,' CELL LINE ',A1,' LIMIT BANDS'//
0148:       1                  '             MAX KA         MIN KA'
0149:       2         '   HI/HI ',F9.2,F12.2//
0150:       3         '   HI    ',F9.2,F12.2//
0151:       4         '   LO    ',F9.2,F12.2)
0152:         GO TO 100
0153:    110  CONTINUE
0154:  C            CODE R.
0155:         DO 300 JJ=1,6
0156:         TLIM(K,JJ)=RKD(K,JJ+3)
0157:    300  CONTINUE
0158:         WRITE (IPR2,610) NCELL(K)
0159:    610  FORMAT (' COPY MADE OF CELL LINE ',A1,' LIMS')
0160:         GO TO 100
0161:    111  CONTINUE
0162:  C            CODE L.
0163:         WRITE (IPR2,310)
0164:    310  FORMAT (' LIMITS: 1=HI/HI, 2=HI, 3=LO'/
0165:       1         ' BANDS : 1=MAX   2=MIN'/
0166:       2         ' ENTER LIM,BAND,AMPS = ')
0167:         GO TO 130
0168:    112  CONTINUE
0169:  C            CODE N.
```

```
0170:          DO 325 JJ=1,6
0171:          RKD(K,JJ+3)=TLIM(K,JJ)
0172:      325 CONTINUE
0173:          WRITE (IPR2,620) NCELL(K)
0174:      620 FORMAT (' LIMS FOR CELL LINE ',A1,' MADE PERM')
0175:          GO TO 190
0176:      113 CONTINUE
0177:    C       CODE M.
0178:          WRITE (IPR2,315) NCELL(K),RKD(K,11),RKD(K,12)
0179:      315 FORMAT (' CELL LINE ',A1/
0180:         1        ' 1= LO TO HI MIN DIFF = ',F5.1/
0181:         2        ' 2= HI TO HIHI MAX DIFF= ',F5.1//
0182:         3        ' ENTER DIFF NO.,AMPS = ')
0183:          GO TO 130
0184:      114 CONTINUE
0185:    C       CODE F.
0186:          GO TO 15
0187:      115 CONTINUE
0188:    C       CODE E.
0189:          GO TO 1000
0190:      130 CONTINUE
0191:          CALL ENPACK (MEL,NEL,IMNAME,INUM,NUMB)
0192:          CALL UNPACK (MEL,NEL,IMNAME,INUM,NUMB,J1,RJ1)
0193:          IF (NEL.NE.NEX(I)) GO TO 900
0194:    C       CORRECT NO. OF ENTRIES
0195:          GO TO (401,402,403,404,405,406,407,408,409,410,411,412,413,414,
0196:         1 415),I
0197:      401 CONTINUE
0198:          GO TO 100
0199:      402 CONTINUE
0200:          CONFAC(K)= RJ1(2)/1000.
0201:          OFFSET(K)= RJ1(1)/1000.
0202:          WRITE (IPR2,502) NCELL(K),CONFAC(K),OFFSET(K)
0203:      502 FORMAT (' CELL LINE ',A1/' CONVERSION = ',F9.3/' OFFSET = ',
0204:         1 F9.3)
0205:          GO TO 100
0206:      403 CONTINUE
0207:          IER=0
0208:          NUMX=JI(2)
0209:          NUM=NUMX+16
0210:          VAL= RJ1(1)
0211:          IF (NUM.LE.25) CALL GETCEL(K,NCELL,V,IER)
0212:          IF (IER.EQ.1) GO TO 900
0213:          IF (NUM.GT.25) GO TO 235
```

```
0214:        ISET=0
0215:        IF (NUMX.NE.1.AND.NUMX.NE.2.AND.NUMX.NE.8.AND.NUMX.NE.9) GO TO 440
0216:        ISET=1
0217:        VAL=VAL/1000.
0218:  440   CONTINUE
0219:        RKD(K,NUM)=VAL
0220:        WRITE (IPR2,234) NCELL(K)
0221:  234   FORMAT (' CELL LINE ',A1)
0222:        GO TO 237
0223:  235   CONTINUE
0224:        IF (NUM.EQ.26) CTPWR=VAL
0225:        IF (NUM.EQ.27) PHIPWR=VAL
0226:        IF (NUM.EQ.28) PLOPWR=VAL
0227:  237   CONTINUE
0228:        IF (ISET.EQ.1) GO TO 450
0229:        WRITE (IPR2,238) (ACHRKD(J,NUMX),J=1,5),VAL
0230:  238   FORMAT (1X,6A4,'=',F6.0)
0231:        GO TO 100
0232:  450   CONTINUE
0233:        WRITE (IPR2,452) (ACHRKD(J,NUMX),J=1,5),VAL
0234:  452   FORMAT (1X,6A4,'=',F6.2)
0235:        GO TO 100
0236:  404   CONTINUE
0237:        ICOTIM= J1(1)
0238:        WRITE (IPR2,504) ICOTIM
0239:  504   FORMAT (' CO TAP TIME = ',I2,' SECONDS')
0240:        GO TO 100
0241:  405   CONTINUE
0242:        NSETIM= J1(1)
0243:        WRITE (IPR2,505) NSETIM
0244:  505   FORMAT (' TAP SETTLING TIME = ',I2,' SECONDS')
0245:        GO TO 100
0246:  406   CONTINUE
0247:        DBND= RJ1(1)
0248:        WRITE (IPR2,506) DBND
0249:  506   FORMAT (' CONTROL DEADBAND = ',F6.1,' KW')
0250:        GO TO 100
0251:  407   CONTINUE
0252:        HYSTKW= RJ1(1)
0253:        WRITE (IPR2,507) HYSTKW
0254:  507   FORMAT (' CONTROL HYSTERESIS = ',F6.1,' KW')
0255:        GO TO 100
0256:  408   CONTINUE
0257: C      UNPACK ROUTINE WON'T DO ALPHABETIC CHARACTERS.
```

```
0258:            ICL=MEL(2,6)
0259:            N1=N+1
0260:            DO 420 KL=1,N1
0261:            IF (ICL.EQ.IMNAME(KL)) GO TO 425
0262:      420   CONTINUE
0263:            GO TO 900
0264:      425   CONTINUE
0265:            PULFAC(KL)=RJ1(1)/1000.
0266:            WRITE (IPR2,430) IMNAME(KL),PULFAC(KL)
0267:      430   FORMAT (1X,A1," FACTOR = ",F7.2," KW/PUL")
0268:            GO TO 100
0269:      409   CONTINUE
0270:            GO TO 100
0271:      410   CONTINUE
0272:            GO TO 100
0273:      411   CONTINUE
0274:            L1=J1(3)
0275:            L2=J1(2)
0276:            L=2*(L1-1)+L2
0277:            TLIM(K,L)=RJ1(1)/1000.
0278:            WRITE (IPR2,511) XLIM(L1),YLIM(L2),TLIM(K,L)
0279:      511   FORMAT (1X,A4," TEMP LIM ",A3," = ",F5.1," KA")
0280:            GO TO 100
0281:      412   CONTINUE
0282:            GO TO 100
0283:      413   CONTINUE
0284:            L=J1(2)
0285:            RKD(K,L+10) = RJ1(1)/1000.
0286:            WRITE (IPR2,513) NCELL(K),DLP(L),L,RKD(K,L+10)
0287:      513   FORMAT (" CELL LINE ",A1,1X,A3," DIFF ",I1," = ",F5.1)
0288:            GO TO 100
0289:      414   CONTINUE
0290:            GO TO 100
0291:      415   CONTINUE
0292:            GO TO 100
0293:      900   CONTINUE
0294:            WRITE (IPR2,901)
0295:      901   FORMAT (" ERROR")
0296:            GO TO 100
0297:     1000   CONTINUE
0298:            RETURN
0299:            END
0001:     C
0002:     C FMC SPECIAL DATIN 9/79
```

```
      SUBROUTINE DATIV(KD,N,NP,PATT,REGT,MSKT,NCCD,INVIND,IPRI,IMAX
     1 ,LOGDVT,DVCODT,MDHOLDY,MDHOLSZ,PULFAC,MET,RKD,INP,VALBUF,SIMFLG)
C
C
C     THIS VERSION FOR GPEMS W/32 COL LOGS AND SEPARATE PI3B OP PNL SVCOPL
C     OMITS FUNCTIONS DONE IN SVCOPL
C
      DIMENSION IUSED(8),LPRI(8),TLM(5,3),NCELL(5),RKD(N,INP),ALIM(3)
      DIMENSION MVAME(6)
      EQUIVALENCE (MVNAME(2),NCELL(1))
      INTEGER VALBUF(N)
      LOGICAL SIMFLG
      DIMENSION SVL(2,2)
      DIMENSION IHILO(2)
      COMMON/TAPS/NTAPUD(6,2),DBT,MATROB(6,5),MALREQ(6,5)
      INTEGER PATT(NCCD),REGT(NCCD),MSKT(NCCD)
      INTEGER IPRI(N),IMAX(N)
      INTEGER A(27)
      INTEGER JI(3),KD(N,NP),XF
      INTEGER BLANK,3(10),INDEX(3),X7FFF
      INTEGER M(3,6)
      INTEGER REGRND
      GLOBAL  REGRND
      INTEGER MDHOLDY(MDHOLSZ),LINE(8),NUMDAYS(12)
      REAL PULFAC(MET)
      GLOBAL KEYON
      GLOBAL IPR
      GLOBAL AIMOPLFL
      INTEGER AIMOPLFL
      REAL RJI(3),RTEM,RIOT
      GLOBAL I=HOUR,I=MIN
      GLOBAL I=MNTH,I=DATE
      GLOBAL DIMOPLFL
      INTEGER DIMOPLFL
      GLOBAL MRKVAH
      REAL MRKVAH
      GLOBAL DLIMTIM1,DLIMTIM2
      INTEGER DLIMTIM1, DLIMTIM2
      INTEGER LOGDVT(16),DVCODT(5)
      REAL MAX,RJ,RLL
      GLOBAL CTHRES,DRIDE1,DRIDE2
      GLOBAL IOP,ISU
      GLOBAL T:MESS
      GLOBAL T:DB,MENERGY,MDEMAND
      GLOBAL IREAD,I:ONPR
```

```
0048:         GLOBAL VFINSC,VDCSEC,DEMPER
0049:         GLOBAL NEC,NTD,I=FLOAT,IORIDE,IDEBUG
0050:         GLOBAL NULS,NSS
0051:         GLOBAL GRATIO
0052:         INTEGER IOP,ISJ
0053:         INTEGER MASK(3)
0054:         INTEGER T=DB
0055:         REAL MDEMAND
0056:         REAL MENERGY
0057:         INTEGER TINPER
0058:         REAL DEMLIM
0059:         GLOBAL IPLTND
0060:         GLOBAL IENTER,MANUAL,ITDFL,LDGTIM
0061:         GLOBAL IPR2,DEMLIM,KEY,IMESS,I=SEC,IBIAS,IPPCH,IPTR
0062:         GLOBAL ITABLST,ITABEND
0063:         GLOBAL TINPER
0064:         DATA MAX/32768./,XF/$000F/
0065:         DATA ISF/$400C/
0066:         DATA ITD/$4000/
0067:         DATA A/1HF,1HB,1HD,1HI,1HL,1HM,1HT,1HA,
0068:        X1HP,1HO,1HI,1HC,
0069:        X1HV,1HU,1HH,1HY,
0070:        X 1HK,1HV,1HS,
0071:        X 1HR,1HX,
0072:        Y1HZ,
0073:        X$2DA0,
0074:        X1HW,
0075:        X1HG,
0076:        X1HQ,
0077:        X1HJ,
0078:        X1HE/
0079:         DATA IX1,IXFFFE/$0001,$FFFE/
0080:         DATA KSLC8/$2008/,KX00FF/$00FF/
0081:         DATA NUMDAYS/31,29,31,30,31,30,31,31,30,31,30,31/
0082:         DATA B/1H1,1H2,1H3,1H4,1H5,1H6,1H7,1H8,1H9,1H0/
0083:         DATA BLANK/1H /,X7FF/$7FFF/
0084:         DATA MASK/$0,$4000,$8000/,IFIN/$2002/
0085:         DATA IXF/$000F/
0086:         DATA MNAME/1HP,1HA,1HB,1HC,1HD,1HE/
0087:         DATA IHILO/2HHI,2HLO/
0088:
0089:         DATA ALIM/4HHIQI,4H HI ,4H LO /
0090:         DATA SML/4HLARG,4HE   ,4HSMAL,4HL   /
0091: C EXECUTION START
```

```
0092:  C    NUMB IS THE NUMBER OF ELEMENTS IN ARRAY A(NUMB)        00008000
0093:  C         IMESS=0                                           00008100
0094:            ITDFL=0                                            00008200
0095:            NUMB=27                                            00008300
0096:  C    REQUIRE PANEL TO BE UNLOCKED                            00008400
0097:            IF (KEYON .EQ. 0) GO TO 176                        00008500
0098:            IPASS = ISU                                        00008600
0099:            IENTER = 1                                         00008700
0100:            GO TO 100                                          00008800
0101:   176      CONTINUE                                           00008900
0102:   178      FORMAT(A2)                                         00009000
0103:   181      CONTINUE                                           00009100
0104:   182      WRITE(IPR2,177)                                    00009200
0105:   177      FORMAT(' UNLOCK PANEL')                            00009300
0106:            RETURN                                             00009400
0107:   100      WRITE(IPR2,1)                                      00009500
0108:  C    FIRST CALL FOR CODE LETTER                              00009600
0109:            CALL ENPACK(M,NN,A,B,NUMB)                         00009700
0110:      1     FORMAT(' ENTER CODE LETTER ')                      00009800
0111:            IF(NN.NE.1)RETURN                                  00009900
0112:            J=0                                                00010000
0113:            DO 2,I=1,NUMB                                      00010100
0114:            IF(M(I,6).NE.A(I)) GO TO 2                         00010200
0115:            J=I                                                00010300
0116:      2     CONTINUE                                           00010400
0117:  C    J IS THE INDEX OF THE CODE LETTER - JUMP TO APPROPRIATE RESPONSE 00010500
0118:            IF(J.EQ.0) GO TO 100                               00010600
0119:            IF(J.EQ.NUMB) RETURN                               00010700
0120:            IER=0                                              00010750
0121:            IF (J.EQ.3.OR.J.EQ.4.OR.J.EQ.11.OR.J.EQ.17) CALL GETCEL(K,NCELL,
0122:      1     N,IER)
0123:            IF (IER.EQ.1) GO TO 9
0124:   191      GO TO (8001,9,8003,8004,1041,6,106,8028,9,9,8011, 00010800
0125:      1     9,9,   9,9,9,8017,1017,9   ,9,1021,                00010900
0126:      2     9,9,9,9,9 ),J                                      00011000
0127:  8001      CONTINUE                                           00011100
0128:            WRITE (IPR2,8002)
0129:  8002      FORMAT(' CODE     MEANING'/
0130:           1     '                   LIST FUNCTIONS'/
0131:           2     '    A              ENGINEERS FUNCTIONS'/
0132:           3     '    Z              PROGRAMMERS FUNCTIONS'/
0133:           4     '    D              DISPLAY LIMITS'/
0134:           5     '    C              COPY LIMITS TO TEMP'/
0135:           6     '    L              CHANGE LIMITS IN TEMP'/
0136:           7     '    N              ENTER LIMITS PERMANENT'/
```

```
0137:              B           M   CONTROL AUTO/MANUAL'/                        00011200
0138:              9           P   CHANGE PRIORITIES'/                          00011300
0139:                                                                           00011400
0140:              A               CONTROL BREAKPOINTS'/                        00011500
0141:              B               EXPLAIN TROUBLE'/                            00011600
0142:              C               EXIT' )                                      00011700
0143:        GO TO 100                                                          00011800
0144:      C                                                                    00011900
0145:      C COMMAND INDEX                                                      00012000
0146:      C            LETTER           COMMAND                                00012100
0147:      C      J       F              LIST FUNCTIONS                         00012200
0148:      C      1       B              UPDATE BIAS                            00012300
0149:      C      2       D              DISPLAY CURRENT LIMITS                 00012400
0150:      C      3       L              CHANGE TEMPORARY LIMITS                00012500
0151:      C      4       M              MANUAL / AUTO.                         00012600
0152:      C      5       T              EXPLAIN TROUBLE CCO                    00012700
0153:      C      6       A              ENGINEERS FUNCTIONS                    00012800
0154:      C      7       P              CHANGE CELL PRIORITIES                 00012900
0155:      C      8       O              OUTPUT DATA TABLES                     00013000
0156:      C      9       I              INPUT THE DATA TABLES                  00013100
0157:      C     10       C              COPY LIMITS TO TEMPORARY               00013200
0158:      C     11       V              CONSERVATION THRESHOLD UPDATE          00013300
0159:      C     12       U              UNIT CONTROL MODIFICATION              00013400
0160:      C     13       H              DEMAND LIMIT HOUR CHANGE               00013500
0161:      C     14       Y              HOLIDAY TABLE UPDATE                   00013600
0162:      C     15       N              NU                                     00013700
0163:      C     16       S              ENTER LIMITS PERMANENTLY               00013800
0164:      C     17       R              UPDATE NOCSEC & NFINSC                 00013900
0165:      C     18       X              NU                                     00014000
0166:      C     19       Z              METER PULFAC UPDATE                    00014100
0167:      C     20    MINUS SIGN        BID FOR PROGRAMMERS CONSOLE            00014200
0168:      C     21       W              PRINT MONTHS TOTALS                    00014300
0169:      C     22       G              CLAMP OR RELEASE A PRIORITY LEVEL
0170:      C     23       Q
0171:      C     24       J              STATUS DISPLAY REMOTE NO.
0172:      C     25
0173:      C     26       E              .EXIT-MUST BE LAST LETTER
0174: 8008 CONTINUE
0175:            CHANGE CELL PRIORITIES.
0176:       WRITE (IPR2,2250)
0177: 2250 FORMAT (' CELL LINE    PRIORITY')
0178:       DO 2200 K=1,N
0179:       WRITE (IPR2,1500) NCELL(K),KD(K,4)
```

```
0180:       1500 FORMAT (7X,A1,10X,I1)
0181:       2200 CONTINUE
0182:            WRITE (IPR2,1501)
0183:       1501 FORMAT (' ENTER PRIORITIES')
0184:            DO 1510 K=1,N
0185:            IUSED(K)=0
0186:       1510 LPRI(K)=0
0187:            DO 1502 K=1,N
0188:            WRITE (IPR2,1503) NCELL(K)
0189:       1503 FORMAT (' CELL LINE ',A1,' = ')
0190:            READ (KEY,1504) LP
0191:       1504 FORMAT (I1)
0192:            IF (LP.LT.1.OR.LP.GT.N) GO TO 9
0193:            IF (IUSED(LP).EQ.1) GO TO 9
0194:            LPRI(K)=LP
0195:            IUSED(LP)=1
0196:       1502 CONTINUE
0197:            DO 1505 K=1,N
0198:       1505 KD(K,4)=LPRI(K)
0199:            WRITE (IPR2,2250)
0200:            DO 2600 K=1,N
0201:       2600 WRITE (IPR2,1500) NCELL(K),KD(K,4)
0202:            GO TO 100
0203:       8003 CONTINUE
0204:       C       DISPLAY LIMITS.
0205:            WRITE (IPR2,1600) NCELL(K),RKD(K,4),RKD(K,1),RKD(K,5),RKD(K,12),
0206:           1 RKD(K,6),RKD(K,2),RKD(K,7),RKD(K,11),RKD(K,8),RKD(K,3),RKD(K,9)
0207:       1600 FORMAT (' CELL LINE ',A1,' KA LIMITS'/
0208:           1 25X,'MAX/MIN'/7X,'MAX   CURR   MIN    DIFF'/
0209:           2 'HI/HI ',3F6.2/F30.2/' HI    ',3F6.2/' LO    ',3F6.2/)
0210:            GO TO 100
0211:       8011 CONTINUE
0212:       C       COPY LIMITS FOR THIS CELL TO TEMPORARY.
0213:            DO 1605 LX=1,3
0214:       1605 TLM(K,LX)=RKD(K,LX)
0215:            WRITE (IPR2,2700) NCELL(K)
0216:       2700 FORMAT (' CELL LINE ',A1,' LIMITS COPIED')
0217:            GO TO 100
0218:       8004 CONTINUE
0219:            WRITE (IPR2,1610)
0220:       1610 FORMAT (' 1=HI/HI, 2=HI, 3=LO '/' ENTER LIMIT NO., AMPS= ')
0221:            L=2
0222:            GO TO 260
```

```
0224:       3004 CONTINUE
0225:    C        CHANGE LIMIT IN TEMPORARY.
0226:            LX=JI(2)
0227:            IF (LX.LT.1.OR.LX.GT.3) GO TO 9
0228:            TLM(K,LX)=RJI(1)/1000.
0229:            WRITE (IPR2,4900) NCELL(K),ALIM(LX),TLM(K,LX)
0230:       4900 FORMAT (' CELL LINE ',A1,1X,A4,' LIM=',F6.2,'KA')
0231:            GO TO 100
0232:          6 CONTINUE
0233:            NOTRFL=0
0234:    C        WRITE TROUBLE OUTPUTS
0235:            DO 25 I=1,N
0236:            IMS=0
0237:            DO 20 K=1,5
0238:            IF (MATROB(I,K).EQ.0) GO TO 20
0239:            IF (IMS.EQ.0) WRITE (IPR2,21) NCELL(I)
0240:         21 FORMAT (' TROUBLE IN CELL LINE ',A1)
0241:            NOTRFL=1
0242:            IMS=1
0243:            IND=1
0244:            IF (MATROB(I,K).EQ.-1) IND=2
0245:            GO TO (31,32,33,34,35),K
0246:         31 CONTINUE
0247:            WRITE (IPR2,41) IHILO(IND)
0248:         41 FORMAT (' = MEASURED KW TOO ',A2)
0249:            GO TO 29
0250:         32 CONTINUE
0251:            WRITE (IPR2,42) IHILO(IND)
0252:         42 FORMAT (' = MEASURED KA TOO ',A2)
0253:            GO TO 28
0254:         33 CONTINUE
0255:         43 FORMAT (' = MEASURED KW/TAP TOO ',A2)
0256:            GO TO 26
0257:         34 CONTINUE
0258:            WRITE (IPR2,44) IHILO(IND)
0259:         44 FORMAT (' = MEASURED KA/TAP TOO ',A2)
0260:            GO TO 26
0261:         35 CONTINUE
0262:            WRITE (IPR2,45)
0263:         45 FORMAT (' = TRIPPED'/' CONTROLLER PUT IN MANUAL')
0264:            GO TO 28
0265:         26 CONTINUE
0266:            IF (IND.EQ.2) WRITE (IPR2,23)
0267:         23 FORMAT (' TAP CHANGER POSSIBLY NOT ABLE'/' TO MOVE. FIX LIMITS.')
0268:         28 CONTINUE
```

```
0269:            WRITE (IPR2,18)
0270:    18      FORMAT (' CELL LINE PUT IN MANUAL')
0271:            IF (K.EQ.1.OR.K.EQ.2) WRITE (IPR2,29)
0272:    29      FORMAT (' FIX EQUIPMENT OR DATA TABLES')
0273:            WRITE (IPR2,27)
0274:    27      FORMAT (' PUT BACK ON AUTO')
0275:    20      CONTINUE
0276:    25      CONTINUE
0277:            IF (MATROB(N+1,1)) 51,52,53
0278:    51      IND=2
0279:            GO TO 54
0280:    53      IND=1
0281:    54      CONTINUE
0282:            NOTRFL=1
0283:            WRITE (IPR2,55) IHILO(IND)
0284:    55      FORMAT (' * PLANT POWER METER TOO ',A2,' CONTROLLER PUT IN MANUAL'
0285:           1 /' FIX METER AND PUT BACK ON AUTO')
0286:    52      CONTINUE
0287:            IF (MATROB(N+1,2)) 61,62,63
0288:    61      IND=2
0289:            GO TO 64
0290:    63      IND=1
0291:    64      CONTINUE
0292:            NOTRFL=1
0293:            IF (MATROB(N+1,2).EQ.2) GO TO 140
0294:            WRITE (IPR2,65) IHILO(IND)
0295:    65      FORMAT (' * ALL AUTO CELL LINES AT ',A2,' LIM' /' FURTHER CONTROL
0296:           1NOT POSSIBLE'/' ADJUST KA LIMITS')
0297:            GO TO 62
0298:    140     CONTINUE
0299:            WRITE (IPR2,145)
0300:    145     FORMAT (' * ALL CELL LINES IN MANUAL '/' NO FURTHER CONTROL POSSIB
0301:           1LE')
0302:    62      CONTINUE
0303:     C      CLEAR MATROB(N+1,2) AFTER EXPLAINING TROUBLE
0304:            MATROB(N+1,2)=0
0305:            IF (NOTRFL.EQ.0) WRITE (IPR2,80)
0306:    80      FORMAT (' YOUR TROUBLES ARE OVER')
0307:            GO TO 100
0308:    8017    CONTINUE
0309:     C      STORE LIMITS PERMANENTLY IF GK.
0310:            DO 1700 LMESS=1,3
0311:            IF (RKD(K,2*LMESS+2).GE.TLM(K,LMESS) .AND. TLM(K,LMESS).GE. RKD(K,
0312:           1 2*LMESS+3)) GO TO 1700
```

```
0313:               GO TO 1800
0314:      1700 CONTINUE
0315:            DO 1701 LMESS=4,5
0316:            DIF= TLM(K,LMESS-3) - TLM(K,LMESS-2)
0317:            LX=16-LMESS
0318:            IF (DIF.LE.RKD(K,LX) .AND. LMESS.EQ.4) GO TO 1701
0319:            IF (DIF.GE.RKD(K,LX) .AND. LMESS.EQ.5) GO TO 1701
0320:            GO TO 1900
0321:      1701 CONTINUE
0322:            IF (TLM(K,2).LT.TLM(K,1)) GO TO 1710
0323:            WRITE (IPR2,1712)
0324:      1712 FORMAT (' HI LIMIT .GE. HI/HI LIMIT')
0325:            GO TO 100
0326:      1710 CONTINUE
0327:            IF (TLM(K,3).LT.TLM(K,2)) GO TO 1715
0328:            WRITE (IPR2,1714)
0329:      1714 FORMAT (' LO LIMIT .GE. HI LIMIT')
0330:            GO TO 100
0331:      1715 CONTINUEF
0332:            DO 1702 LX=1,3
0333:            RKD(K,LX)=TLM(K,LX)
0334:      1702 CONTINUE
0335:            WRITE (IPR2,1705) NCELL(K)
0336:      1705 FORMAT (' CELL LINE ',AI,' LIMITS ENTERED')
0337:            GO TO 8003
0338:      1800 CONTINUE
0339:            IF (LMESS.LE.3) WRITE (IPR2,1801) LMESS
0340:      1801 FORMAT (' LIMIT ',I1,' OUT OF BOUNDS')
0341:            LMX=LMESS-3
0342:            IF (LMESS.GE.4) WRITE (IPR2,1802) LMX,(SML(IK,LX),IK=1,2)
0343:      1802 FORMAT (' DIFFERENCE ',I1,' TOO ',2A4)
0344:            GO TO 100
0345:      C ****************************
0346:       101 CONTINUE
0347:            ITDFL=1
0348:            RETURN
0349:       102 WRITE(IPR2,202)
0350:            L=1
0351:            GO TO 150
0352:       103 DIMDPLFL = 1
0353:            RETURN
0354:       104 CONTINUE
0355:            WRITE(IPR2,2049)
0356:      2049 FORMAT (' DEVICE 2=PRINT 3=CRT         '/)
```

```
0357:           X' LOGS 1=EVNT 2=CODSTAT 3=S4FSUM'/        00015400
0358:           X' 4=PLOT 5=DAYSUM 5=DEMLOG '/             00015500
0359:           X' 7=CCIEV 9=UTLSUM 10=OPL CODES '/        00015600
0360:           X' 11=OPL PB RESPONSE  ')                  00015700
0361:           WRITE(IPR2,204)                            00015800
0362:      204  FORMAT(' LOG,DEV CODES= ')                 00015900
0363:           L=2                                        00016000
0364:           GO TO 250                                  00016100
0365:      C                                               00016200
0366:      C HOLIDAY UPDATE - DISPLAY AND PROMPT           00016300
0367:      1015 CONTINUE                                   00016400
0368:           WRITE(IPR2,10151)                          00016500
0369:      10151 FORMAT(' HOLIDAYS ARE (MO/DATE):')        00016600
0370:           I=1                                        00016700
0371:           DO 10153 K=1,8                             00016800
0372:           LINE(K) = 0                                00016900
0373:      10152 CONTINUE                                  00017000
0374:           L=1                                        00017100
0375:      10154 ITEM = MDHOLDY(I)                         00017200
0376:      S    LDA ITEM                                   00017300
0377:      S    LDG KSLC8                                  00017400
0378:      S    SHF 5                                      00017500
0379:      S    AND KXOOFF                                 00017600
0380:      S    STA IM                                     00017700
0381:      S    LDA ITEM                                   00017800
0382:      S    AND KXOOFF                                 00017900
0383:      S    STA ID                                     00018000
0384:           LINE(K) = IM                               00018100
0385:           INC K                                      00018200
0386:           LINE(K) = ID                               00018300
0387:           INC I                                      00018400
0388:           INC K                                      00018500
0389:           IF (K.GT.8) GO TO 10155                    00018600
0390:           IF (I.GT.MDHOLSZ) GO TO 10155              00018700
0391:           GO TO 10154                                00018800
0392:      C                                               00018900
0393:      C WRITE OUT A LINE                              00019000
0394:      10155 WRITE(IPR2,10156) (LINE(K),K=1,8)         00019100
0395:      10156 FORMAT (4(1X,I2,1H/,I2,1X))               00019200
0396:           IF (I.LE.MDHOLSZ) GO TO 10152              00019300
0397:      C                                               00019400
0398:           WRITE(IPR2,10157)                          00019500
0399:      10157 FORMAT(' 0,0=CLR 0,1=EXIT MO,DAY=')       00019600
0400:           L=2                                        00019700
0401:           GO TO 250                                  00019800
```

```
      C  PULFAC UPDATE - PROMPT                                       00019900
      C                                                               00020000
      C                                                               00020100
 1020 CONTINUE                                                        00020200
      WRITE(IPR2,10201)                                               00020300
10201 FORMAT(' MET,WATTHR/PUL=')                                      00020400
      L=2                                                             00020500
      GO TO 260                                                       00020600
      C                                                               00020700
 1025 CONTINUE                                                        00020800
      C                                                               00020900
      C  SELECT REMOTE NUMBER                                         00021000
      WRITE(IPR2,1072)                                                00021100
      L=1                                                             00021200
      GO TO 260                                                       00021300
 1041 WRITE(IPR2,1042)                                                00021400
      L=1                                                             00021500
      GO TO 150                                                       00021550
  105 GO TO 9                                                         00021600
      C                                                               00021700
  106 AIMOPLFL = 1                                                    00021800
      RETURN                                                          00021900
      C                                                               00022000
  107 IF(IPASS.EQ.10P)GO TO 1016                                      00022100
      WRITE(IPR2,207)                                                 00022200
      L=3                                                             00022300
      GO TO 150                                                       00022350
 1071 WRITE(IPR2,1072)                                                00022400
      L=1                                                             00022500
      GO TO 260                                                       00022600
      C  PUNCH AND READ THE DATA TABLES                               00022700
      C  THE SYSTEM INTERRUPT VECTORS ARE ZEROED OUT                  00022800
      C  DURING THIS PROCESS THEREFORE IT IS NECESSARY FOR            00022900
      C  THE SYSTEM TO BE IN MANUAL CONTROL...............            00023000
      C                                                               00023100
  108 CONTINUE                                                        00023200
      IF(MANUAL.EQ.1) GO TO 120                                       00023300
      IMESS = 3                                                       00023400
      CALL M:ID(90)                                                   00023500
      IPSTAT=0                                                        00023600
      IF(J.EQ.10)GO TO 109                                            00023700
      GO TO 100                                                       00023800
  109 IBIAS=0                                                         00024100
                                                                      00024300
```

```
0446:                                                                              00024400
0447: C IF 100 CLOSE TO A DEMAND LOG, DO NOT START A PUNCH                         00024500
0448:       GO TO 100                                                              00024600
0449:  120 WRITE(IPR2,2009)                                                        00024700
0450:       GO TO 100                                                              00024800
0451: 1011 WRITE(IPR2,2011)                                                        00024900
0452:  500 L=2                                                                     00025000
0453:       GO TO 260                                                              00025100
0454: 1012 WRITE(IPR2,2012)                                                        00025200
0455:       L=1                                                                    00025300
0456:       GO TO 260                                                              00025400
0457: 1013 WRITE(IPR2,2013)                                                        00025500
0458:       GO TO 500                                                              00025600
0459: C DEMLIM "H" HR CHANGE                                                       00025700
0460: 1014 WRITE(IPR2,2014) DLIMTIM1,DLIMTIM2                                      00025800
0461: 2014 FORMAT(' HR1=',I2,' HR2=',I2 /' HR#,TIME(0-23) = ')                     00025900
0462:       L=2                                                                    00026000
0463:       GO TO 250                                                              00026100
0464: C                                                                            00026200
0465: 1016 GO TO 9                                                                 00026300
0466: 1017 WRITE(IPR2,2017)                                                        00026400
0467:       L=2                                                                    00026500
0468:       GO TO 260                                                              00026600
0469: 1019 WRITE(IPR2,2019)                                                        00026700
0470:       L=2                                                                    00026800
0471:       GO TO 260                                                              00026900
0472:  200 CONTINUE                                                                00027000
0473:       GO TO 9                                                                00027100
0474: 1021 CONTINUE                                                                00027200
0475:       CALL PROGFCN (V,KD,NP,VALBUF,SIMFLG,RKD,INP)                           00027300
0476:       RETURN                                                                 00027400
0477: C PRINT MONTH'S TOTALS INCLUDING TIME INFO                                   00027500
0478: 1022 CONTINUE                                                                00027600
0479: C PROMPT FOR SNAPSHOT OR CLEAR                                               00027700
0480:       WRITE (IPR2,10221)                                                     00027800
0481: 10221 FORMAT(' ENTER 0=SNAPSHOT  1=RESET')                                   00027900
0482:       L=1                                                                    00028000
0483:       GO TO 260                                                              00028100
0484: 3022 CONTINUE                                                                00028200
0485:       ITEM = J1(1)-1                                                         00028300
0486:     S LDA #1:MNTH                                                            00028400
0487:     S STA IMNTH                                                              00028500
0488:     S LDA #1:DATE                                                            00028600
0489:     S STA IDATE                                                              00028600
```

```
0490:  C PRINT DATES
0491:         WRITE(IPR,12022) IMNTHO,IDATED,IMNTH,IDATE
0492:  C PRINT TOTALS
0493:         WRITE(IPR,20022) MDEMAND,MENERGY
0494:         GO TO 30221
0495:  30222 CONTINUE
0496:  C MONTHLY REACTIVE ENERGY
0497:         WRITE(IPR,22022) MRKVAH
0498:  30221 CONTINUE
0499:       S  LDA ITEM
0500:       S  ZJP 130223
0501:         RETURN
0502:  C RESET
0503:  30223 CONTINUE
0504:         MRKVAH = 0.0
0505:  22022 FORMAT(' REACTIVE ',F14.0,' RKVAH')
0506:  C
0507:         MDEMAND=0.0
0508:         MENERGY=0.0
0509:         IREAD=1
0510:  C UPDATE LAST READ DATE
0511:         IMNTHO = IMNTH
0512:         IDATED = IDATE
0513:         RETURN
0514:  1023  WRITE(IPR2,2023)
0515:         K=2
0516:         GO TO 260
0517:  C
0518:  C
0519:       9 WRITE(IPR2,11000)
0520:         GO TO 120
0521:  11000 FORMAT(' ERROR')
0522:  C
0523:  C
0524:  1042  FORMAT(' ENTER 1=AUTO, 0=MANUAL ')
0525:  202   FORMAT(1H ,22HENTER UNDER-TARGET KW )
0526:  207   FORMAT(' ENTER UNIT#,PARM#,VALUE')
0527:  208   FORMAT(Z4)
0528:  209   FORMAT(1H ,22HPLACE SYSTEM ON MANUAL)
0529:  1072  FORMAT(1H ,12HENTER UNIT #)
0530:  2011  FORMAT (1H ,'ENTER CONSTRAINT POINT,VALUE')
0531:  2012  FORMAT (1H ,'ENTER CONSERVATION THRESHOLD')
0532:  2013  FORMAT(1H ,'ENTER UNIT#,CONTROL CODE')
0533:  2017  FORMAT (' ENTER NO AND FULL CONTROL SECS'/' = ')
```

```
0534:  2019 FORMAT(' OPTION #,0 =DISABLE/1 =ENABLE ')                           00033100
0535:  2022 FORMAT(' HI DEM ',F10.0,' KW ' /' TOT ENGY ',F16.0,' KWH')          00033200
0536: 12022 FORMAT(' LAST READ ',I2,1H/,I2,' TODAY IS ',I2,1H/,I2)              00033300
0537:  2023 FORMAT(' ENTER PRI, 0/1= REL/CLMP')                                 00033400
0538:   150 CONTINUE                                                            00033500
0539: C     ENTER THE APPROPRIATE NUMBER OF DATA ELEMENTS                       00033900
0540:   260 CALL ENPACK(4,NN,A,B,NUMB)                                          00034000
0541:       IF (NN.EQ.L) GO TO 230                                              00034100
0542:       GO TO 9                                                             00034200
0543:   230 DO 111 I=1,L                                                        00034300
0544:       INDEX(II)=0                                                         00034400
0545:       II=7                                                                00034500
0546:       RTOT=0.0                                                            00034600
0547:       ITOT=0                                                              00034700
0548:       IF (J.NE.20.OR.I.NE.2) GO TO 70                                     00034750
0549:       DO 72 M2=1,MET
0550:       IF (MNAME(M2).EQ.M(2,6)) GO TO 73                                   00034800
0551:    72 CONTINUE                                                            00034900
0552:       GO TO 9                                                             00035000
0553:    73 CONTINUE                                                            00035100
0554:       J1(2)=M2                                                            00035200
0555:       GO TO 111                                                           00035300
0556:    70 CONTINUE                                                            00035400
0557: C     UNPACK THE ALPHA CHARACTERS AND CONVERT TO NUMBERS                  00035500
0558:       DO 11 M1=1,6                                                        00035600
0559:       I2=11-M1                                                            00035700
0560:       IF(M(I,I2).EQ.BLANK) GO TO 11                                       00035800
0561:       DO 12 M2=1,10                                                       00035900
0562:       IF(B(M2).EQ.M(I,I2)) GO TO 13                                       00036000
0563:    12 CONTINUE                                                            00036100
0564:       GO TO 200                                                           00036200
0565:    13 IF(M2.EQ.10) M2=0                                                   00036300
0566:       ITEM=M2*(10**(M1-1))                                                00036400
0567: C     CARRY CONVERTED NUMBER IN REAL ALSO FOR GT 65535 VALUE CAPABILITY   00036500
0568:       RM2=M2                                                              00036600
0569:       RTEM=RM2*(10.0**(M1-1))                                             00036700
0570:       RTOT=RTOT+RTEM                                                      00036800
0571: S     LDA  ITEM
0572: S     NJP  J113
0573: S     JMP  J114
0574: S 113 AND  X7FFF
0575: S     STA  ITEM
0576: C     INDEX(I) INDICATES THAT THE NUMBER WAS GREATER THAN 2**15
0577:       INDEX(I)=1
```

```
0578: S 114 LDA    ITEM                                                 00036900
0579: S     ADD    ITOT                                                 00037000
0580: S     NJP    JI15                                                 00037100
0581: S     STA    ITOT                                                 00037200
0582:       GO TO  11                                                   00037300
0583: S 115 AND    X7FFF                                                00037400
0584: S     STA    ITOT                                                 00037500
0585:       INDEX(I)=1                                                  00037600
0586:    11 CONTINUE                                                    00037700
0587:       JI(I)=ITOT                                                  00037800
0588:       RJI(I)=RTOT                                                 00037900
0589:   111 CONTINUE                                                    00038000
0590: C     BRANCH TO APPROPRIATE ACTION STATEMENTS                     00038100
0591:       IF (J.EQ.5) GO TO 3041                                      00038200
0592:       IF (J.EQ.18) GO TO 3017                                     00038300
0593:       IF (J.EQ.4) GO TO 3004                                      00038400
0594:       GO TO 100                                                   00038500
0595:   302 JJ=IBIAS                                                    00038600
0596:       IBIAS=JI(I)                                                 00038700
0597:       WRITE(IPR2,402) IBIAS,JJ                                    00038800
0598:       GO TO 100                                                   00038900
0599:   303 CONTINUE                                                    00039000
0600:   304 CONTINUE                                                    00039100
0601:       IL = JI(2)                                                  00039200
0602:       IC = JI(1)                                                  00039300
0603: C     IL=LOG CODE   IC = DEV CODE                                 00039400
0604:       IF(IL.LE.0) GO TO 9                                         00039500
0605:       IF(IC.LE.0) GO TO 9                                         00039600
0606:       IF(IL.GT.16) GO TO 9                                        00039700
0607:       IF(IC.GT. 5) GO TO 9                                        00039800
0608:       LOGDVT(IL) = DVCODT(IC)                                     00039900
0609:       GO TO 100                                                   00040000
0610:   306 CONTINUE                                                    00040100
0611: C                                                                 00040200
0612: C     "4"- DEMAND LIMIT TIME CHANGE TIME ENTRY                    00040300
0613: C         JI(2)= 1 OR 2   JI(1)= 0-23                             00040400
0614:  3014 ITEM = JI(2)-1                                              00040500
0615:       ITHR = JI(1)                                                00040600
0616:       IF(ITHR.GT.23) GO TO 9                                      00040700
0617:       IF(ITEM) 9,30141,30142                                      00040800
0618: 30142 IF(ITEM .GT. 1) GO TO 9                                     00040900
0619:       DLIMTIM2 = ITHR                                             00041000
0620:       GO TO 30143                                                 00041100
0621: 30141 DLIMTIM1 = ITHR                                             00041200
                                                                        00041300
```

```
0622:  30143 GO TO 100                                                              00041400
0623:  C                                                                            00041500
0624:  C     CHECK IF GOING TO MANUAL IF YES....                                    00041600
0625:  C        1.     PLACE ALL LOADS NOT IN MANUAL OT T.U.O. INTO AUTO. ON        00041700
0626:  C        2.     RELEASE THE CONSTRAINT OBER-RIDE                             00041800
0627:  3041  IS=JI(1)                                                               00041900
0628:       IF(IS.GT.1)GO TO 200                                                    00042000
0629:       MANUAL=IS                                                               00042100
0630:       IF (MANUAL.EQ.1) MATROB(N+1,1)=0                                        00042150
0631:       IF(IS.EQ.1)RETURN                                                       00042200
0632:  305  CONTINUE                                                                00044200
0633:       GO TO 100                                                               00044300
0634:  C     UNIT CHARACTERTICS                                                     00044400
0635:  307  IF(IPASS.EQ.IOP)GO TO 328                                               00044500
0636:       IF(IICU.EQ.1)GO TO 328                                                  00044600
0637:       IJ=JI(2)                                                                00044700
0638:       IJ=JI(3)                                                                00044800
0639:       IF(INDEX(1).EQ.1) GO TO 200                                             00044900
0640:       IF(II.LE.0)GO TO 200                                                    00045000
0641:       IF(III.GT.NP) GO TO 200                                                 00045100
0642:       IF(IJ.GT.N)GO TO 200                                                    00045200
0643:       JJ=KD(IJ,II)                                                            00045300
0644:       KD(IJ,II)=JI(1)                                                         00045400
0645:       WRITE(IPR2,407)  JI(3),JI(2),KD(IJ,II),JJ                               00045500
0646:  C     CHECK IF UPDATE OF SUB-PRI                                             00045600
0647:       IF(II.EQ.4)GO TO 617                                                    00045700
0648:       IF(II.NE.5)GO TO 100                                                    00045800
0649:  C     UP-DATE THE MAX TABLE                                                  00045900
0650:  617  DO 607 I=1,N                                                            00046000
0651:       II=0                                                                    00046100
0652:       DO 507 J=1,N                                                            00046200
0653:       IF(KD(J,4).EQ.1)II=II+1                                                 00046300
0654:  507  CONTINUE                                                                00046400
0655:       IMAX(II)=II                                                             00046500
0656:  607  CONTINUE                                                                00046600
0657:  C     NOW UPDATE THE SUB-PRI NUMBERS IN KD(K,5)                              00046700
0658:       DO 527 J=1,N                                                            00046800
0659:       II=IMAX(J)                                                              00046900
0650:       IF(II.EQ.1)II=0                                                         00047000
0661:       DO 627 K=1,N                                                            00047100
0662:       IF(KD(K,4).NE.J)GO TO 627                                               00047200
0663:  C     THIS UNIT IS PRI. J                                                    00047300
0664:       KD(K,5)=II                                                              00047400
0665:       IF(II.EQ.0)GO TO 527                                                    00047500
```

```
0566:         II=II-1
0667:    627  CONTINUE
0668:    527  CONTINUE
0669:    328  ICU = 0
0670:   3280  CONTINUE
0671:         GO TO 100
0672:  C      CONSTRAINT OVER-RIDE POINT VALUE UPDATE
0673:   3011  IF (J1(2).GE.3) GO TO 200
0674:         IF(J1(2).LE.0) GO TO 200
0675:         RJ=RJ1(I)
0676:         IF(J1(2).EQ.1) GO TO 4011
0677:         TJ=URIDE2
0678:         URIDE2=RJ
0679:   6011  WRITE(IPR2,7011) J1(2),TJ,RJ
0680:         GO TO 100
0681:   4011  TJ=URIDE1
0682:         URIDE1=RJ
0683:         GO TO 6011
0684:  C
0685:  C      CONSERVATION THRESHOLD UPDATE
0686:  C
0687:   3012  RJ=RJ1(I)
0688:         TJ=CTHRES
0689:         CTHRES=RJ
0690:         WRITE(IPR2,7012)TJ,CTHRES
0691:  S      IPL
0692:         GO TO 100
0693:  C
0694:  C      UNIT CONTROL MODIFICATION
0695:  C
0696:  C      WHERE VALUE IS =
0697:  C        0 = PLACE THE LOAD ON AUTO WITH OLD CONTROL
0698:  C        1 = EC ONLY
0699:  C        2 = DC ONLY
0700:  C        3 = EC/DC
0701:  C        4 = TOD ONLY
0702:  C        5 = EC/TOD
0703:  C        6 = DC/TOD
0704:  C        7 = EC/DC/TOD
0705:  C        8 = MANUAL OFF
0706:  C        9 = MANUAL ON
0707:  C       10 = SET LOAD OVER-RIDE PROTECT
0708:  C       11 = RE-SET LOAD OVER-RIDE PROTECT
0709:  C
```

```
0710:  C           CONTROL CODES OF 8 OR 9 DO NOT CHANGE THE LOAD CONTROL      00052000
0711:  C           BUT RATHER TEMPORILY OVER-RIDE THEM.                        00052100
0712:  C                                                                       00052200
0713:  C           USE CONTROL CODE 0 TO PLACE THE UNIT BACK INTO THE SYSTEM.  00052300
0714:  C                                                                       00052400
0715:       3013   IL=J1(2)                                                    00052500
0716:              IC=J1(1)                                                    00052600
0717:              IF(IL.GT.N) GO TO 200                                       00052700
0718:              IF(IC.LT.0)GO TO 200                                        00052800
0719:              IF(IC.GT.11)GO TO 200                                       00052900
0720:              IF(IC.EQ.8) GO TO 4013                                      00053000
0721:              IF (IC.EQ.9) GO TO 5013                                     00053100
0722:              IF(IC.GE.10)GO TO 9014                                      00053200
0723:              IF(IC.EQ.0)GO TO 9800                                       00053300
0724:  C           INSURE A CONTROL MODE CHANGE IS DONE WHEN THE LOAD IS IN MANUAL  00053400
0725:  C           OR ELSE THE LOAD MIGHT GET HUNG IN AN OFF STATE             00053500
0726:              J77=KD(IL,10)                                               00053600
0727:  S           NJP 19500                                                   00053700
0728:              GO TO 9600                                                  00053800
0729:       S9500  LDA J77                                                     00053900
0730:  S           AND IX1                                                     00054000
0731:  S           ZJP 19600                                                   00054100
0732:       9800   J77=KD(IL,13)                                               00054200
0733:              ITEM=J77                                                    00054300
0734:  C           SAVE LOAD BITS                                              00054400
0735:  S           LDA ITEM                                                    00054500
0736:  S           AND IXF                                                     00054600
0737:  S           STA ITEMX                                                   00054700
0738:  S           LDG ISF                                                     00054800
0739:  S           LDA ITEM                                                    00054900
0740:  S           SHF 5                                                       00055000
0741:  S           STA ITEM                                                    00055100
0742:              IOLD=ITEM                                                   00055200
0743:              IF(IC.EQ.0) GO TO 370                                       00055300
0744:              ITEM=IC+4096                                                00055400
0745:  C           RESTORE PROTECVT BITS                                       00055500
0746:              ITEM=ITEM+ITEMX                                             00055600
0747:              KD(IL,13)=ITEM                                              00055700
0748:       6013   WRITE(IPR2,7013)IL,IOLD,IC                                  00055800
0749:              GO TO 100                                                   00055900
0750:       9600   WRITE(IPR2,7021)                                            00056000
0751:              GO TO 100                                                   00056100
0752:  C           PLACE LOAD ON MANUAL OFF                                    00056200
0753:       4013   KD(IL,9)=MASK(3)                                            00056300
```

```
0754: S       INC  196                                              00056400
0755: S       CDR  +240                                             00056600
0756: S       DCR  196                                              00056700
0757: S       PJP  $+2                                              00056800
0758: S       STZ  196                                              00056900
0759: S       CDR  +160                                             00057000
0760: S       WRITE(IPR2,7015)IL                                    00057100
0761: S       GO TO 100                                             00057200
0762: C       PLACE LOAD ON MANUAL ON                               00057300
0763:   5013  KD(IL,9)=-32767                                       00057400
0764: S       INC  196                                              00057500
0765: S       CDR  +240                                             00057700
0766: S       DCR  196                                              00057800
0767: S       PJP  $+2                                              00057800
0768: S       STZ  196                                              00057900
0769: S       CDR  +160                                             00058000
0770: S       WRITE(IPR2,7017)IL                                    00058100
0771:         GO TO 100                                             00058200
0772: C       PLACE UNIT BACK ON AUTO. I.E. REMOVE FROM MANUAL      00058300
0773:   370   ITEM=KD(IL,9)                                         00058400
0774: S       AND  IXF                                              00058500
0775: S       STA  ITEM                                             00058700
0776:         KD(IL,9)=ITEM                                         00058800
0777:         IC=IOLD                                               00058900
0778:         GO TO 6013                                            00059000
0779: C       CONSTRAINT OVER-RIDE CONTROL                          00059100
0780:   9014  ITEM=KD(IL,13)                                        00059200
0781:         IF(IC.EQ.11)GO TO 9015                                00059300
0782: S       LDA  ITEM                                             00059400
0783: S       AND  IXFFFE                                           00059500
0784: S       EOR  IX1                                              00059600
0785: S       STA  ITEM                                             00059700
0786:         IOLD=1                                                00059800
0787:         GO TO 8013                                            00059900
0788: S9015   LDA  ITEM                                             00060000
0789: S       AND  IXFFFE                                           00060100
0790: S       STA  ITEM                                             00060200
0791:         IOLD=0                                                00060300
0792:   8013  KD(IL,13)=ITEM                                        00060400
0793:         WRITE(IPR2,7020)IL,IOLD                               00060500
0794:         GO TO 100                                             00060600
0795: C                                                             00060700
0796: C                                                             00060800
0797: C       UPDATE NOCSEC AND NOFINSC                             00060900
0798: C                                                             00061000
```

```
0799:  3017 CONTINUE
0800:       NTEMP=JI(2)
0801:       MTEMP=JI(1)
0802:       JJ=60.*DEMPER
0803:       IF (NTEMP.LT.0.OR.NTEMP.GT.JJ.OR.MTEMP.LT.NTEMP.OR.MTEMP.GT.JJ)
0804:      1 GO TO 9
0805:       IOLDI=NOCSEC
0806:       IOLD2=NFINSC
0807:       NOCSEC=NTEMP
0808:       NFINSC=MTEMP
0809:       WRITE (IPR2,7018) IOLDI,IOLD2,NOCSEC,NFINSC
0810:       GO TO 100
0811: C
0812: C    OPTION FLAG MODIFICATION -- OPTION #,0=DISABLE / 1=ENABLE
0813: C
0814: C    WHERE OPTION #'S ARE
0815: C       1 = EC
0816: C       2 = TOD
0817: C       3 = ON LINE SIMULATION
0818: C       4 = STATUS SCAN
0819: C       5 = FLOATING TARGET
0820: C       6 = CONSTRAINT OVER-RIDE
0821: C
0822:  3019 II=JI(2)
0823:       IY=JI(1)
0824:       IF(II.GT.7) GO TO 200
0825:       IS=I
0826:       IF(IY.EQ.0)IS=0
0827:       GO TO(3191,3192,3193,3194,3195,3196,3197),II
0828:  3191 NEC=IS
0829:       GO TO 3199
0830:  3192 NTOD=IS
0831:       GO TO 3199
0832:  3193 CONTINUE
0833:       GO TO 9
0834:  3195 I:FLOAT=IS
0835:       GO TO 3199
0836:  3196 IORIDE=IS
0837:       GO TO 3199
0838:  3197 GO TO 9
0839:  3199 WRITE(IPR2,7019)II,IS
0840:       GO TO 100
0841: C
0842: C PULSE FACTOR UPDATE- ENTERED AS WAITHR/PUL
```

```
0843:         3020 CONTINUE                                              00065800
0844:              IM= JI(2)                                             00065900
0845:              RTEM = RJI(1)                                         00066000
0846:              IF (IM.LE.0) GO TO 9                                  00066100
0847:              IF (IM.GT.MET) GO TO 9                                00066200
0848:         C GOOD METER NO. - CONVERT TO KWH/PUL                      00066300
0849:              RTEM = RTEM/1000.0                                    00066400
0850:              PULFAC(IM) = RTEM                                     00066500
0851:              GO TO 100                                             00066600
0852:         C                                                          00066700
0853:         C HOLIDAY UPDATE                                           00066800
0854:         C                                                          00066900
0855:         3015 CONTINUE                                              00067000
0856:     S        IM = JI(2)                                            00067100
0857:     S        ID = JI(1)                                            00067200
0858:     S        LDA IM                                                00067300
0859:     S        ADD ID                                                00067400
0860:     S        ZJP )30151                                            00067500
0861:     S        DCR 5                                                 00067600
0862:     S        ZJP )100                                              00067700
0863:     S        JMP )30152                                            00067800
0864:         C                                                          00067900
0865:         C CLEAR MDHOLDY                                            00068000
0866:         30151 CONTINUE                                             00068100
0867:              DO 30153 I=1,MDHOLSZ                                  00068200
0868:              MDHOLDY(I) =0                                         00068300
0869:         30153 CONTINUE                                             00068400
0870:              GO TO 1015                                            00068500
0871:         C                                                          00068600
0872:         C ADD TO MDHOLDY                                           00068700
0873:         30152 CONTINUE                                             00068800
0874:              IF(IM.LE.0) GO TO 9                                   00068900
0875:              IF (IM..GT. 12) GO TO 9                               00069000
0876:              IF(ID.LE.0) GO TO 9                                   00069100
0877:              IF(ID .GT. NUMDAYS(IM)) GO TO 9                       00069200
0878:         C GOOD MONTH AND DAY                                       00069300
0879:     S        LDG =8                                                00069400
0880:     S        LDA IM                                                00069500
0881:     S        SHF 5                                                 00069600
0882:     S        ADD ID                                                00069700
0883:     S        STA ITEM                                              00069800
0884:         C ITEM CONTAINS MO/DAY                                     00069900
0885:              DO 30154 I=1,MDHOLSZ                                  00070000
0886:              IF(ITEM.EQ.MDHOLDY(I)) GO TO 1015                     00070100
0887:         30154 CONTINUE
```

```
0888:            DO 30155 I=1,MDHOLSZ                          000702C0
0889:            IF(MDHOLDY(I).EQ.0) GO TO 30157                000703C0
0890:     30155 CONTINUE                                        000704C0
0891:            GO TO 30156                                    000705C0
0892:     30156 MDHOLDY(I) = ITEM                               000706C0
0893:            GO TO 1015                                     000707C0
0894:    C                                                      000708C0
0895:    C  MDHOLDY IS FULL - BUMP ALL ENTRIES DOWN I & PUT ITEM IN TOP ENTRY 000709C0
0896:     30157 CONTINUE                                        000710C0
0897:            I=MDHOLSZ-1                                    000711C0
0898:            J=MDHOLSZ                                      000712C0
0899:     30158 MDHOLDY(J)=MDHOLDY(I)                           000713C0
0900:    S       DCR J                                          000714C0
0901:    S       DCR I                                          000715C0
0902:            IF(I.GT.0) GO TO 30158                         000716C0
0903:     30159 MDHOLDY(I) = ITEM                               000717C0
0904:            GO TO 1015                                     000718C0
0905:    C                                                      000719C0
0906:    C                                                      000720C0
0907:    C  REMOTE NO. SELECTION                                000721C0
0908:      3025 ITEM = J1(1)                                    000722C0
0909:            IF (ITEM .LT. 0) GO TO 9                       000723C0
0910:            REQRNO = ITEM                                  000724C0
0911:            GO TO 100                                      000725C0
0912:    C                                                      000726C0
0913:      3023 II=J1(2)                                        000727C0
0914:            IY=J1(1)                                       000728C0
0915:            IF(II.GT.N)GO TO 9                             000729C0
0916:            IS=1                                           000730C0
0917:            IF(IY.EQ.0)IS=0                                000731C0
0918:            IM=IPRI(II)                                    000732C0
0919:            IPRI(II)=IS                                    000733C0
0920:            WRITE(IPR2,7023)II,IM,IS                       000734C0
0921:            GO TO 100                                      000735C0
0922:    C                                                      000736C0
0923:      3024 CONTINUE                                        000737C0
0924:            GO TO 9                                        000738C0
0925:    C                                                      000739C0
0926:    C                                                      000740C0
0927:       402 FORMAT(1H ,8HBIAS IS ,I4,3H KW,2X,3HW4S,I6,3H KW) 000741C0
0928:       407 FORMAT(' #',I2,' PARM',I2,' = ',I6,' WAS ',I6)   000742C0
0929:      7011 FORMAT(' ORIDE ',I2,' WAS ',F7.0,' IS ',F7.0)    000743C0
0930:      7012 FORMAT(' THHOLD WAS ',F7.0,' IS ',F7.0)          000744C0
0931:      7013 FORMAT(' UNIT ',I4,' CONTROL WAS ',I2,' IS ',I2) 000745C0
```

```
0932:  7016 FORMAT(" UNIT ",I4," NOW MANUAL/OFF")                    00074600
0933:  7017 FORMAT(" UNIT ",I4," NOW MANUAL/ON ")                    00074700
0934:  7018 FORMAT(" CONTROL TIMES WERE ",2I5/15X,"ARE ",2I5)        00074800
0935:  7019 FORMAT(" OPT ",I2," IS ",I2)                             00074900
0936:  7020 FORMAT(" UNIT ",I2," ORIDE PROTECT = ",I2)               00075000
0937:  7021 FORMAT(" UNIT IS NOT MANUAL ON ")                        00075100
0938:  7023 FORMAT(" PRI ",I4," WAS ",I4," IS ",I4)                  00075200
0939:  1000 CONTINUE                                                 00075300
0940:       RETURN                                                   00075400
0941:       END                                                      00075500

0001: C                                                              00000100
0002: C     THIS SUBSI SIMULATES KKD'S AND HANDLES KVAH, TAPCHNGRS, & ON/OFF'S 00000200
0003:       SUBROUTINE SSRSIM(RD,REP,SIMAGE,SIMMIT,CCISIZ,SIMTIM,WORDBU,        00000300
0004:      1 MILAGE,SPILL,PULFAC,FAIL,LOMET,KVIOL,RND,JER,VALBUE,COMFAC,        00000400
0005:      2 OFFSET)                                                 00000500
0006: C  CALLED BY LGASIM WHICH IS BID BY SU225 CLOCK                00000600
0007: C  30 S READ TIMES/SECOND TO SET SIMULATED CCI'S IN SIMAGE TABLE 00000700
0008: C  CISCAN AT ADJUSTS CIIMAGE TABLE PER SIMAGE TABLE             00000800
0009: C                                                              00000900
0010: C  ENTER 1 MUST BE PLANT KWH METER                             00001050
0011: C  ENTER 2, IF IT HAS NO METER ENTRY, IS CUSTOMERED PLANT KVAH METER 00001100
0012: C     AND WILL BE GIVEN RCK*METER 1'S KV                       00001200
0013: C  LOCATION RCK IS REACTIVE/REAL RATIO = SQRT((1/PF**PF)-1)    00001300
0014: C     PF :   0.96   0.80   0.70   0.60   0.50   0.45           00001400
0015: C     RCK:   0.49   0.75   1.02   1.33   1.73   2.00           00001500
0016: C  RCK IS CALLED IN THIS PROGRAM                               00001600
0017: C                                                              00001700
0019: C USES RKD TABLES AND KD TABLES                                00001800
0020:       COMMON/TABS/ITAPID(6,2),DBL,ATRIB(6,5),MAIKEY(6,5)       00001900
0021:       INTEGER VALBUE(4)                                        00002200
0022:       DIMENSION COMFAC(4),OFFSET(4)                            00002300
0023:       GLOBAL PULPAM,LOMET,ERRIDI                               00002400
0024:       REAL RKD(E,NPR)                                          00002500
0025:       INTEGER KD(N,NE)                                         00002600
0026:       INTEGER KPTED(E)                                         00002700
0027:       INTEGER SIMTIM(N),WORDBU(N),ATFASK(N)                    00002800
0028:       INTEGER CCISIZ                                           00002900
0029:       INTEGER SIMAGE(CCISIZ),SIMMIT(CCISIZ)                    00003000
0030:       INTEGER FAIL(8)                                          00003100
0031:       INTEGER LOMET(N)                                         00003200
0032:       INTEGER KVIOL(E)                                         00003300
0033:       REAL PULFAC(N)                                           
0034:       GLOBAL SSPASH                                            
```

```
0035:            DATA KKK /1.0/                              00003400
0036:            DATA KRATE/30./                             00003500
0037:            DATA KX0001 /30001/                         00003600
0038:            DATA KFFFF /5FFFF/                          00003700
0039:      C                                                 00003800
0040:      C    EXECUTION START                              00003900
0041:      C                                                 00004000
0042:      C                                                 00004100
0043:      C    SIMULATE PLANT KWH PULSE CHECK               00004200
0044:      C                                                 00004300
0045:      C    ADD UP KW OF ALL LOADS ON + BASE             00004400
0046:                 TOTKW = SSBASE                         00004500
0047:                 DO 10 I=1,N                            00004600
0048:                 ITEM = KD(I,10)                        00004700
0049:      S          LDA ITEM                               00004800
0050:      S          AND KX0001                             00004900
0051:      S          ZJP J10                                00005000
0052:      C          LOAD IS ON                             00005100
0053:                 RKW=KD(I,1)                            00005200
0054:                 TOTKW = TOTKW + RKW                    00005300
0055:        10  CONTINUE                                    00005400
0056:      C    SIMULATE MALFCNS OF MAIN METER IF REQUIRED   00005500
0057:                 IF (MALREQ(N+1,1).EQ.1) TOTKW=1.1*PHIPWR 00005600
0058:                 IF (MALREQ(N+1,1).EQ.-1) TOTKW=.9*PLOPWR 00005700
0059:      C    CALCULATE SECONDS BETWEEN PULSES AT THIS POWER 00005800
0060:                 SEC = (3600.0 * PULFAC(1))/TOTKW       00005900
0061:      C    CHANGE UNITS TO REFLECT RATE AT WHICH THIS PROGRAM RUNS 00006000
0062:                 SEC = KRATE * SEC                      00006100
0063:                 IF (SEC .GT. 32760.0) SEC = 32760.0    00006200
0064:                 ISEC = SEC                             00006250
0065:                 IF (ISEC .GT. SIMTIM(1)) GO TO 20      00006300
0066:      C    SIMULATE A PLANT KWH PULSE VIA SIMAGE        00006400
0067:                 IWORD = WORDNO(1)                      00006500
0068:                 IMASK = H11MSK(1)                      00006600
0069:      S          LDA IMASK                              00006700
0070:      S          EOR KXFFFF                             00006800
0071:      S          STA IMASKN                             00006900
0072:      S          CDR *240                               00007000
0073:                 ITEM = SIMAGE(IWORD)                   00007100
0074:      S          LDA ITEM                               00007200
0075:      S          AND IMASKN                             00007300
0076:      S          ADD IMASK                              00007400
0077:      S          STA ITEM                               00007500
0078:                 SIMAGE(IWORD) = ITEM                   00007600
```

```
0079:  S         CDR *160                                                      00008400
0080:  C    RESET TIME SINCE LAST KWH PULSE                                    00008500
0081:  S         SIMTIM(1) = 1                                                 00008600
0082:  S         GO TO 30                                                      00008700
0083:  C                                                                       00008800
0084:  C    NO PLANT KWH PULSE DUE - MAKE SURE BIT IS DOWN                     00008900
0085:  S     20  IWORD = WORDNO(1)                                             00009000
0086:  S         IMASK = BITMASK(1)                                            00009100
0087:  S         LDA IMASK                                                     00009200
0088:  S         EOR KXFFFF                                                    00009300
0089:  S         STA IMASKN                                                    00009400
0090:  S         CDR *240                                                      00009500
0091:  S         ITEM = SIMAGE(IWORD)                                          00009600
0092:  S         LDA ITEM                                                      00009700
0093:  S         AND IMASKN                                                    00009800
0094:  S         STA ITEM                                                      00009900
0095:  S         SIMAGE(IWORD) = ITEM                                          00010000
0096:  S         CDR *160                                                      00010100
0097:  C    BUMP TIMER                                                         00010200
0098:  S         SIMTIM(1)=SIMTIM(1)+1                                         00010300
0099:  S         IF (SIMTIM(1) .LT. 0) SIMTIM(1)=32767                         00010400
0100:  C                                                                       00010500
0101:  S     30  CONTINUE                                                      00010600
0102:  S         IF(M.EQ.1) RETURN                                             00010700
0103:  C                                                                       00010800
0104:  C    SIMULATE LOAD KWH METER PULSES                                     00010900
0105:  S         DO 40 I=2,M                                                   00011000
0106:  S         IF (I .EQ. 2) GO TO 60                                        00011100
0107:  S         IF(METLD(I) .LE. 0) GO TO 40                                  00011200
0108:  S     70  CONTINUE                                                      00011300
0109:  C    METER HAS A LOAD                                                   00011400
0110:  S         LN = METLD(I)                                                 00011500
0111:  S         ITEM = KD(LN,10)                                              00011600
0112:  S         LDA ITEM                                                      00011700
0113:  S         AND KX0001                                                    00011800
0114:  S         ZJP )50                                                       00011900
0115:  C    LOAD IS ON - CALCULATE SEC BETWEEN PULSES FOR IT                   00012000
0116:          RLKW=KD(LN,1)
0117:  C         SIMULATE MALFCNS ON CELL LINE METERS
0118:            IF (MALREG(LN,1).EQ. 1) RLKW=1.1*RKD(LN,22)
0119:            IF (MALREG(LN,1).EQ.-1) RLKW= .9*RKD(LN,23)
0120:  61  CONTINUE                                                            00013100
0121:       SECL = (3600.0 * PULFAC(I))/RLKW                                   00013200
0122:  C    CHANGE UNITS TO 0.1 SEC SINCE THIS RUNS EVERY 0.1 SEC              00013300
0123:       SECL = RRATE * SECL                                                00013400
```

```
0124:        IF (SECL .GT. 32760.0) SECL = 32760.0              00013500
0125:        ISECL = SECL                                        00013600
0126:        IF (ISECL .GT. SIMTIM(I)) GO TO 50                  00013700
0127: C  SIMULATE A LOAD KWH PULSE                               00013800
0128:        IWORD = WORDNO(I)                                   00013900
0129:        IMASK = BITMSK(I)                                   00014000
0130:     S  LDA IMASK                                           00014100
0131:     S  EOR KXFFFF                                          00014200
0132:     S  STA IMASKN                                          00014300
0133:     S  CDR *240                                            00014400
0134:        ITEM = SIMAGE (IWORD)                               00014500
0135:     S  LDA ITEM                                            00014600
0136:     S  AND IMASKN                                          00014700
0137:     S  ADD IMASK                                           00014800
0138:     S  STA ITEM                                            00014900
0139:        SIMAGE(IWORD) = ITEM                                00015000
0140:     S  CDR *160                                            00015100
0141: C  RESET TIMER                                             00015200
0142:        SIMTIM(I) = 1                                       00015300
0143:        GO TO 40                                            00015400
0144: C                                                          00015500
0145: C  NO LOAD KWH PULSE DUE                                   00015600
0146: C                                                          00015700
0147:     50 IWORD = WORDNO(I)                                   00015800
0148:        IMASK = BITMSK(I)                                   00015900
0149:     S  LDA IMASK                                           00016000
0150:     S  EOR KXFFFF                                          00016100
0151:     S  STA IMASKN                                          00016200
0152:     S  CDR *240                                            00016300
0153:        ITEM = SIMAGE(IWORD)                                00016400
0154:     S  LDA ITEM                                            00016500
0155:     S  AND IMASKN                                          00016600
0156:     S  STA ITEM                                            00016700
0157:        SIMAGE(IWORD) = ITEM                                00016800
0158:     S  CDR *160                                            00016900
0159: C  BUMP TIMER                                              00017000
0160:        SIMTIM(I) = SIMTIM(I) + 1                           00017100
0161:        IF(SIMTIM(I) .LT. 0) SIMTIM(I)= 32767               00017200
0162: C                                                          00017300
0163:     40 CONTINUE                                            00017400
0164: C     SET ANALOGS TOO HI OR LOW FOR NO AVAILABLE CONTROL MALFCN  00017500
0165:        IF (MALREG(N+1,2).NE.1) GO TO 80
0166:        INDEX=2
0167:        SIGN=-1.
```

```
0168:        IF (ERROUT.GT.0.) GO TO 88                                   00017600
0169:        INDEX=3                                                      00017700
0170:        SIGN=1.                                                      00017800
0171:  88    CONTINUE                                                     00017900
0172:        DO 85 I=1,N                                                  00018000
0173:        VALBUF(I)=256./CONFAC(I)*(RKD(I,INDEX)+SIGN*RKD(I,14)/2.-OFFSET(I) 00018100
0174:       1)                                                            00018200
0175:  85    CONTINUE                                                     00018300
0176:        MALREQ(N+1,2)=0                                              00018400
0177:  80    CONTINUE
0178:        DO 110 I=1,N
0179:        IF (MALREQ(I,2).EQ.0) GO TO 110
0180:        IF (MALREQ(I,2).EQ.1) VALBUF(I)=255
0181:        IF (MALREQ(I,2).EQ.-1) VALBUF(I)=1
0182:        MALREQ(I,2)=0
0183:  110   CONTINUE
0184:        DO 600 I=1,N
0185:        IF (MALREQ(I,5).EQ.0) GO TO 600
0186:  C           CELL TRIP MALFCN.
0187:        VALBUF(I)=0
0188:        KD(I,1)=0
0189:  600   CONTINUE
0190:        RETURN
0191:  C
0192:  C METER 2 - MAY BE RKVAH
0193:  60    CONTINUE
0194:        IF (METLD(I) .GT. 0) GO TO 70
0195:  C IS RKVAH METER
0196:        RLKW = RKK * TOTKW
0197:        GO TO 61
0198:        END
0001:  C
0002:  C GPEMS SVCUPL JAN 79                                              00000100
0003:  C                                                                  00000200
0004:        SUBROUTINE SVCUPL(KD,N,NP,M,UNSTK,OFSLK,DCOFSK,SUMPR,IPGRP,PULFAC 00000300
0005:       1,PRR,METLD,LDMET,KWTUT,PBN,LSW,IMAGE,RKD,INP,ENGVAL)         00000400
0006:  C                                                                  00000500
0007:        GLOBAL KEYON                                                 00000600
0008:        GLOBAL 1:HOUR,1:MIN,1:SEC,1:MNTH,1:DATE,T:MESS,T:DR,T:KYBD   00000700
0009:        GLOBAL IPK,IPK2,ICRT,DEMLIM,TINPER,IPERR,DEMPER,NFINSC,NOCSEC 00000800
0010:        GLOBAL ICNFLG,MANUAL                                         00000900
0011:        GLOBAL IMESS,NTUD,NEC,TURIDE                                 00001000
0012:        GLOBAL IDLOG,1:SHF,1:FLOAT                                   00001100
```

```
0013:      GLOBAL ILEDS,IOPCKT,IOPKB                                    00001300
0014:      GLOBAL DLIMVAL1,DLIMVAL2,DLIMTIM1,DLIMTIM2                   00001400
0015:      REAL DLIMVAL1,DLIMVAL2                                       00001500
0016:      REAL   PWRFCTR                                               00001600
0017:      INTEGER DLIMTIM1,DLIMTIM2                                    00001700
0018:      GLOBAL LOGTIM                                                00001800
0019:      GLOBAL IECFLAG1,IECFLAG2                                     00001900
0020:      GLOBAL CTHRES,ORIDE1,ORIDE2                                  00002000
0021:      INTEGER KD(N,NP)                                             00002100
0022:      INTEGER METLD(M)                                             00002200
0023:      INTEGER LDMET(N)                                             00002300
0024:      INTEGER KWTOT(M),PBN,LSW(4)                                  00002400
0025:      INTEGER TINPER,ILEDS,IOPCKT,IOPKB                            00002500
0026:      INTEGER T:MESS                                               00002600
0027:      INTEGER J1(3)                                                00002700
0028:      INTEGER IALPH(27),INUM(10),MEL(3,6)                          00002800
0029:      REAL KJ1(3)                                                  00002900
0030:      REAL SUMPR(IPGRP),PULFAC(M),PWR(M)                           00003000
0031:      GLOBAL IMESST                                                00003100
0032:      INTEGER NAMEDAY(7),NUMDAYS(12)                               00003200
0033:      GLOBAL KEY,ERROUT                                            00003300
0034:      COMMON/TAPS/NTAPUD(6,2),DBT,MATROB(6,5),MALREQ(6,5),NTPOSS,CELTRIP
0035:     1 ,NPZ,PROJ
0036:      LOGICAL CELTRIP
0037:      GLOBAL RXCADM1                                               00003400
0038:      INTEGER RXCADM1                                              00003500
0039:      INTEGER IND(20),KD10(10)                                     00003600
0040:      GLOBAL IMONX,IDATX,IHRX,IMINX,ISECX                          00003700
0041:      GLOBAL I:YR,I:DAY                                            00003800
0042:      DIMENSION NCELL(5),TAPMOV(3,3),IMAGE(4),RKD(N,INP),ENGVAL(N) 00003850
0043:      DIMENSION IMAST(5)
0044:      DIMENSION METPRT(6)                                          00003900
0045:      EQUIVALENCE (METPKT(2),NCELL(1))                             00004000
0046:      DATA NAMEDAY/2HSU,2HMO,2HTU,2HWE,2HTH,2HFR,2HSA/              00004100
0047:      DATA NUMDAYS/31,28,31,30,31,30,31,31,30,31,30,31/            00004200
0048:      DATA IIXAU,ITXMA /2HAU,2HMA/                                 00004300
0049:      DATA ITXFF/2HFF/, IIXNH/2HN /                                00004400
0050:      DATA IIXY,ITXN  /2H Y,2H N/                                  00004500
0051:      DATA MAXLUG / 9/                                             00004600
0052:      DATA ITX1D,ITXFC,ITXDC/2HTD,2HEC,2HDC/                       00004700
0053:      DATA ITXRL /2H  /                                            00004800
0054:      DATA MTD,MDC,MEC /S4000,S2000,S1000/                         00004900
0055:      DATA KXF,IX8000,IX8001 /S000F,S8000,S8001/                   00005000
0056:      DATA KX1/S0001/
```

```
0057:          DATA J1/0,0,0/                                                     00005400
0058:          DATA KJ1/0,0,0,0,0,0,0/                                            00005500
0059:          DATA NUMH/27/                                                      00005600
0060:          DATA INUM/1H1,1H2,1H3,1H4,1H5,1H6,1H7,1H8,1H9,1H0/                 00005700
0061:          DATA IALPH/1HS,1HB,1HD,1HL,1HM,1HT,1HA,1HP,1HO,1HI,1HC,            00005800
0062:         X1HV,1HU,1HH,1HY,1HK,1HN,1HR,1HF,1HX,1HZ,$87A0,1HW,                 00005900
0063:         X1HG,1HJ,1HE/                                                       00006000
0064:          DATA ISTBIT/$80/
0065:          DATA TAPMOV/4HMOVI, 4HNG U, 4HP    ,                               00006200
0066:         1              4HMOVT, 4HNG  , 4HNG    ,                            00006300
0067:         2              4HMOVI, 4HNG D, 4HOWN /                              00006400
0068:          DATA METPRT/1HP,1HA,1HB,1HC,1HD,1HE/                               00006500
0069:          DATA IPG1SIZ/60/, NL/5/                                            00006600
0070:          DATA KD10/$0000,$0001,$2000,$2001,$1000,$1001,$4000                00006700
0071:         X,$4001,$8000,$8001/                                                00006800
0072:          *AXPAGE= (N-1)/60 +1                                               00006900
0073:    C EXECUTION START                                                        00007000
0074:    S      LDA  *I:MNTH                                                      00007100
0075:    S      STA  IMNTH                                                        00007200
0076:    S      LDA  *I:DATE                                                      00007300
0077:    S      STA  IDATE                                                        00007400
0078:    S      LDA  *I:HOUR                                                      00007500
0079:    S      STA  IHOUR                                                        00007600
0080:    S      LDA  *I:MIN                                                       00007700
0081:    S      STA  IMIN                                                         00007800
0082:    S      LDA  *I:SEC                                                       00007900
0083:    S      STA  ISEC                                                         00008000
0084:    C NAME OF DAY. IDAY=1-7 IDYW=SU-SA                                       00008100
0085:    S      LDA  *I:DAY                                                       00008200
0086:    S      STA  IDAY                                                         00008300
0087:    C      IDYW = NAMEDAY(IDAY)                                              00008400
0088:    S      LDA  *I:YR                                                        00008500
0089:    S      STA  IYR                                                          00008600
0090:    C FIX NUMDAYS(2) FOR LEAP YEAR                                           00008700
0091:    S      NUMDAYS(2) = 28                                                   00008800
0092:    S      STZ  4                                                            00008900
0093:    S      LDA  IYR                                                          00009000
0094:    S      DIV  =4                                                           00009100
0095:    S      LDE  4                                                            00009200
0096:    S      ZJP  )1                                                           00009300
0097:    S      JMP  )2                                                           00009400
0098:    S    1 NUMDAYS(2) = 29
0099:    C    2 CONTINUE
```

```
0102: C     OUTPUT TO LEDS                                                        00009500
0103: C     CALL    M:WI                                                          00009600
0104: S             LDG   ILEDS                                                   00009700
0105: S             SST   *226                                                    00009800
0106: C     RTN HERE (E)= BUFO                                                    00009900
0107: S             LDA   =8                                                      00010000
0108: S             STA   *4                                                      00010100
0109: S             INC   4                                                       00010200
0110: S             LDA   LSW                                                     00010300
0111: S             STA   *4                                                      00010400
0112: S             INC   4                                                       00010500
0113: S             ITEM = LSW(2)                                                 00010600
0114: S             LDA   ITEM                                                    00010700
0115: S             STA   *4                                                      00010800
0116: S             INC   4                                                       00010900
0117: S             ITEM = LSW(3)                                                 00011000
0118: S             LDA   ITEM                                                    00011100
0119: S             STA   *4                                                      00011200
0120: S             INC   4                                                       00011300
0121: S             ITEM = LSW(4)                                                 00011400
0122: S             LDA   ITEM                                                    00011500
0123: S             STA   *4                                                      00011600
0124: C     BUFFER LOADED - CALL M:WR                                             00011700
0125: S             LDG   ILEDS                                                   00011800
0126: S             SST   *227                                                    00011900
0127: C     CHECK PB NUMBER AND CHANGE FROM 0 MIN TO 1 MIN                        00012000
0128: S             LDA   PBN                                                     00012100
0129: S             NJP   )20                                                     00012200
0130: S             SUB   =16                                                     00012300
0131: S             PJP   )20                                                     00012400
0132: S             INC   PBN                                                     00012500
0133: C     ONLY TOP ROW OF PB (9-16) ALLOWED WITHOUT KEY TURNED TO ON            00012600
0134:               IF(KEYON.NE.0) GO TO 21                                       00012700
0135:               IF(PBN.GT.16) GO TO 100                                       00012800
0136:               IF (PBN .EQ. 2) GO TO 21                                      00012900
0137:               IF(PBN.LT.9) GO TO 100                                        00013000
0138:      21 CONTINUE                                                            00013100
0139: C     PB NUM OK - DO A CRT WRITE BASED ON IT                                00013200
0140:               GO TO (100,101,100,100,104,105,106,107,108,109,110,111,112,113 00013300
0141:          X,114,115,116,117,118,119,120,121,122,123),PBN                     00013400
0142: C                                                                           00013500
0143: C     OP PNL CRT WILL BE USED BY STADIS                                     00013600
0144: C                                                                           00013700
0145:      101 RETURN                                                             00013800
```

```
0146:  C                                                                00013900
0147:  C                                                                00014000
0148:  C     LOAD AUTO / MANUAL OFF / MANUAL ON                         00014100
0149:  C                                                                00014200
0150:    104 CONTINUE                                                   00014300
0151:        CALL GETCEL(IL,NCELL,N,IER)                                00014400
0152:        IF (IER.EQ.1) GO TO 704                                    00014500
0153:        WRITE (IOPCRT,2013)                                        00014600
0154:   2013 FORMAT (' ENTER 1=AUTO, 0=MANUAL ')                        00014700
0155:  C                                                                00014800
0156:  C     TWO INPUT ELEMENTS                                         00014900
0157:        K=1                                                        00015000
0158:        GO TO 702                                                  00015100
0159:  C     RETURN HERE WITH DATA IN ARRAY J1                          00015200
0160:    714 CONTINUE                                                   00015300
0161:        IC = J1(1)                                                 00015500
0162:        IF(IL.LE.0) GO TO 704                                      00015600
0163:        IF(IL.GT.N) GO TO 704                                      00015700
0164:        IF (IC.EQ.0) GO TO 5013                                    00015800
0165:        IF (IC.EQ.1) GO TO 9800                                    00015900
0166:        GO TO 704                                                  00016000
0167:  C                                                                00016100
0168:  C     GOOD LOAD NO. AND CODE                                     00016200
0169:  C                                                                00016300
0170:  C     MANUAL OFF                                                 00016400
0171:   4013 KD(IL,9)=IX8000                                            00016500
0172:        KD(IL,18)=0                                                00016600
0173:        GO TO 732                                                  00016650
0174:  C     MANUAL ON                                                  00016700
0175:   5013 KD(IL,9)=IX8001                                            00016800
0176:        KD(IL,18)=0                                                00016900
0177:  C                                                                00016950
0178:  C     DONT ACTUALLY DO OUTPUT- LET NEXT PULSE DO IT              00017000
0179:  C                                                                00017100
0180:    732 GO TO 7321                                                 00017200
0181:  C                                                                00017300
0182:   7321 CONTINUE                                                   00017400
0183:        IM = ITXFF                                                 00017500
0184:        ITEM=KD(IL,9)                                              00017600
0185:  S     LDA ITEM                                                   00017700
0186:  S     AND KX1                                                    00017800
0187:  S     ZJP )733                                                   00017900
0188:        IM = ITXNB                                                 00018000
0189:    733 WRITE (IOPCRT,7016) NCELL(IL)                              00018200
```

```
0190:  7016 FORMAT (' CELL LINE ',A1,' ON MANUAL')                    00018300
0191: C                                                               00018400
0192:       RETURN                                                    00018500
0193: C                                                               00018600
0194: C RETURN TO AUTO                                                00018700
0195:  9800 CONTINUE                                                  00018800
0196:       ITEM = KD(IL,9)                                           00018900
0197: S     LDA ITEM                                                  00019000
0198: S     AND KXF                                                   00019100
0199: S     STA ITEM                                                  00019200
0200:       KD(IL,9)=ITEM                                             00019300
0201:       WRITE (IOPCRT,7013) NCELL(IL)                             00019400
0202:  7013 FORMAT (' CELL LINE ',A1,' ON AUTO')                      00019500
0203:       KD(IL,18)=1
0204: C     CLEAR TROUBLE FLAGS FOR THIS CELL LINE
0205:       DO 400 KQ=1,5                                             00019600
0206:       MATROB(IL,KQ)=0                                           00019700
0207:   400 CONTINUE                                                  00019800
0208: C                                                               00019900
0209:       RETURN                                                    00020000
0210: C                                                               00020100
0211: C                                                               00020200
0212: C DEMAND LIMIT CHANGE                                           00020300
0213: C                                                               00020400
0214:   105 CONTINUE                                                  00020500
0215:       WRITE (IOPCRT,726) DLIMVAL1,DLIMVAL2                      00020600
0216:   726 FORMAT(' DL1= ',F7.0,'   DL2= ',F7.0)                     00020700
0217:       WRITE (IOPCRT,7261)                                       00020800
0218:  7261 FORMAT(' DL#,VALUE= ')                                    00020900
0219: C     TWO INPUT ELEMENTS                                        00021000
0220:   727 K=2                                                       00021100
0221:       GO TO 702                                                 00021200
0222: C     RETURN HERE RJ1(1) HAS VALUE   J1(2) HAS #                00021300
0223:   715 CONTINUE                                                  00021400
0224:       ITEM = J1(2)-1                                            00021500
0225:       IF(ITEM) 123,7151,7152                                    00021600
0226:  7152 IF(ITEM.GT.1) GO TO 123                                   00021700
0227:       DLIMVAL2 = RJ1(1)                                         00021800
0228:       GO TO 7153                                                00021900
0229:  7151 DLIMVAL1 = RJ1(1)                                         00022000
0230:  7153 WRITE (IOPCRT,726) DLIMVAL1,DLIMVAL2                      00022100
0231:       RETURN
0232: C
0233: C DATE CHANGE
```

```
0234:  C     106 CONTINUE
0235:  C         DISPLAY CURRENT TIME/DATE
0236:  C
0237:            IDATEP=IDATE+100
0238:            IMINP=IMIN+100
0239:            ISECP=ISEC+100
0240:            WRITE (IOPCRT,201) IDYN,IMNTH,IDATEP,IYR,IHOUR,IMINP,ISECP
0241:            IDAYDAT=-1
0242:            WRITE (IOPCRT,2015)
0243:       2015 FORMAT (' ENTER MON,DAY,YEAR ')
0244:            GO TO 701
0245:  C     RETURN HERE WITH DATA IN ARRAY J1
0246:        716 CONTINUE
0247:            IF (IDAYDAT .EQ. 0) GO TO 1061
0248:            IDAYDAT=0
0249:            ITEM = I:SEC
0250:            ITEM = ITEM+5
0251:            IS = J1(3)
0252:            IM = J1(2)
0253:            IH = J1(1)
0254:  S         LDA IS
0255:  S         STA *ITEM
0256:  S         INC ITEM
0257:  S         LDA IM
0258:  S         STA *ITEM
0259:  S         INC ITEM
0260:  S         LDA IH
0261:  S         STA *ITEM
0262:  C     NO. DAYS IN MONTH
0263:  S         LDA *I:MNTH
0264:  S         STA I
0265:            ITEM = NUMDAYS(I)
0266:  S         LDA I:YR
0267:  S         INC 5
0268:  S         LDE ITEM
0269:  S         STE *5
0270:  C     ISEC/IMIN/IHOUR/IDAY/IWEEK/IMONTH/IDATE/IYEAR/IDSMO IS SO225 ORDER
0271:            WRITE(IOPCRT,7015)
0272:       7015 FORMAT (' ENTER 1-7 FOR SUN-SAT ')
0273:            K = 1
0274:            GO TO 702
0275:  C
0276:       1061 CONTINUE
0277:            ITEM = J1(1)
0278:  S         LDA ITEM
```

```
0279: S       AND =7                                                          00026300
0280: S       STA *I:DAY                                                      00026400
0281: S       STA IDAY                                                        00026500
0282:         IDYN = NAMEDAY(IDAY)                                             00026600
0283:    1062 IDAYDAT=-1                                                       00026700
0284:         IDATEP=IM+100                                                    00026800
0285:         IMINP=IMIN+100                                                   00026850
0286:         ISECP=ISEC+100
0287:         WRITE (IOPCRT,201) IDYN,IS,IDATEP,IH,IHOUR,IMINP,ISECP            00026900
0288:         RETURN                                                           00027100
0289:                                                                          00027200
0290:   C                                                                      00027300
0291:   C     TIME CHANGE                                                      00027400
0292:   C                                                                      00027500
0293:     107 CONTINUE                                                         00027600
0294:   C     DISPLAY CURRENT TIME/DATE                                        00027700
0295:         IDATEP=IDATE+100                                                 00027750
0296:         IMINP=IMIN+100
0297:         ISECP=ISEC+100
0298:         WRITE (IOPCRT,201) IDYN,IMNTH,IDATEP,IYR,IHOUR,IMINP,ISECP         00027800
0299:         WRITE (IOPCRT,2014)                                              00027900
0300:    2014 FORMAT(' ENTER HR,MIN,SEC ')                                     00028000
0301:   C                                                                      00028100
0302:   C  3 DATA INPUT ELEMENTS                                               00028200
0303:     701 K = 3                                                            00028300
0304:   C                                                                      00028400
0305:   C  NEXT 2 CALLS USED BY EVERYONE TO READ KEYBOARD *****************    00028500
0306:   C                                                                      00028600
0307:   C  OPEN A READ ON THE KEYBOARD                                         00028700
0308:     702 CALL ENPACK (MEL,NEL,IALP,INUM,NUMB)                             00028800
0309:         IF (NEL .EQ. K) GO TO 703                                        00028900
0310:   C  ENTERED WRONG NO. OF DATA ELEMENTS                                  00029000
0311:     704 WRITE(IOPCRT,705)                                                00029100
0312:     705 FORMAT(' ERROR')                                                 00029200
0313:     706 RETURN                                                           00029300
0314:   C                                                                      00029400
0315:     703 CONTINUE                                                         00029500
0316:   C  UNPACK THE DATA IN MEL                                              00029600
0317:         CALL UNPACK (MEL,NEL,IALP,INUM,NUMB,J1,RJ1)                      00029700
0318:         GO TO (710,711,712,713,714,715,716,717,718,719,720,721,722,723, 00029800
0319:        X724,725),PHN                                                     00029900
0320:   C                                                                      00030000
0321:   C                                                                      00030100
0322:   C  END OF AREA WITH SEVERAL USERS    *************************         00030200
0323:   C                                                                      00030300
```

```
0325:       717 CONTINUE                                              00030500
0326:           ITEM = I:SEC                                          00030600
0327:           IH = J1(3)                                            00030700
0328:           IM = J1(2)                                            00030800
0329:           IS =J1(1)                                             00030900
0330:     S     LDA IS                                                00031000
0331:     S     STA *ITEM                                             00031100
0332:     S     INC ITEM                                              00031200
0333:     S     LDA IM                                                00031300
0334:     S     STA *ITEM                                             00031400
0335:     S     INC ITEM                                              00031500
0336:     S     LDA IH                                                00031600
0337:     S     STA *ITEM                                             00031700
0338:           IMINP=IM+100                                          00031750
0339:           ISECP=IS+100
0340:           WRITE (IOPCRT,7014) IH,IMINP,ISECP                    00031800
0341:      7014 FORMAT(' TIME = ',I2,1H:,I2,1H:,I2)                   00031900
0342:           RETURN                                                00032100
0343:     C                                                           00032200
0344:       108 CONTINUE                                              00032300
0345:           WRITE (IOPCRT,200)                                    00032400
0346:       200 FORMAT(1X,'W-2515 STATUS')                            00032500
0347:           IDATEP=IDATE+100                                      00032550
0348:           IMINP=IMIN+100
0349:           ISECP=ISEC+100
0350:           WRITE (IOPCRT,201) IDYN,IMNTH,IDATEP,IYR,IHOUR,IMINP,ISECP  00032600
0351:       201 FORMAT(1X,A2,1X,I2,1H/,I2,1H/,I4,1X,I2,1H:,I2,1H:,I2) 00032700
0352:     C LINE 2 - 2515 STATUS                                      00032800
0353:           RTEM = TINPER                                         00032900
0354:           RTEM = (60.0*DEMPER - RTEM)/60.0                      00033000
0355:           WRITE (IOPCRT,202) RTEM,ERROUT                        00033100
0356:       202 FORMAT (1X,F4.1,' M LEFT ',F6.0,' KW PROJERR')        00033200
0357:     C LINE 3 - 2515 STATUS                                      00033300
0358:           WRITE(IOPCRT,203) DEMLIM,PROJ                         00033600
0359:       203 FORMAT(1X,'LIMIT=',F7.0,'KW PROJ=',F7.0,'KW')         00033700
0360:     C LINE 4 - 2515 STATUS                                      00033800
0361:           ITEM = ITXAU                                          00033900
0362:           IF(MANUAL.EQ.0) ITEM=ITXMA                            00034000
0363:           WRITE (IOPCRT,204) ITEM                               00034100
0364:       204 FORMAT (1X, 'ON ', A2, ' (AU=AUTO MA=MANUAL)')        00034200
0365:     C                                                           00034300
0366:     C DISPLAY POWER FACTOR                                      00036500
0367:           WRITE (IOPCRT,2041) SUMPR(1),DBT                      00036600
```

```
0368:  2041 FORMAT (' PLANT      = ',F7.0,' KW'/' DEADBAND = ',F7.0,' KW')
0369: C
0370:       RETURN
0371: C
0372: C     LINE 0 - LOAD STATUS
0373:   109 CONTINUE
0374:       WRITE (IOPCRT,1090) (NCELL(I),I=1,N)
0375:  1090 FORMAT (' CELL LINE STATUS'/ 1X,5(2X,A1))
0376:       NBITIM=ISTBIT
0377:       DO 4 I=1,N
0378:       MSTAT1=ITXMA
0379:       MSTAT2=ITXMA
0380:       NBITIM=2*NBITIM
0381:       ITEM=IMAGE(1)
0382: S     LDA ITEM
0383: S     AND NBITIM
0384: S     STA ITEM
0385:       IF (ITEM.NE.0) MSTAT2=ITXAU
0386:       IF (KD(I,18).EQ.1) MSTAT1=ITXAU
0387:       IMAST(I)=ITXMA
0388:       IF (MSTAT1.EQ.ITXAU.AND.MSTAT2.EQ.ITXAU) IMAST(I)=ITXAU
0389:     4 CONTINUE
0390:       WRITE (IOPCRT,7) (IMAST(I),I=1,N)
0391:     7 FORMAT (2X,5(1X,A2))
0392:       RETURN
0393: C
0394:   110 CONTINUE
0395: C
0396: C     LINE 0 - METER STATUS
0397:       WRITE(IOPCRT,220)
0398:   220 FORMAT (1X,'METER STATUS')
0399: C     LINE 1 - METER STATUS
0400:       WRITE(IOPCRT,221)
0401:   221 FORMAT (1X,'MET PULFAC    CURRKW       CURRKA')
0402: C     LINES 2 AND UP - METER STATUS
0403:       DO 9222 I=1,M
0404:       LD = METLD(I)
0405:       IF(LD.LE.0) LD=0
0406:       IF (I.EQ.1) WRITE (IOPCRT,222) METPKT(I),PULFAC(I),PWR(I)
0407:       IF (I.GT.1) WRITE (IOPCRT,222) METPKT(I),PULFAC(I),PWR(I),
0408:      1 ENGVAL(I-1)
0409:   222 FORMAT (2X,A1,2X,F6.2,1X,F7.0,2X,F7.2)
0410:  9222 CONTINUE
0411: C
```

```
0412:         RETURN
0413:  C
0414:  C
0415:  C     PRIORITY STATUS FOR GPEMS FIXED PRIORITIES
0416:  C
0417:  C     PAGED PRIORITY DISPLAY - (2 LINES,5 ITEMS/LINE PER-PAGE
0418: 10241 FORMAT (' PRIORITY BY CELL LINE'/1X,5(2X,A1))
0419: 10242 FORMAT (1X,5I3)
0420:   111 CONTINUE
0421:         IPAGE1= IPAGE1+1
0422:         IF(IPAGE1 .LT. 1) IPAGE1=1
0423:         IF(IPAGE1 .GT. MAXPAGE) IPAGE1 = 1
0424:         INUMLO = (IPAGE1-1)*IPG1SIZ +1
0425:         INUMHI = INUMLO+IPG1SIZ-1
0426:         IF (INUMHI .GT. N) INUMHI=N
0427:         WRITE (IOPCRT,10241) (NCELL(I),I=1,N)
0428:         WRITE (IOPCRT,10242) (KD(I,4),I=1,N)
0429:  C
0430:         RETURN
0432:  C
0432:  C     2515 OPTIONS
0433:  C
0434:   112 CONTINUE
0435:  C
0436:         WRITE(IOPCRT,750)
0437:   750 FORMAT(' 2515 OPTIONS ENABLED ARE: ' /' 0=NO, OTHER= YES')
0438:   751 FORMAT(' TODSCH=',I2,' EGYCON=',I2,' CONOVR=',I2)
0439:   752 FORMAT(' DAYSUM=',I2,' SHFSUM=',I2,' LFLOAT=',I2)
0440:   753 FORMAT(' LOG=',I2,' SEC1=',I4,'   SEC1+2=',I4)
0441:         WRITE(IOPCRF,751) NTOD,NEC,IORIDE
0442:         WRITE(IOPCRT,752) IDLOG,I:SHF,I:FLOAT
0443:         WRITE(IOPCRT,753) IMESS,NUCSEC,NFINSC
0444:  C
0445:         RETURN
0446:  C
0447:   719 GO TO 723
0448:  C
0449:  C     LOAD OPTIONS
0450:  C
0451:   113 CONTINUE
0452:         WRITE(IOPCRT,746)
0453:   746 FORMAT (' ENTER CELL LINE ')
0454:         K=1
0455:         READ (KEY,300) LIN
```

```
0456:       300  FORMAT (A1)
0457:            NBITIM=ISTBIT
0458:            DO 301 I=1,N
0459:            NBITIM=2*NHITIM
0460:            IF (LIN.EQ.NCELL(I)) GO TO 302
0461:       301  CONTINUE
0462:            GO TO 704
0463:       302  CONTINUE
0464:            IPH=IHOUR+100
0465:            IPM=IMIN+100
0466:            IPS=ISEC+100
0467:            INDX=2-KD(I,19)
0468:            MSTAT1=ITXMA
0469:            MSTAT2=ITXMA
0470:            ITEM=IMAGE(1)
0471:  S         LDA ITEM
0472:  S         AND NBITIM
0473:  S         STA ITEM
0474:            IF (ITEM.NE.0) MSTAT2=ITXAU
0475:            IF (KD(I,18).EQ.1) MSTAT1=ITXAU
0476:            RTEM=KWTOT(I+1)
0477:            RTEM=RTEM*PULFAC(I+1)
0478:            WRITE (IOPCRT,350) NCELL(I),IPH,IPM,IPS,KD(I,4),MSTAT2,
0479:           1 PWR(I+1),RKD(I,13),RTEM,RKD(I,1),RKD(I,2),RKD(I,3),ENGVAL(I),
0480:           2(TAPMOV(K,INDX),K=1,3)
0481:       350  FORMAT (/5X,'CELL LINE ',A1,' AT ',I2,':',I2,':',I2/
0482:           1 ' PRIORITY=',I1,
0483:           2 ', LOCAL=',A2,',REMOTE=',A2/' POWER=',F6.0,' KW,',F5.0,' KW/TAP'/
0484:           3 ' USED THIS PERIOD = ',F6.0,' KWH'/' LIMITS: HI/HI =',F7.3,' KA'/
0485:           4 12X,'HI =',F7.3,' KA'/12X,'LO =',F7.3,' KA'/' CURRENT VALUE =',
0486:           5 F7.3,' KA'/' TAP IS ',3A4)
0487:            GO TO 20
0488:  C    RETURNS HERE WITH DATA IN ARRAY J1
0489:       723  CONTINUE
0490:            IL=J1(1)
0491:            IF(IL.LE.0) GO TO 704
0492:            IF(IL.GT.N) GO TO 704
0493:            ITEM = KD(IL,13)
0494:            IH= ITXBL
0495:            IM= ITXBL
0496:            IS= ITXBL
0497:  S         LDA ITEM
0498:  S         AND MTD
0499:  S         ZJP S+3
```

```
0500: S         LDA ITXTD                                                              00047900
0501: S         STA IH                                                                 00048000
0502: S         LDA ITEM                                                               00048100
0503: S         AND MDC                                                                00048200
0504: S         ZJP S+3                                                                00048300
0505: S         LDA ITXDC                                                              00048400
0506: S         STA IM                                                                 00048500
0507: S         LDA ITEM                                                               00048600
0508: S         AND MEC                                                                00048700
0509: S         ZJP S+3                                                                00048800
0510: S         LDA ITXEC                                                              00048900
0511: S         STA IS                                                                 00049000
0512: C                                                                                00049100
0513:           WRITE (IOPCRT,747) IL,IH,IM,IS                                         00049200
0514:       747 FORMAT(' LOAD ',I2,' ENABLED FOR ',A2,1H ,A2,1H ,A2,1H ,A2)            00049300
0515: C                                                                                00049400
0516: C   WRITE OUT LOAD KD TABLES                                                     00049500
0517: C                                                                                00049600
0518:           RETURN                                                                 00050800
0519: C                                                                                00050900
0520: C                                                                                00051000
0521: C   LOG DISPLAY                                                                  00051100
0522: C                                                                                00051200
0523:       114 CONTINUE                                                               00051300
0524:           WRITE (IOPCRT,7405)                                                    00051400
0525:      7405 FORMAT (' 1=EVENT 3=SHFSUM 5=DAYSUM'/' 4=PLOT 9=UTLSUM 0=NONE')        00051500
0526:           WRITE (IOPCRT,740)                                                     00051600
0527:       740 FORMAT(' ENTER LOG#,MIN ')                                             00051700
0528: C                                                                                00051800
0529:           K=2                                                                    00051900
0530:           GO TO 702                                                              00052000
0531: C                                                                                00052100
0532: C   RETURNS HERE WITH DATA IN ARRAY J1                                           00052200
0533:       724 CONTINUE                                                               00052300
0534:           IL = J1(2)                                                             00052400
0535:           IM = J1(1)                                                             00052500
0536:           IF (IL.LT.0) GO TO 704                                                 00052600
0537:           IF (IL.GT.MAXLOG) GO TO 704                                            00052700
0538:      7240 CONTINUE                                                               00052800
0539:           IS = IMESS                                                             00052900
0540:           IMESS = IL                                                             00053000
0541:           LOGTIM = 60*IM                                                         00053100
0542:           IF(IL.NE.1) GO TO 741                                                  00053200
0543: C   EVENT LOG - SET UP CURRENT STATUS                                            00053300
                                                                                       00053400
```

```
0544: S       INC 196                                                    00053500
0545:         DO 742 I=1,N                                               00053600
0546:         KD(I,12) = KD(I,10)                                        00053700
0547:     742 CONTINUE                                                   00053800
0548: S       CDR *240                                                   00053900
0549: S       DCR 196                                                    00054000
0550: S       PJP S+2                                                    00054100
0551: S       STZ 196                                                    00054200
0552: S       CDR *160                                                   00054300
0553:     741 CONTINUE                                                   00054400
0554:         IF(IL.NE.2) GO TO 760                                      00054500
0555:    7419 CONTINUE                                                   00054600
0556:         GO TO 7439                                                 00054700
0557:     760 CONTINUE                                                   00054800
0558:         WRITE(IOPCRT,743) IS,IL                                    00054900
0559:     743 FORMAT(' CHANGED LOG FROM ',I2,' TO ',I2)                  00055000
0560:    7439 CONTINUE                                                   00055100
0561:         IF(IL.EQ.0) RETURN                                         00055200
0562: C                                                                  00055300
0563: C FOLLOWING GO TO MUST HAVE MAXLOG ENTRIES *********************** 00055400
0564:         GO TO (745,745,745,744,745,744,745,745                     00055500
0565:        X,744,745,744,744,744,744,744,744,744,744),IL               00055600
0566: C                                                                  00055700
0567: C                                                                  00055800
0568:     745 CALL M:IN(T:MESS)                                          00055900
0569:     744 RETURN                                                     00056000
0570: C                                                                  00056100
0571: C                                                                  00056200
0572: C                                                                  00056300
0573:     115 CONTINUE                                                   00056400
0574: C READ / DISPLAY EXTERNAL CLOCK                                    00056500
0575: S       LDE RXCADM1                                                00056600
0576: S       LDA 0                                                      00056700
0577: S       JMP *4                                                     00056800
0578: C RETURN HERE WITH ISECX-IMONX LOADED FROM EXT CLK                 00056900
0579:         WRITE(IOPCRT,1151) IMONX,IDATX,IHRX,IMINX,ISECX            00057000
0580:    1151 FORMAT(' EXT CLOCK TIME ',I2,1H/,I2,1X,I2,1H:,I2,1H:,I2)   00057100
0581:         RETURN                                                     00057200
0582: C                                                                  00057300
0583: C                                                                  00057400
0584: C                                                                  00057500
0585:     710 CONTINUE                                                   00057600
0586:     711 CONTINUE                                                   00057700
0587:     712 CONTINUE                                                   00057800
```

```
0588:     713 CONTINUE                                                   00057900
0589:     718 CONTINUE                                                   00058000
0590:     720 CONTINUE                                                   00058100
0591:     721 CONTINUE                                                   00058200
0592:     722 CONTINUE                                                   00058300
0593:     725 CONTINUE                                                   00058400
0594: C                                                                  00058500
0595:     100 CONTINUE                                                   00058600
0596:     116 CONTINUE                                                   00058700
0597:     117 CONTINUE                                                   00058800
0598:     118 CONTINUE                                                   00058900
0599:     119 CONTINUE                                                   00059000
0600:     120 CONTINUE                                                   00059100
0601:     121 CONTINUE                                                   00059200
0602:     122 CONTINUE                                                   00059300
0603:     123 CONTINUE                                                   00059400
0604:         WRITE (IOPCRT,91)                                          00059500
0605:      91 FORMAT(1X,'INVALID REQUEST')                               00059600
0606: C                                                                  00059700
0607:      20 RETURN                                                     00059800
0608:         END                                                        00059900

0001:         SUBROUTINE TROUBLE (MP60,PWR,N,RKD,INP,ENGVAL,M,NC,IREGS,MASKI,
0002:        1 MASKI,MASKM,KD,NP)
0003:         COMMON/TAPS/NTAPUD(6,2),DHT,MATROB(6,5),MATREQ(6,5),KR,CELTRIP,NPZ
0004:         GLOBAL CTPWR,PHIPWR,FLOPWR
0005:         GLOBAL AKW
0006:         LOGICAL TROUBCCO,OLDTROUB
0007:         GLOBAL TIMPER,DEMPER,DEMLIM,MANUAL
0008:         INTEGER TIMPER
0009:         DIMENSION PWR(M),RKD(N,INP),ENGVAL(N),TAPS(5),KD(N,NP)
0010:         LOGICAL CELTRIP
0011:         DATA NX/S4001/
0012:         TP=TIMPER
0013:         ATM=MP60
0014:         TLEFT=60.*DEMPER-TP
0015: C       K IS NO. TAPS POSSIBLE IN REMAINING TIME.
0016:         K= (TLEFT-ATM)/ATM
0017:         IF (K.LT.0) K=0
0018:         KR=TLEFT/ATM
0019: C       COUNT NO. CELL LINES DOWN.
0020:         ICOUNT=0
0021:         IPATT=0
0022:         DO 1 I=1,N
0023:         IF (ENGVAL(I).NE. 0. .OR.  PWR(I+1).NE. 0.) GO TO 1
```

```
0024:          ICOUNT=ICOUNT+1
0025:          JOUT=I
0026:        1 CONTINUE
0027:     C      INHIBIT CALCULATION ONLY FOR 1 LINE DOWN.
0028:          IF (ICOUNT.NE.1) GO TO 100
0029:     C      FIND NO. OF TAP DOWNS POSSIBLE ON EACH RUNNING CELL LINE.
0030:          TOTKWH=0.
0031:          DO 2 I=1,N
0032:          TAPS(I)=0
0033:          IF (I.EQ.JOUT) GO TO 2
0034:          IF (KD(I,18).EQ.0) GO TO 2
0035:     C      L IS NO. DOWN TAPS POSSIBLE TO LOWER KA LIMIT.
0036:          L=(ENGVAL(I)-RKD(I,3))/RKD(I,14)
0037:          TAPS(I)=MIN0(L,K)
0038:          TOTKWH=TOTKWH+ RKD(I,13)*TAPS(I)* (2.*TLEFT -(TAPS(I)+1.)*ATM) /
0039:         17200.
0040:        2 CONTINUE
0041:          PROJKW= 60./DEMPER *( AKW  + TLEFT/3600. *(RKD(JOUT,21)+PWR(1) )
0042:         1 - TOTKWH)
0043:     C      HOLD INHIBIT CCO ON OR OFF UNTIL 6 COUNTS OF THE REVERSE STATE
0044:          IF (OPJKW.EQ.DEMLIM) GO TO 70
0045:     C      AT CHANGE OF STATE, RESET JCOUNT
0046:          IF ((PROJKW-DEMLIM)/(OPJKW-DEMLIM).LT.0.) JCOUNT=0
0047:          JSIGN=-1
0048:          IF (PROJKW.GT.DEMLIM) JSIGN=1
0049:          JCOUNT=JCOUNT+JSIGN
0050:          IF (JCOUNT.GE.6) IPATT=MASKI
0051:          IF (JCOUNT.LE.-6) IPATT=0
0052:       70 OPJKW=PROJKW
0053:          IF (JCOUNT.GE.100.OR.JCOUNT.LE.-100) JCOUNT=0
0054:      100 CONTINUE
0055:          CALL M:CCO(NX,IPATT,IREGS,MASKI)
0056:     C      TEST FOR CELL LINE TRIP.
0057:          IF (CELTRIP) GO TO 150
0058:          DO 10 I=1,N
0059:          IF (KD(I,18).EQ.0) GO TO 10
0060:          IF (ENGVAL(I).GT. RKD(I,3)/2.)   GO TO 10
0061:          JJ=1
0062:          CELTRIP=.TRUE.
0063:          OLDPWR= PWR(1)
0064:          NPZ=0
0065:       10 CONTINUE
0066:          GO TO 50
0067:      150 CONTINUE
```

```
0070:          IF (OLDPWR-PWR(1).GT.CTPWR) MATROB(JJ,5)=1
0071:    59    CONTINUE
0072:          CELTRIP=.FALSE.
0073:    50    CONTINUE
0074:          DO 65 I=1,N
0075:          IF (KD(I,18).EQ.0) GO TO 65
0076:          IF (PWR(I+1).GT.RKD(I,22)) MATROB(I,1)=1
0077:          IF (ENGVAL(I).GT.RKD(I,24)) MATROB(I,2)=1
0078:          IF (CELTRIP.OR.MATROB(I,5).NE.0) GO TO 65
0079:          IF (ENGVAL(I).LT.RKD(I,25)) MATROB(I,2)=-1
0080:          IF (PWR(I+1).LT.RKD(I,23)) MATROB(I,1)=-1
0081:    65    CONTINUE
0082:          N1=N+1
0083:          IF (PWR(1).GT.PHIPWR) MATROB(N1,1)=1
0084:          IF (PWR(1).LT.PLOPWR) MATROB(N1,1)=-1
0085:          TROUBCCU=.FALSE.
0086:          DO 66 I=1,N1
0087:          DO 66 J=1,5
0088:          IF (MATROB(I,J).EQ.0) GO TO 66
0089:          TROUBCCU=.TRUE.
0090:          IF (I.EQ.N1) GO TO 67
0091:          KD(I,18)=0
0092:          IF (J.EQ.5.AND.MATROB(I,5).EQ.1) GO TO 68
0093:          GO TO 66
0094:    67    CONTINUE
0095:          IF (J.EQ.2) GO TO 66
0096:    68    CONTINUE
0097:          MANUAL=0
0098:          IF (MATROB(I,5).EQ.1) MATROB(I,5)=-1
0099:    66    CONTINUE
0100:          IF (OLDTROUB.EQR.TROUBCCO) GO TO 80
0101:          GO TO 85
0102:    80    CONTINUE
0103:          IPATT=0
0104:          IF (TROUBCCU) IPATT=MASKT
0105:          CALL MICCU(NX,IPATT,IREGS,MASKT)
0106:    85    CONTINUE
0107:          OLDTROUB=TROUBCCO
0108:          IF (NFIRST.EQ.0) GO TO 97
0109:          IF (MANOLD.EQ.MANUAL) GO TO 95
0110:    97    CONTINUE
0111:          NFIRST=1
0112:          IPATT=0
```

```
0113:          IF (MANUAL.EQ.0) IPATT=MASKM
0114:          CALL M:CCO(NX,IPATT,IREGS,MASKM)
0115:   95     CONTINUE
0116:          MANOLD=MANUAL
0117:          RETURN
0118:          END

0001:          SUBROUTINE PROGFCN(N,KD,NP,VALBUF,SIMFLG,K..,INP)
0002:          DIMENSION KD(N,NP),RKD(N,INP)
0003:          INTEGER VALBUF(N)
0004:          LOGICAL SIMFLG
0005:          COMMON/TAPS/NTAPUD(6,2),DBT,MATROB(6,5),MALKEQ(6,5),NTPOSS,CELTRIP
0006:         1,NPZ,PROJ,ICFLAG,IDEBUG(2)
0007:          LOGICAL CELTRIP,ICFLAG
0008:          GLOBAL 1:DR,IPR2,KEY
0009:          DIMENSION ALINE(10),IALPH(6),MEL(3,6),INUM(11),J1(3),RJ1(3)
0010:          DIMENSION NCELL(5)
0011:          DIMENSION AMALF(6,7)
0012:          DATA AMALF/
0013:         1 4HCELL, 4H LIN, 4HE KW,  4H HI ,   4HOR L,  4HO    ,
0014:         2 4HCELL, 4H LIN, 4HE KA,  4H HI ,   4HOR L,  4HO    ,
0015:         3 4HCELL, 4H LIN, 4HE KW,  4H/TAP,   4H HI/,  4HLO   ,
0016:         4 4HCELL, 4H LIN, 4HE KA,  4H/TAP,   4H HI/,  4HLO   ,
0017:         5 4HCELL, 4H LIN, 4HE TR,  4HIP  ,   4H   ,   4H    ,
0018:         6 4HPLAN, 4HT KW, 4H TOO,  4H HI ,   4HOR L,  4HO    ,
0019:         7 4HALL , 4HLINE, 4HS AT,  4H MAX,   4H OR , 4HMIN  /
0020:          DATA NUMA/11/
0021:          DATA NUMR/6/
0022:          DATA INUM/1H1,1H2,1H3,1H4,1H5,1H6,1H7,1H8,1H9,1H0,1H./
0023:          DATA IALPH/1HS,1HR,1HZ,1HF,1HE,1HD/
0024:          DATA PROG/4HGENI/
0025:          DATA NCELL/1HA,1HB,1HC,1HD,1HE/
0026:          WRITE (IPR2,1)
0027:   1      FORMAT (' ENTER PASSWORD ')
0028:          READ (KEY,2) ALINE
0029:   2      FORMAT (10A4)
0030:          IF (ALINE(1).EQ.PROG) GO TO 15
0031:          WRITE (IPR2,8)
0032:   8      FORMAT (' PASSWORD INCORRECT. GOODBYE.')
0033:          GO TO 1000
0034:   15     CONTINUE
0035:   C      ROLL PASSWORD OFF SCREEN
0036:          WRITE (IPR2,10)
0037:   10     FORMAT (/////////)
```

```
0038:  115  CONTINUE
0039:       WRITE (IPR2,3)
0040:    3  FORMAT ('  CODE         MEANING'/
0041:              1     '    S     SIMULATE MALFUNCTION'/
0042:              2     '    R     RESET MALFUNCTION'/
0043:              3     '    D     DEBUG CONTROLLER'/
0044:              4     '    Z     PROGRAMMERS CONSOLE'/
0045:              5     '    F     FUNCTION LIST'/
0046:              6     '    E     EXIT')
0047:  100  CONTINUE
0048:       WRITE (IPR2,25)
0049:   25  FORMAT (' ENTER PROG CODE LETTER = ')
0050:       CALL ENPACK (MEL,NEL,IALPH,INUM,NUMB)
0051:       ITEM=MEL(1,6)
0052:       DO 18 I=1,NUMB
0053:       IF (ITEM.EQ.IALPH(I)) GO TO 20
0054:   18  CONTINUE
0055:  C    ERROR
0056:       GO TO 900
0057:   20  CONTINUE
0058:       GO TO (101,102,103,104,105,106),I
0059:  104  CONTINUE
0060:  C    FUNCTION LIST
0061:       GO TO 115
0062:  105  CONTINUE
0063:  C    EXIT
0064:       GO TO 1000
0065:  106  CONTINUE
0066:       WRITE (IPR2,40)
0067:   40  FORMAT (' DEBUG CONTROL =1,  KW ERR =2'/' 1=SET, 0=RESET'/
0068:              1' ENTER NUMBER, STATE = ')
0069:       CALL ENPACK (MEL,NEL,IALPH,INUM,NUMA)
0070:       CALL UNPACK(MEL,NEL,IALPH,INUM,NUMA,J1,RJ1)
0071:       IF (NEL.NE.2) GO TO 900
0072:       MM=J1(2)
0073:       IF (MM.NE.1.AND.MM.NE.2) GO TO 900
0074:       IF (J1(1).NE.0.AND.J1(1).NE.1) GO TO 900
0075:       IDEBUG(MM)=J1(1)
0076:       GO TO 100
0077:  103  CONTINUE
0078:  C    PROGRAMMERS CONSOLE
0079:       CALL M:HT (T:DB)
0080:       CALL M:IN (T:DB)
0081:       GO TO 100
```

```
0082:      101  CONTINUE
0083:      102  CONTINUE
0084:       C        SET MALFUNCTION SIMULATION, OR RESET.
0085:           WRITE (IPR2,50) (J,(AMALF(K,J),K=1,6),J=1,7)
0086:       50  FORMAT (' NUM              MEANING'/7(I3,3X,6A4/)   )
0087:           WRITE (IPR2,55)
0088:       55  FORMAT (' ENTER NUM = ')
0089:           CALL ENPACK (MEL,NEL,IALPH,INUM,NUMA)
0090:           CALL UNPACK (MEL,NEL,IALPH,INUM,NUMA,J1,RJ1)
0091:           MALNUM=J1(1)
0092:           IF (NEL.NE.1 .OR. MALNUM.LT.1 .OR. MALNUM.GT.7) GO TO 900
0093:           IER=0
0094:           IF (MALNUM.LE.5) CALL GETCEL(K,NCELL,N,IER)
0095:           IF (IER.EQ.1) GO TO 900
0096:           MALPT=MALNUM
0097:           IF (I.EQ.2) GO TO 95
0098:       C        SAVE VALBUF IF NECESSARY FOR RESTORING
0099:           IF (MALNUM.EQ.2.OR.MALNUM.EQ.5) KD(K,5)=VALBUF(K)
0100:           IF (MALNUM.EQ.5) KD(K,3)=KD(K,1)
0101:           IF (MALNUM.NE.7) GO TO 30
0102:           DO 35 IX=1,N
0103:           KD(IX,2)=VALBUF(IX)
0104:       35  CONTINUE
0105:       30  CONTINUE
0106:           IF (MALNUM.EQ.5) GO TO 70
0107:       60  FORMAT (' ENTER 1=HI,   0=LO   ')
0108:           WRITE (IPR2,60)
0109:           READ (KEY,65) IHL
0110:           IF (IHL.LT.0.OR.IHL.GT.1) GO TO 900
0111:       65  FORMAT (I1)
0112:           GO TO 72
0113:           IHL=1
0114:       70  CONTINUE
0115:       72  CONTINUE
0116:           IF (IHL.EQ.0) IHL=-1
0117:       95  IF (MALNUM.LE.5) GO TO 90
0118:           K=N+1
0119:           MALPT=MALPT-5
0120:       90  CONTINUE
0121:           IF (I.EQ.2) IHL=0
0122:           MALREQ (K,MALPT) = IHL
0123:           IF (MALNUM.LE.5) WRITE (IPR2,97) NCELL(K)
0124:       97  FORMAT (' CELL LINE ',A1)
0125:           IF (IHL.NE.0) WRITE (IPR2,98)
```

```
0126:        98   FORMAT (' SET MALFUNCTION')
0127:             IF (IHL.EQ.0) WRITE (IPR2,99)
0128:        99   FORMAT (' RESET MALFUNCTION')
0129:             WRITE (IPR2,96) (AMALF(KK,MALNUM),KK=1,6)
0130:        96   FORMAT (1X,6A4)
0131:             IF (L.NE.2.OR..NOT.SIMFLG) GO TO 750
0132:             IF(MALNUM.NE.7) GO TO 400
0133:     C         RESET VALBUF TO ORIGINAL VALUES.
0134:             DO 410 IX=1,N
0135:             VALBUF(IX)=KD(IX,2)
0136:       410   CONTINUE
0137:       400   CONTINUE
0138:             IF (MALNUM.NE.2) GO TO 500
0139:             VALBUF(K)=KD(K,5)
0140:       500   CONTINUE
0141:             IF (MALNUM.NE.5) GO TO 750
0142:     C         RESET FROM CELL TRIP. IE, START CELL.
0143:             VALBUF(K)=KD(K,5)
0144:             KD(K,1)=KD(K,3)
0145:       750   CONTINUE
0146:             GO TO 100
0147:       900   CONTINUE
0148:             WRITE (IPR2,120)
0149:       120   FORMAT (' ERROR')
0150:             GO TO 100
0151:      1000   CONTINUE
0152:             RETURN
0153:             END

0001:            SUBROUTINE CONRL (KD,N,IMAGE   ,NP,RKD,INP,IREGS, NPULSE,PWR,DBND,
0002:           1 HYSTKW,MASK,ENGVAL,SIMFLG)
0003:            LOGICAL SIMFLG
0004:            LOGICAL PERM,OLDPERM
0005:     C      NOTE: PWR(1) = MAIN POWER METER
0006:            DIMENSION KD(N,NPI,RKD(N,INP),NPULSE(N),ENGVAL(N),PWR(N)
0007:            GLOBAL MANUAL,ERROUT,TINPER,NOCSEC,NFINSC,DEMPER,DEMLIM
0008:            INTEGER TINPER
0009:            COMMON/TAPS/NTAPUD(6,2),DBT,MATROB(6,5),MALREQ(6,5),NTPOSS,CELTRIP
0010:           1 ,NPZ,PROJ,ICFLAG,IDEBUG(2)
0011:            LOGICAL CELTRIP,ICFLAG
0012:            GLOBAL IPR2
0013:            DIMENSION TAPLOK(5)
0014:            LOGICAL TAPLOK
0015:            DIMENSION ACON(3)
```

```
0016:          DATA NX/$4001/
0017:          DATA ACON/2.,1.,.5/
0018:          DATA MSKO/$80/
0019:          N1=N+1
0020:          TP=TINPER
0021:          TLFT=60.*DEMPER-TP
0022:          RATIO=TLFT/(60.*DEMPER)
0023:          IF (ICFLAG) RATIO=1.
0024:          DBT= DBND
0025:          IF (ITAPFL.EQ.1) DBT= DBT-HYSTKW
0026:          IIND=2
0027:          IF (TINPER.LT.NFINSC) IIND=1
0028:          IF (ICFLAG) IIND=3
0029:          DBT=DBT*ACON(IIND)
0030:  C       IF ON MANUAL CONTROL - DO NOTHING
0031:          IF (MANUAL.EQ.0) GO TO 2000
0032:  C       DON'T CONTROL IF POSSIBILITY OF A CELL TRIP
0033:          IF (CELTRIP) GO TO 2000
0034:          ERRKW=ERROUT
0035:          IF (IDEBUG(1).EQ.0) GO TO 70
0036:          WRITE (IPR2,75) ERRKW,RATIO,NTPOSS
0037:      75  FORMAT (' CONTROL: ERR KW, RATIO, NTPOSS',2F10.3,I5)
0038:          WRITE (IPR2,90)
0039:      90  FORMAT (' PS,CL,NECES,POSS,DIR,TAPS,ERR')
0040:      70  CONTINUE
0041:  C       LOOP THRU ALL CELLS. CALC DKW/TAP AND DA/TAP IF TAP WAS MOVED.
0042:  C       SET TAP MOVE LOCK OUT, MOVE INTO LIMITS.
0043:          MX=MSKO
0044:          DO 1 I=1,N
0045:          IF (KD(I,19).EQ.0) GO TO 5
0046:  C       CALC DA/TAP.
0047:          X= KD(I,19)
0048:          AKW    = X* (ENGVAL(I)- RKD(I,16))
0049:          IF (SIMFLG.AND.MALREQ(I,4).EQ.1) AKW=1.1*RKD(I,18)
0050:          IF (SIMFLG.AND.MALREQ(I,4).EQ.-1) AKW=.9*RKD(I,17)
0051:          IF (AKW.GE.RKD(I,17)) GO TO 100
0052:  C       AKW LT LOW LIMIT OF AI. BAD METER OR NO TAP MOVEMENT.
0053:          AKW=RKD(I,17)
0054:          IF (SIMFLG.AND.MALREQ(I,4).EQ.0) GO TO 101
0055:          MATROB(I,4)=-1
0056:          GO TO 101
0057:     100  CONTINUE
0058:          IF (AKW.LE.RKD(I,18)) GO TO 101
0059:  C       KA/TAP GT HI LIMIT
0060:          AKW=RKD(I,18)
```

```
0061:             IF (SIMFLG.AND.MALREQ(I,4).EQ.0) GO TO 101
0062:             MATROB(I,4)=1
0063:      101    CONTINUE
0064:             RKD(I,14)=AKW
0065:     C             CALC DKW/TAP WHEN AT LEAST 4 PULSES SINCE TAP SETTLED.
0066:             IF (NPULSE(I).LT.4) GO TO 5
0067:             DKW    = X *(PWR(I+1)- RKD(I,15) )
0068:             IF (SIMFLG.AND.MALREQ(I,3).EQ.1) DKW=1.1*RKD(I,20)
0069:             IF (SIMFLG.AND.MALREQ(I,3).EQ.-1) DKW=.9*RKD(I,19)
0070:             IF (DKW.GE.RKD(I,19)) GO TO 102
0071:     C             DKW LT LOW LIMIT
0072:             DKW=RKD(I,19)
0073:             IF (SIMFLG.AND.MALREQ(I,3).EQ.0) GO TO 103
0074:             MATROB(I,3)=-1
0075:             GO TO 103
0076:      102    CONTINUE
0077:             IF (DKW.LE.RKD(I,20)) GO TO 103
0078:     C             DKW GT HI LIMIT
0079:             DKW=RKD(I,20)
0080:             IF (SIMFLG.AND.MALREQ(I,3).EQ.0) GO TO 103
0081:             MATROB(I,3)=1
0082:      103    CONTINUE
0083:             RKD(I,13)=DKW
0084:        5    CONTINUE
0085:             KD(I,17)=1
0086:             KD(I,19)=0
0087:             MX=2*MX
0088:             TAPLOK(I)=.FALSE.
0089:     C             CHECK FOR REMOTE OR LOCAL CELL IN MANUAL.
0090:     S       LDA IMAGE
0091:     S       AND MX
0092:     S       ZJP )12
0093:             IF (KD(I,18).EQ.0) GO TO 10
0094:     C             CHECK IF CELL OUT OF LIMITS.
0095:             IF (ENGVAL(I).LE. RKD(I,1) ) GO TO 6
0096:     C             TOO HI.
0097:             KD(I,19)=-1
0098:             GO TO 8
0099:        6    CONTINUE
0100:             IF (ENGVAL(I).GE.RKD(I,3) ) GO TO 1
0101:     C             TOO LOW.
0102:             KD(I,19)=1
0103:        8    CONTINUE
0104:     C             ADJUST ERRKW FOR EXPECTED CHANGE.
```

```
0105:          Y= KD(I,19)
0106:          ERRKW=ERRKW+ Y*RKD(I,13)*RATIO
0107:          GO TO 10
0108:       12 KD(I,17)=0
0109:       10 CONTINUE
0110:          TAPLOK(I)=.TRUE.
0111:        1 CONTINUE
0112:          ITAPFL=0
0113:          PERM=.FALSE.
0114: C              NO CONTROL IN FIRST SECTION OF DEMAND PERIOD
0115:          IF (TINPER.LT. NOCSEC) GO TO 1000
0116:          IF(NTPOSS.EQ.0 ) GO TO 1000
0117:          DO 50 I=1,N
0118:          IF (ABS(ERRKW) .LT. DBT) GO TO 1000
0119: C              MOVE TAPS ONLY AFTER 2 CONSECUTIVE HI ERROUT SIGNALS
0120:          PERM=.TRUE.
0121:          IF (.NOT.OLDPERM.AND..NOT.ICFLAG) GO TO 1000
0122: C              K= NEXT PRIORITY CELL.
0123:          DO 55 K=1,N
0124:          IF (KD(K,4).EQ.I) GO TO 56
0125:       55 CONTINUE
0126:       56 CONTINUE
0127: C              K IS CELL WITH NEXT PRIORITY.
0128:          IF (TAPLOK(K)) GO TO 50
0129:          NECESS=ABS(ERRKW)/(RKD(K,13)*RATIO)
0130:          IF (TINPER.LT.NFINSC.OR.ICFLAG) GO TO 58

0131:          IF (ERRKW .LT.0..AND.ITAPFL.EQ.0) NECESS=NECESS+1
0132:       58 CONTINUE
0133:          INR=2
0134:          NDIR=1
0135:          NDEX=1
0136:          IF (ERRKW.GT.0.) GO TO 60
0137:          INR=3
0138:          NDIR=-1
0139:          NDEX=2
0140:       60 CONTINUE
0141:          IPOSS= ABS( RKD(K,INR) - ENGVAL(K) ) /RKD(K,14)
0142:          IPOSSX=IPOSS
0143:          IPOSS=MIN0(NTPOSS,IPOSS)
0144:          TAPNUM= MIN0(NECESS,IPOSS)
0145:          IF (TAPNUM.LT.1.) GO TO 50
0146: C              TAP CHANGE POSSIBLE. INITIATE IT.
0147:          KD(K,19) =NDIR
```

```
0148:            NTAPUD(K,NDEX)=NTAPUD(K,NDEX)+1
0149:            ITAPFL=1
0150:            RKD(K,16)=ENGVAL(K)
0151:            RKD(K,15)= PWR(K+1)
0152:            XDIR=NDIR
0153:      C           ADJUST ERROR SIGNAL FOR EXPECTED NUMBER OF TAPS ON THIS CELL.
0154:            ERRKW= ERRKW -XDIR*TAPNUM+RKD(K,13)*RATIO
0155:            IF (IDEBUG(1).EQ.0) GO TO 80
0156:            WRITE (IPR2,85) I,K,NECESS,IPOSSX,NDIR,TAPNUM,ERRKW
0157:         85 FORMAT (I3,I3,I4,I4,I3,F5.0,F7.0)
0158:         80 CONTINUE
0159:         50 CONTINUE
0160:            IF (ABS(ERRKW).LT.DBT.OR.ITAPFL.EQ.1) GO TO 1000
0161:      C         ERROR LARGE ENOUGH TO MOVE TAPS, BUT NONE MOVING.
0162:      C         NO FURTHER CONTROL POSSIBLE.
0163:            NUMTRB=1
0164:            IF (ERRKW.LT.0.) NUMTRB=-1
0165:      C         CHECK IF ALL CELL LINES IN MANUAL
0166:            DO 15 I=1,N
0167:            IF (KD(I,17).EQ.1.AND.KD(I,18).EQ.1) GO TO 17
0168:         15 CONTINUE
0169:            NUMTRB=2
0170:         17 CONTINUE
0171:            MATROB(N1,2)=NUMTRB
0172:       1000 CONTINUE
0173:            OLDPERM=PERM
0174:            IF (ITAPFL.EQ.1) MATROB(N1,2)=0
0175:            IPATT=0
0176:            DO 25 I=1,N
0177:            IF (KD(I,19).EQ.1)  IPATT= IPATT+KD(I,6)
0178:            IF (KD(I,19).EQ.-1) IPATT= IPATT+KD(I,20)
0179:         25 CONTINUE
0180:      C         TURN ON TAPS TO BE MOVED.
0181:            CALL MECCO (NX,IPATT,IREGS,MASK)
0182:            GO TO 3000
0183:       2000 CONTINUE
0184:            DO 2001 I=1,N
0185:            KD(I,19)=0
0186:       2001 CONTINUE
0187:            ITAPFL=0
0188:       3000 CONTINUE
0189:            RETURN
0190:            END
```

I claim:

1. A method of controlling the loads in a plant facility while keeping the overall plant consumption within an assigned power demand limit, comprising the steps of:
measuring the actual power rate of consumption by said plant;
establishing successive demand periods for totalizing the power demand from the beginning of a demand period to the end thereof;
said power demand limit being assigned at the end of a demand period;
periodically calculating a demand error projected to be at the end of a demand period on the basis of actual power rate;
changing concurrently with said calculating step the demand error into a changed error by an amount sufficient to reach at a predetermined instant selected before the end of the demand period a power rate corresponding to the ideal rate of consumption at said predetermined instant; and
controlling at least one of said loads in order to compensate for such said changed error, thereby reaching said assigned demand limit under the ideal rate at the end of the demand period.

2. The method of claim 1 with a step substituted for said changing step taken at said predetermined instant consisting of controlling at least one of said loads to change the power rate to become equal to the ideal rate at the end of the demand period.

3. The method of claim 2 wherein said sufficient amount is the difference between the energy consumption at said actual power rate and the energy at said ideal rate over a time interval extending from said predetermined instant to the end of the demand period.

4. The method of claim 3 wherein said changing step is based on a comparison between the actual power rate and the ideal rate.

5. The method of claim 4 wherein upon said predetermined instant said step of changing the power rate is modified, in response to a demand error such that the ideal rate is larger than the actual power rate, by controlling at least one of said loads to aim at said assigned power demand limit at the end of the demand period.

6. The method of claim 4 wherein upon said predetermined instant said step of changing the power rate is modified in response to a demand error, such that the ideal rate is smaller than the actual power rate, by controlling at least one of said loads to aim at said assigned demand limit under the ideal rate.

7. The method of claim 1 wherein the plant facility includes loads having individual tap changes for individual tap changing to provide a different power KW and a different current KA on the controlled load when controlled by said controlling step; said controlling step effecting upon at least one of said loads a change $\Delta KW$ in KW and $\Delta KA$ in KA, said $\Delta KW$ and $\Delta KA$ changes being used to estimate a change in KW and in KA.

8. The method of claim 7 wherein said tap changers have an upper limit and a lower limit defining a maximum and a minimum control for each of said at least one loads, said controlling step being completed by additional tap changes on another one of said loads when one of said upper and lower limits is reached.

9. In a power demand control system of a plant facility having a plurality of electrical loads which are controllably sheddable and a plurality of electrical loads which are selectively adjustable in relation to individual power rate consumption, said loads being supplied with energy from the power lines of a utility company, and including:
a utility company main kilowatt hour meter providing indication of present power demand of said plant facility;
means responsive to said main kilowatt hour meter and operative during successive demand periods for deriving an anticipated demand of energy at the end of a current demand period and establishing a demand error relative to an assigned demand limit not to be exceeded for the overall plant at the end of such demand period; and
means responsive to said demand error for controlling said loads to minimize said error;
first means operative within a portion of said demand period immediately preceding a predetermined time interval counted from the end of said demand period for changing said demand error by a first amount sufficient to reach through operation of said controlling means with said adjustable loads a predetermined operative point at the beginning of said predetermined time interval; and
second means operative from said predetermined operative point to establish with said adjustable load an ideal power rate for reaching said assigned demand limit at the end of said demand period.

10. The system of claim 9 wherein said second means is disabled when the power rate necessary at the beginning of said predetermined time interval to reach said assigned demand limit is smaller than said ideal power rate; and wherein third means is provided triggered by disabling of said second means for changing the power rate to said necessary power rate.

11. The system of claim 10 wherein said adjustable loads each have individual tap changers for control thereof; wherein said adjustable loads have a predetermined priority order for selection one at a time; and wherein the individual tap changer of a selected adjustable load is actuated upon in response to one of said second and third means.

12. The system of claim 11 wherein said adjustable loads have individual amperemeters and individual kilowatt meters, wherein individual amperemeters and individual kilowatt meters are provided in order to derive corresponding individual $\Delta KA$ and individual $\Delta KW$, wherein control of the tap changer of a selected adjustable load is effected in response to a change in individual amperes increment $\Delta KA$ and in individual power increment $\Delta KW$ in relation to a preceding tap changer control operation.

13. The system of claim 12 wherein a maximum and a minimum ampere limit are assigned to each adjustable load; wherein control of the tap changer of a selected adjustable load is effected on the basis of the number of tap moves necessary to respond to said one of said first and second means, and limited to the number of tap moves possible under said maximum and minimum limits.

14. The system of claim 9 wherein said second means is disabled when the power rate necessary at the beginning of said predetermined time interval to reach said assigned demand limit is larger than said ideal rate; and wherein fourth means is provided triggered by disabling of said second means for changing the power rate to said ideal rate.

* * * * *